United States Patent
Kato

(10) Patent No.: US 8,665,306 B2
(45) Date of Patent: Mar. 4, 2014

(54) COMMUNICATION TERMINAL, COMMUNICATION SYSTEM, COMMUNICATION METHOD, AND MEDIUM STORING COMMUNICATION CONTROL PROGRAM

(75) Inventor: Yoshinaga Kato, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 124 days.

(21) Appl. No.: 13/194,057

(22) Filed: Jul. 29, 2011

(65) Prior Publication Data

US 2012/0026279 A1 Feb. 2, 2012

(30) Foreign Application Priority Data

| Jul. 29, 2010 | (JP) | 2010-171054 |
| Jul. 29, 2010 | (JP) | 2010-171059 |
| Jul. 29, 2010 | (JP) | 2010-171063 |
| May 19, 2011 | (JP) | 2011-112153 |
| May 19, 2011 | (JP) | 2011-112158 |
| May 19, 2011 | (JP) | 2011-112166 |

(51) Int. Cl.
*H04N 7/14* (2006.01)

(52) U.S. Cl.
USPC ........................ 348/14.01; 709/224

(58) Field of Classification Search
USPC ........................... 348/14.01–14.08
See application file for complete search history.

(56) References Cited

U.S. PATENT DOCUMENTS

| 5,794,018 A * | 8/1998 | Vrvilo et al. ................. 713/400 |
| 5,970,054 A * | 10/1999 | Shibata et al. ............... 370/263 |
| 6,354,748 B1 | 3/2002 | Vrvilo |
| 2007/0200918 A1 | 8/2007 | Kwon et al. |
| 2010/0080382 A1 * | 4/2010 | Dresher et al. ............... 379/421 |
| 2010/0246830 A1 * | 9/2010 | Terada ............................. 381/2 |
| 2012/0140022 A1 * | 6/2012 | Kato et al. ................ 348/14.08 |

FOREIGN PATENT DOCUMENTS

| CN | 101056380 | 10/2007 |
| CN | 101207649 | 6/2008 |
| EP | 1 819 146 A1 | 8/2007 |
| JP | 6-233373 | 8/1994 |
| JP | 7-115634 | 5/1995 |
| JP | 7-327092 | 12/1995 |
| JP | 2004-128566 | 4/2004 |
| JP | 2007-142815 | 6/2007 |
| JP | 2007-274369 | 10/2007 |
| JP | 2008-28885 | 2/2008 |
| JP | 2008-61060 | 3/2008 |

OTHER PUBLICATIONS

Extended Search Report issued Jan. 23, 2012 in European Patent Application No. 11175913.0-2223.
Office Action issued Oct. 29, 2013 in Chinese Patent Application No. 201110203431.4 (7 pages).

* cited by examiner

*Primary Examiner* — Maria El-Zoobi
(74) *Attorney, Agent, or Firm* — Oblon, Spivak, McClelland, Maier & Neustadt, L.L.P.

(57) ABSTRACT

A communication terminal detects activation of a mute function of the communication terminal, even when the activation is caused by a sound input device that is not capable of notifying its mute state to the communication terminal, or even when the sound input device is not provided with a mute function.

20 Claims, 33 Drawing Sheets

FIG. 7A 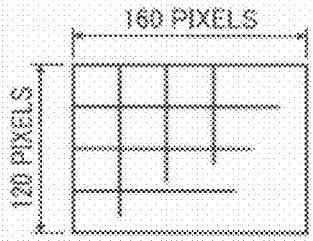
160 PIXELS
120 PIXELS

FIG. 7B 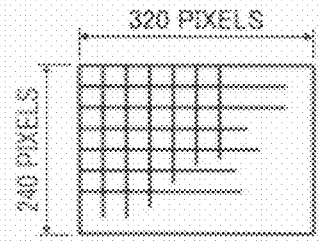
320 PIXELS
240 PIXELS

FIG. 7C 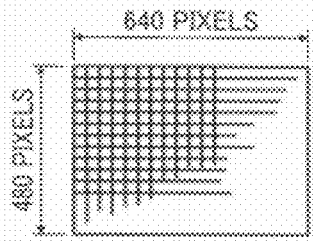
640 PIXELS
480 PIXELS

FIG. 8

DATA QUALITY MANAGEMENT TABLE

| TERMINAL IP ADDRESS | IMAGE DATA QUALITY |
|---|---|
| 1.3.2.4 | HIGH |
| 1.3.1.3 | LOW |
| 1.3.2.3 | MEDIUM |
| ... | ... |

FIG. 9

RELAY TERMINAL MANAGEMENT TABLE

| RELAY TERMINAL ID | OPERATION STATE | DATE AND TIME RECEIVED | RELAY TERMINAL IP ADDRESS | MAXIMUM DATA TRANSMISSION SPEED (Mbps) |
|---|---|---|---|---|
| 111a | ON LINE | 2009.11.10.13:00 | 1.2.1.2 | 100 |
| 111b | ON LINE | 2009.11.10.13:10 | 1.2.2.2 | 1000 |
| 111c | OFF LINE | 2009.11.10.13:20 | 1.3.1.2 | 100 |
| 111d | ON LINE | 2009.11.10.13:30 | 1.3.2.2 | 10 |

FIG. 10

TERMINAL AUTHENTICATION MANAGEMENT TABLE

| TERMINAL ID | PASSWORD |
|---|---|
| 01aa | aaaa |
| 01ab | abab |
| 01ba | baba |
| ... | ... |

FIG. 11

TERMINAL MANAGEMENT TABLE

| TERMINAL ID | OPERATING STATE | RECEIVED DATE | TERMINAL IP ADDRESS |
|---|---|---|---|
| 01aa | ON LINE | 2009.11.10.13:40 | 1.2.1.3 |
| 01ab | OFF LINE | 2009.11.09.12:00 | 1.2.1.4 |
| 01ba | ON LINE | 2009.11.10.13:45 | 1.2.2.3 |
| ... | ... | ... | ... |
| 01db | ON LINE | 2009.11.10.13:50 | 1.3.2.4 |

FIG. 12

CANDIDATE LIST MANAGEMENT TABLE

| REQUEST TERMINAL ID | COUNTERPART TERMINAL ID |
|---|---|
| 01aa | 01ab, 01ba, 01db |
| 01ab | 01aa, 01ba, 01ca |
| 01ba | 01aa, 01ab, 01cb, 01da |
| ... | ... |
| 01db | 01aa, 01ab, 01da |

FIG. 13

SESSION MANAGEMENT TABLE

| SESSION ID | RELAY TERMINAL ID | REQUEST TERMINAL ID | COUNTERPART TERMINAL ID | DELAY TIME (ms) | DATE AND TIME RECEIVED |
|---|---|---|---|---|---|
| se1 | 111a | 01aa | 01db | 200 | 2009.11.10.14.00 |
| se2 | 111b | 01ba | 01ca | 80 | 2009.11.10.14.10 |
| se3 | 111d | 01bb | 01da | 400 | 2009.11.10.14.20 |
| ... | ... | ... | ... | ... | ... |

FIG. 14

ADDRESS PRIORITY MANAGEMENT TABLE

| DOT ADDRESS SIMILARITY | ADDRESS PRIORITY POINT |
|---|---|
| S.S.S.D | 5 |
| S.S.D.- | 3 |
| S.D.-.- | 1 |
| D.-.-.- | 0 |

FIG. 15

TRANSMISSION SPEED PRIORITY MANAGEMENT TABLE

| MAXIMUM DATA TRANSMISSION SPEED (Mbps) | TRANSMISSION SPEED PRIORITY POINT |
|---|---|
| 1000 – | 5 |
| 100 – 1000 | 3 |
| 10 – 100 | 1 |
| – 10 | 0 |

FIG. 16

QUALITY MANAGEMENT TABLE

| DELAY TIME (ms) | IMAGE DATA QUALITY |
|---|---|
| 0 – 100 | HIGH |
| 100 – 300 | MEDIUM |
| 300 – 500 | LOW |
| 500 – | (INTERRUPT) |

FIG. 21

| RELAY TERMINAL ID | ADDRESS PRIORITY POINT | | TRANSMISSION SPEED PRIORITY POINT | TOTAL PRIORITY POINT |
|---|---|---|---|---|
| | FIRST ADDRESS PRIORITY POINT FOR REQUEST | SECOND ADDRESS PRIORITY POINT FOR COUNTERPART TERMINAL | | |
| 111a | 5 | - | 3 | 8 |
| 111b | 3 | - | 5 | 8 |
| 111c | - | - | - | - |
| 111d | 1 | 5 | 1 | 6 |

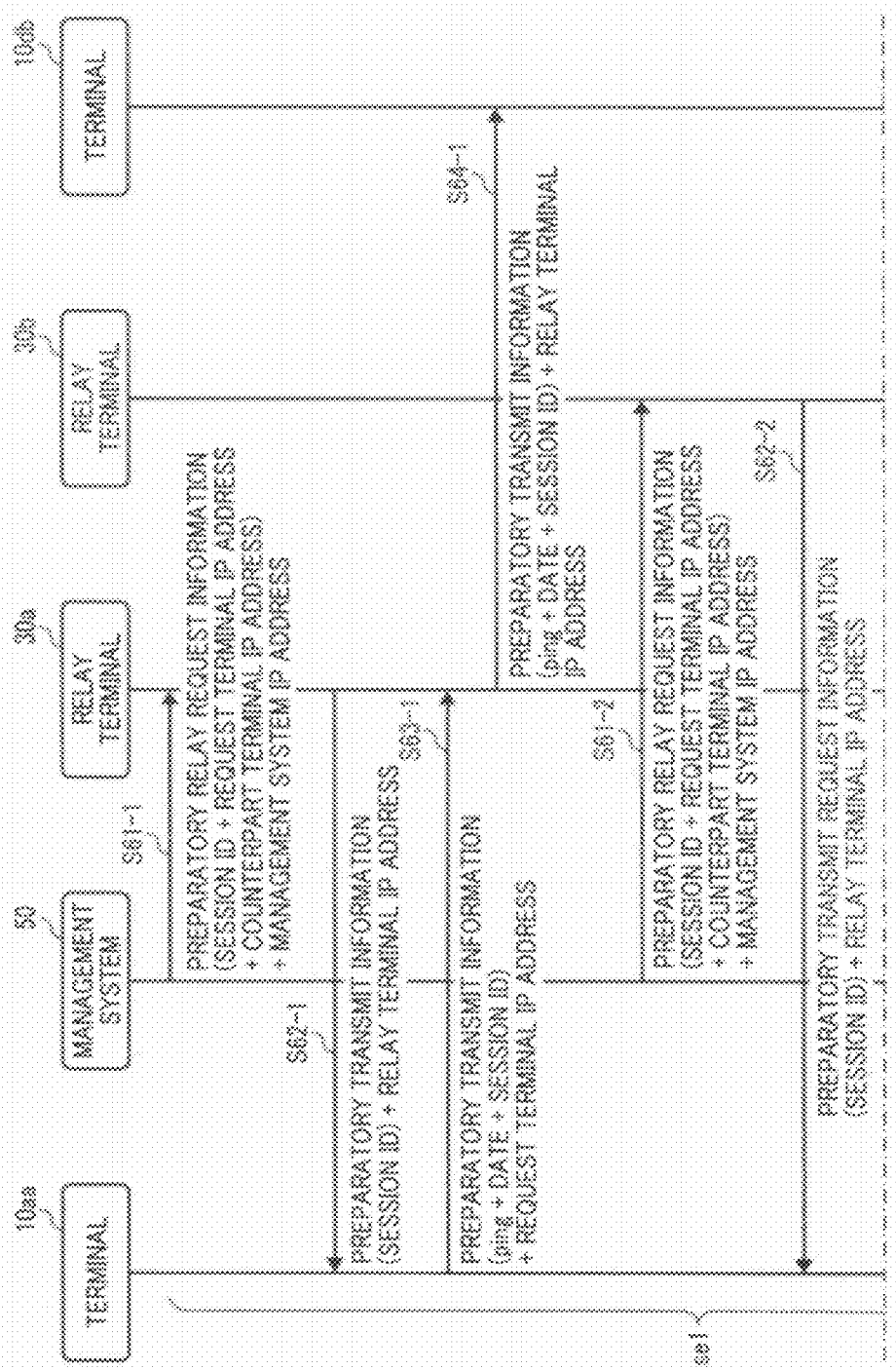

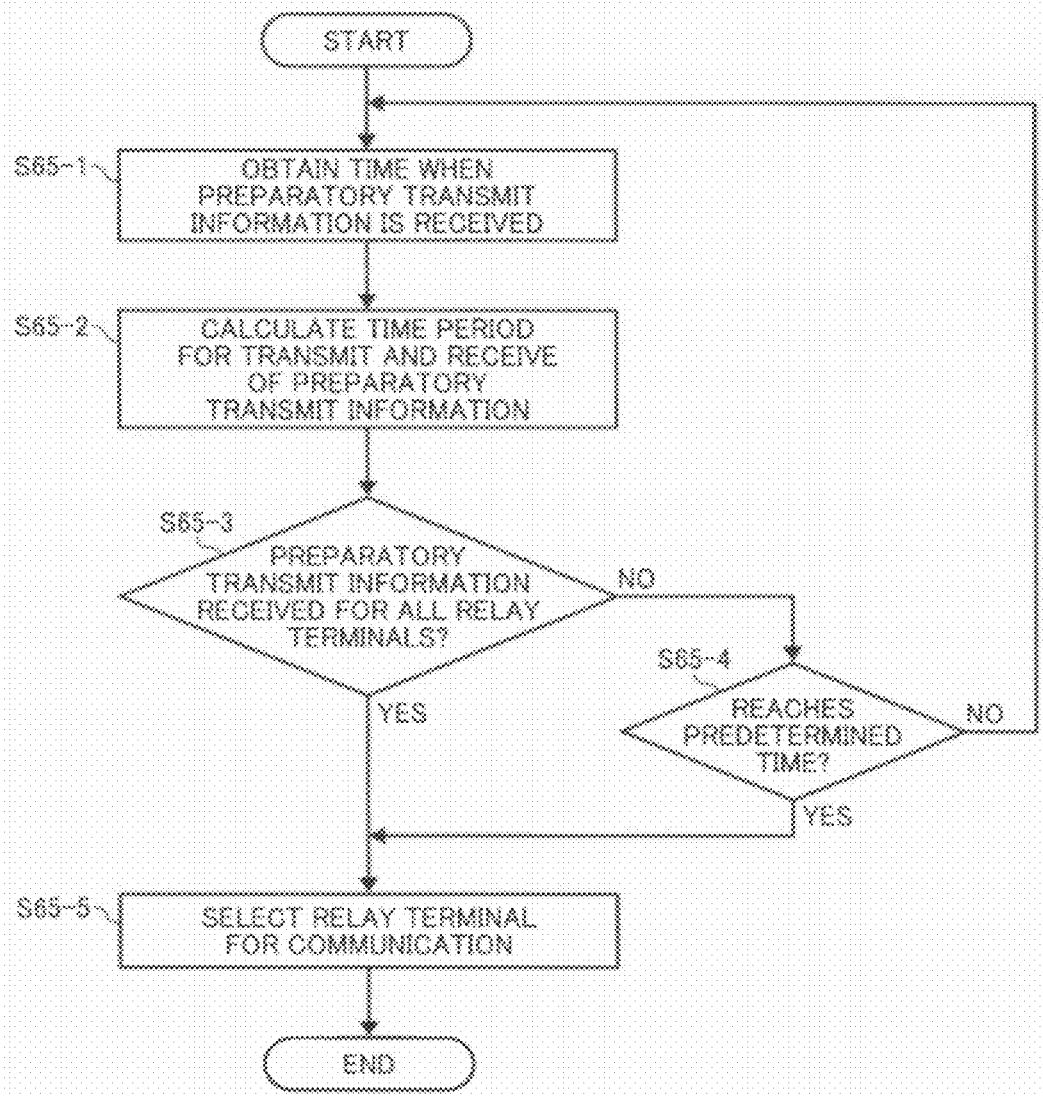

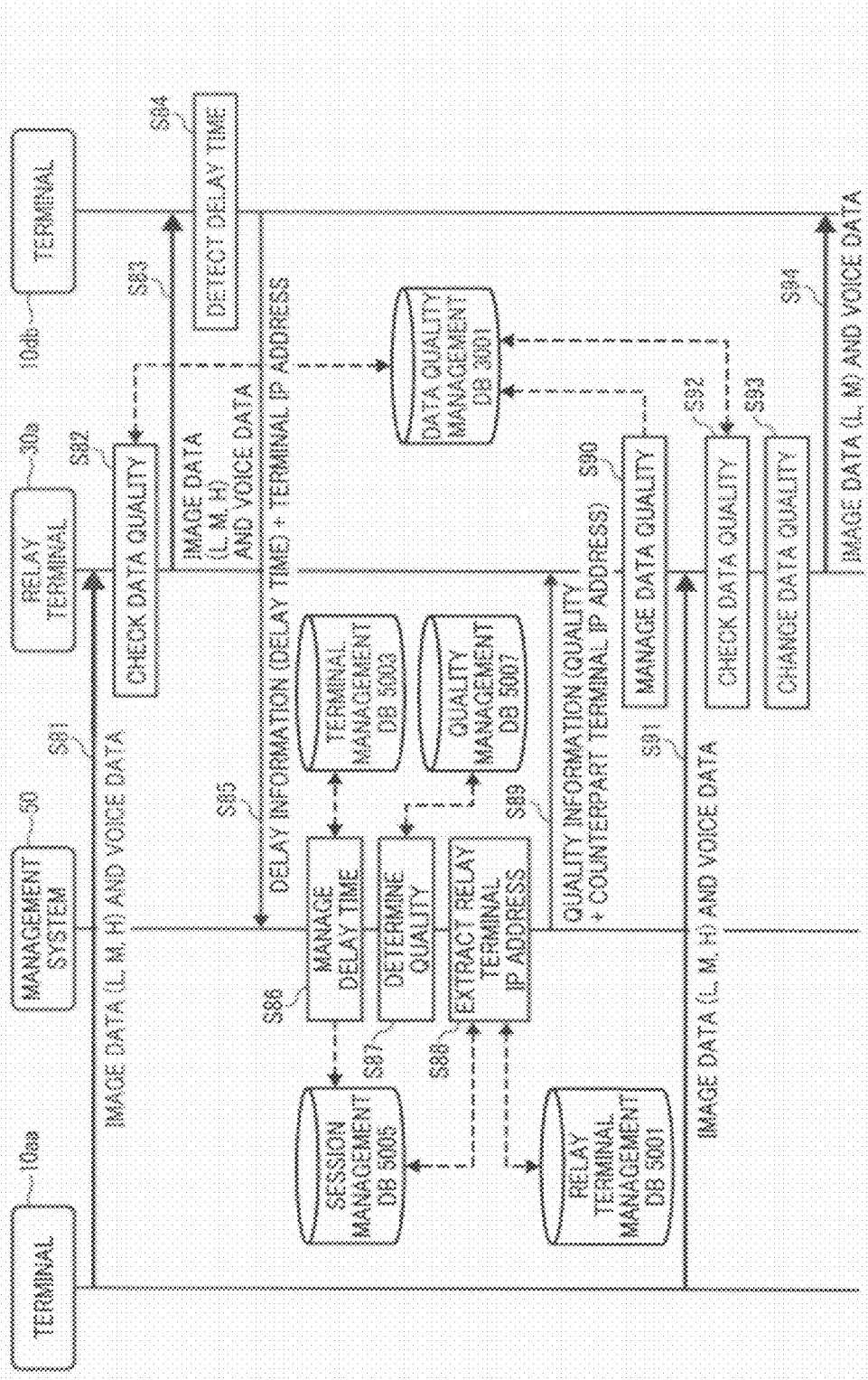

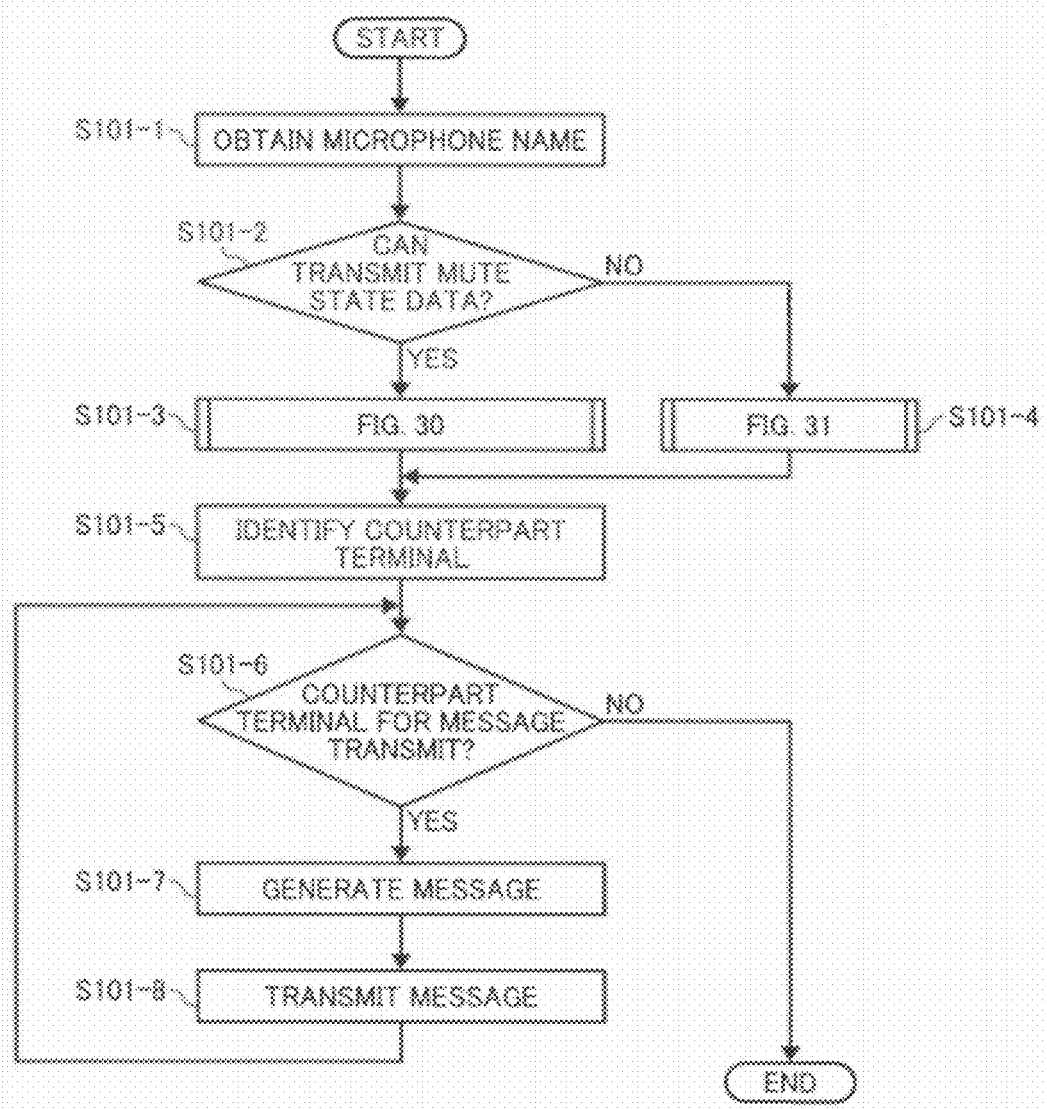

FIG. 26A

| MIC NAME |
|---|
| MIC1 |
| MIC2 |
| ... |

FIG. 26B

| MIC NAME | THRESHOLD |
|---|---|
| MIC3 | 3 |
| MIC4 | 4 |
| ... | ... |

FIG. 27

| TERMINAL ID | MUTE STATE |
|---|---|
| 01aa | MUTE_ON |
| 01ab | MUTE_OFF |
| 01ba | MUTE_NONE |
| 01bb | MUTE_OFF |
| ... | ... |

FIG. 28

(a)
```
<presence from = "01aa" to = "01bb" >
<show>CHAT</show>
<status>MUTE_ON</status>
</presence>
```

(b)
```
<presence from = "01aa" to = "01bb" >
<show>CHAT</show>
<status>MUTE_OFF</status>
</presence>
```

(c)
```
<presence from = "01aa" to = "01bb" >
<show>CHAT</show>
<status>MUTE_NONE</status>
</presence>
```

FIG. 29

(a)
```
<presence from = "1.2.1.3" to = "1.1.1.2" >
<show>CHAT</show>
<id>01aa</id>
<status>MUTE_ON</status>
</presence>
```

(b)
```
<presence from = "1.2.1.3" to = "1.1.1.2" >
<show>CHAT</show>
<id>01aa</id>
<status>MUTE_OFF</status>
</presence>
```

(c)
```
<presence from = "1.2.1.3" to = "1.1.1.2" >
<show>CHAT</show>
<id>01aa</id>
<status>MUTE_NONE</status>
</presence>
```

FIG. 42

(a)
```
<presence from = "01aa" to = "01bb" >
<show>CHAT</show>
<status>MUTE_ON</status>
</presence>
```

(b)
```
<presence from = "01aa" to = "01bb" >
<show>CHAT</show>
<status>MUTE_OFF</status>
</presence>
```

FIG. 43

(a)
```
<presence from = "1.2.1.3" to = "1.1.1.2" >
<show>CHAT</show>
<id>01aa</id>
<status>MUTE_ON</status>
</presence>
```

(b)
```
<presence from = "1.2.1.3" to = "1.1.1.2" >
<show>CHAT</show>
<id>01aa</id>
<status>MUTE_OFF</status>
</presence>
```

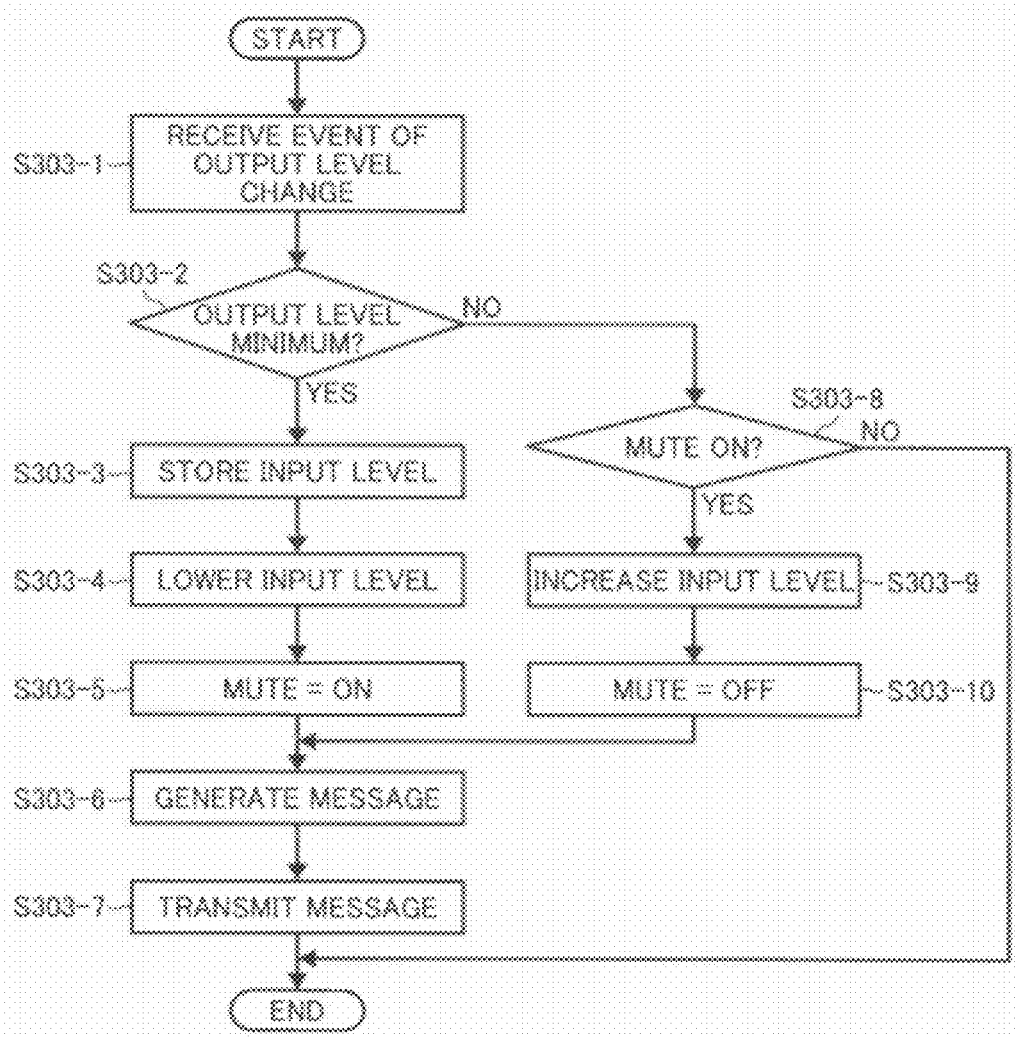

COMMUNICATION TERMINAL, COMMUNICATION SYSTEM, COMMUNICATION METHOD, AND MEDIUM STORING COMMUNICATION CONTROL PROGRAM

CROSS-REFERENCE TO RELATED APPLICATIONS

This patent application is based on and claims priority under 35 U.S.C. §119 to Japanese Patent Application Nos. 2010-171063 filed on Jul. 29, 2010, 2010-171059 filed on Jul. 29, 2010, 2010-171054 filed on Jul. 29, 2010, 2011-112153 filed on May 19, 2011, 2011-112158 filed on May 19, 2011, and 2011-112166 filed on May 19, 2011, in the Japanese Patent Office, the entire disclosure of which is hereby incorporated herein by reference.

FIELD OF THE INVENTION

The present invention generally relates to a communication terminal, communication system, communication method, and communication control program, each of which allows users to communicate between or among remotely located sites.

BACKGROUND

The communication systems allow users, who are located at different sites, to communicate with one another through a communication network such as the Internet through communication terminals. For example, the communication terminal provided at one site obtains an image and/or voice of a user, and transmits image data and/or voice data to a counterpart communication terminal provided at the other site. The counterpart terminal displays an image of the user onto a display and/or outputs the voice of the user through a speaker. Using this communication system, videoconference can be carried out among users located at different sites.

The user, who participates the videoconference, may sometimes want to activate the mute function of the communication terminal, for example, to prevent the user at the other site from hearing the user's voice. When the mute function is activated, the user at the other site, who cannot hear the voice of the user, may think that there is an error in communication systems. In view of this, Japanese Patent Application Publication No. 2008-61060 transmits data indicating the operation state of the communication terminal to the counterpart terminal, thus notifying the user at the other site that mute function of the communication terminal is activated.

The mute function of the communication terminal is often activated by controlling data obtained through an internal microphone that is originally incorporated in the body of the communication terminal as described in Japanese Patent Application Publication Nos. 2008-61060 and 2008-28885. In such case, a mute button that activates the mute function is usually provided in the body of the communication terminal.

On the other hand, the mute function of the communication terminal may be activated by controlling data obtained through an external microphone that is connected to the communication terminal. The external microphone is usually provided with a mute button that activates the mute function of the external microphone. However, in order to know that the mute function of the external microphone is activated, the communication terminal needs to be installed with a device driver, or application, specific to the external microphone in use. Without the device driver specific to the external microphone in use, the communication terminal connected to the microphone is not able to detect that the mute function of the external microphone is selected. As a result, without the device driver, the communication terminal is not able to notify the counterpart terminal that the mute function is activated.

Further, the external microphone that is connected to the communication terminal may not be provided with a mute button. In such case, the communication terminal does not activate the mute function of the communication terminal as there is no other way to receive a user instruction for activating the mute function.

SUMMARY

In view of the above, there is a need for a communication terminal, which is capable of detecting activation of the mute function of the communication terminal when an external microphone is in use.

Example embodiments of the present invention include a communication terminal, communication system, communication method, and control program stored in a recording medium each capable of detecting activation of a mute function of a sound input device connected to the communication terminal, even when the sound input device is not provided with a function of notifying its mute state to the communication terminal, for example, as the device driver specific to the sound input device is not installed onto the communication terminal.

Example embodiments of the present invention include a communication terminal, communication system, communication method, control program stored in a recording medium each capable of registering information regarding a sound input device that is not provided with function of notifying its mute state to the communication terminal, and managing such registered information.

Example embodiments of the present invention include a communication terminal, communication system, communication method, control program stored in a recording medium each capable of detecting activation of the mute function of the communication terminal even when a mute function is not provided at the sound input device connected to the communication terminal.

In addition to the above-described example embodiments, the present invention may be practiced in various other ways.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIGS. 7A to 7C are illustrations for explaining image quality of image data transmitted or received by the communication system of FIG. 1;

FIG. 8 is an example data structure of a data quality management table, managed by the relay terminal of FIG. 5;

FIG. 9 is an example data structure of a relay terminal management table, managed by the communication management system of FIG. 5;

FIG. 10 is an example data structure of a terminal authentication management table, managed by the communication management system of FIG. 5;

FIG. 11 is an example data structure of a terminal management table, managed by the communication management system of FIG. 5;

FIG. 12 is an example data structure of a candidate list management table, managed by the communication management system of FIG. 5;

FIG. 13 is an example data structure of a session management table, managed by the communication management system of FIG. 5;

FIG. 14 is an example data structure of an address priority management table, managed by the communication management system of FIG. 5;

FIG. 15 is an example data structure of a transmission speed priority management table, managed by the communication management system of FIG. 5;

FIG. 16 is an example data structure of a quality management table, managed by the communication management system of FIG. 5;

FIG. 21 is a table storing priority points of the relay terminals that are respectively calculated by the communication management system of FIG. 5 during the operation of limiting a number of candidate relay terminals;

FIGS. 22A and 22B are a data sequence diagram illustrating operation of selecting a relay terminal, performed by the communication system of FIG. 1;

FIG. 23 is a flowchart illustrating operation of selecting a relay terminal, performed by the terminal of FIG. 5;

FIG. 24 is a data sequence diagram illustrating operation of transmitting or receiving data such as image data and voice data, performed by two or more terminals of the communication system of FIG. 1;

FIG. 25 is a flowchart illustrating operation of transmitting a message generated based on the mute state data of a microphone of the terminal of FIG. 5, performed by the terminal of FIG. 5, according to an example embodiment of the present invention;

FIG. 26A is a table storing information regarding a microphone with the function of notifying mute state, managed by the terminal of FIG. 5;

FIG. 26B is a table storing information regarding a microphone without the function of notifying mute state, managed by the terminal of FIG. 5;

FIG. 27 is a table illustrating microphone state data of one or more terminals of FIG. 1, managed by the communication management system of FIG. 5;

FIG. 28 is an illustration for explaining example messages generated by the terminal of FIG. 5, based on mute state data of a microphone of the terminal of FIG. 5;

FIG. 29 is an illustration for explaining example messages generated by the terminal of FIG. 5, based on mute state data of a microphone of the terminal of FIG. 5;

FIG. 42 is an illustration for explaining example messages generated based on mute state data;

FIG. 43 is an illustration for explaining example messages generated based on mute state data;

FIG. 44 is a flowchart illustrating operation of transmitting a message generated based on mute state data, when an event indicating the change in volume output from a speaker is detected, according to an example embodiment of the present invention;

FIG. 46 is an illustration of an example screen displayed by the request terminal, which includes a message indicating that the mute function of the counterpart terminal is on;

FIG. 48 is an illustration of an example screen displayed by the counterpart terminal, which includes a message indicating that the mute function of the request terminal is on;

Figure 1:
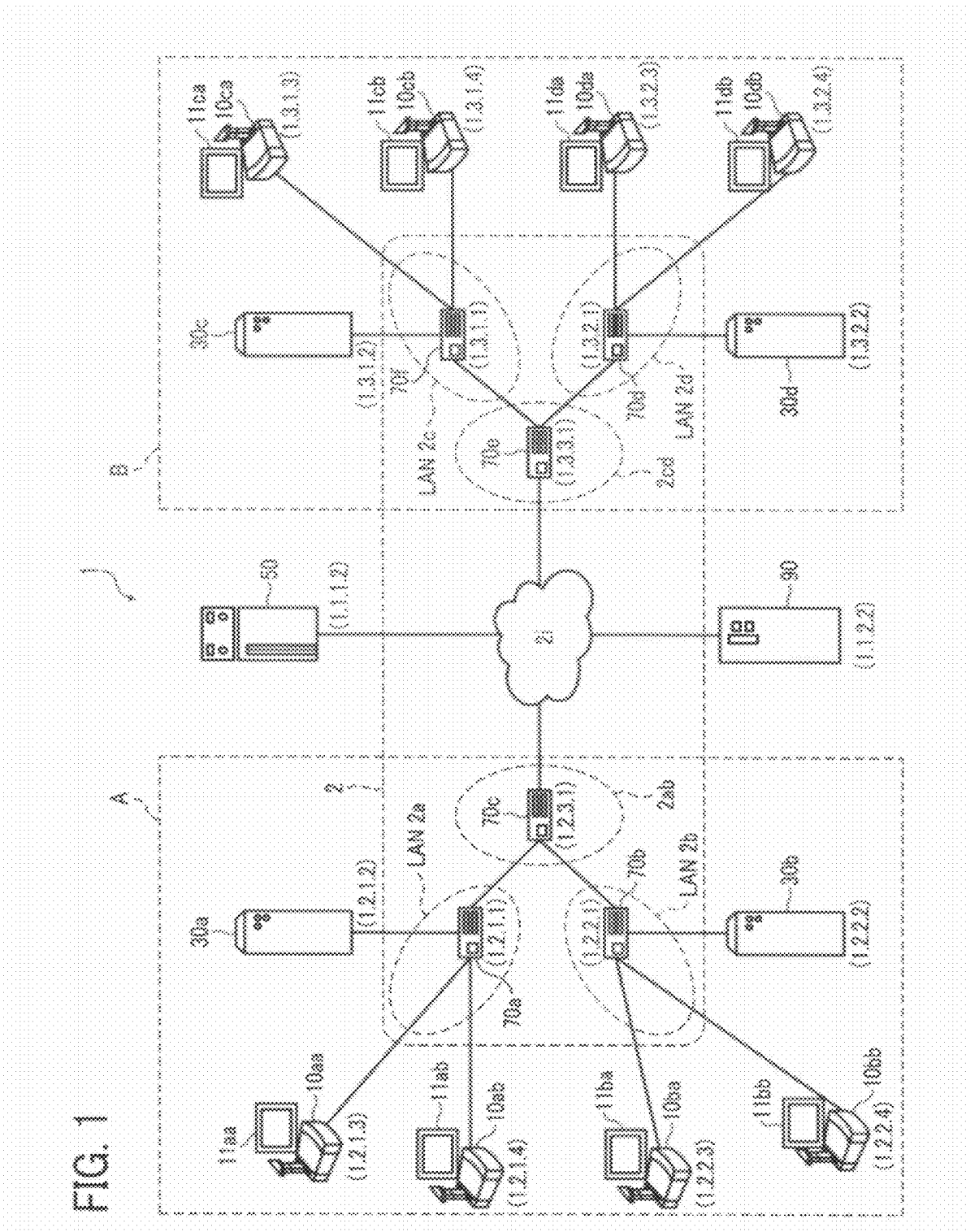
FIG. 1 is a schematic block diagram illustrating a communication system according to an example embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION OF EXAMPLE EMBODIMENTS

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that operate in a similar manner.

Referring now to FIGS. 1 to 24, a communication system is explained according to an example embodiment of the present invention. FIG. 1 is a schematic diagram illustrating a configuration of a remote communication system 1, which is one example of the communication system. Further, in this example, the communication system is implemented by any desired system that allows communication between or among a plurality of users by transmitting or receiving contents data such as image data and/or voice data.

Figure 3:
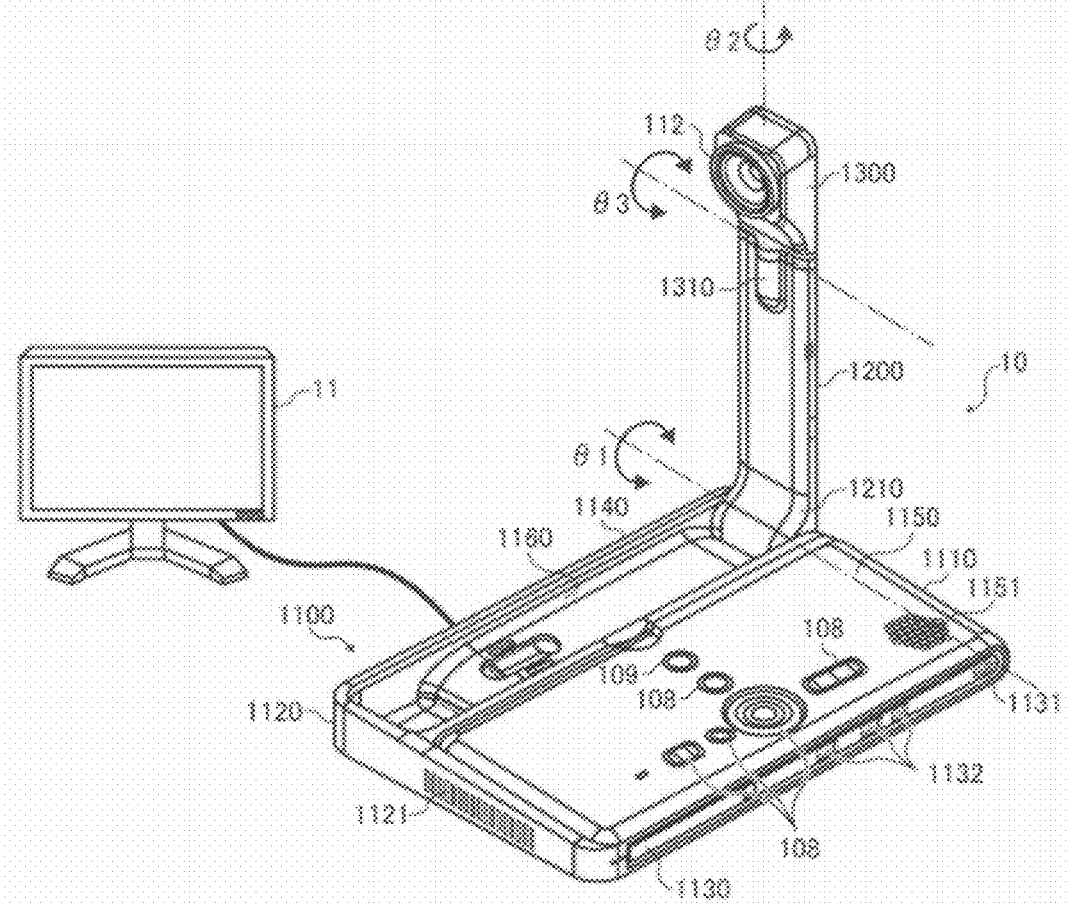
FIG. 3 is a perspective view illustrating the outer appearance of the terminal of the communication system of FIG. 1, according to an example embodiment of the present invention.

The communication system 1 of FIG. 1 includes a plurality of communication terminals 10aa, 10ab, 10ba, 10bb, 10ca, 10cb, 10da, and 10db, a plurality of displays 11aa, 11ab, 11ba, 11bb, 11ca, 11cb, 11da, and 11db, a plurality of relay terminals 30a, 30b, 30c, and 30d, and a communication management system 50. In this example, the communication terminal 10 may be implemented by a remote communication terminal, which may have the appearance as illustrated in FIG. 3. Alternatively, the communication terminal 10 may be implemented by a portable phone. Further, the communication management system 50 may be implemented by a remote communication management system 50.

For the descriptive purposes, in this example, any number of the plurality of communication terminals 10aa to 10db may be collectively or each referred to as the terminal 10. Any number of the plurality of displays 11aa to 11db may be collectively or each referred to as the display 11. Any one of the plurality of relay terminals 30a, 30b, 30c, and 30d may be collectively or each referred to as the relay terminal 30.

The communication management system 50 may be referred to as the "management system" 50. The terminal 10 that transmits data to another terminal 10 to carry out videoconference is referred to as the request terminal 10A. The terminal 10 that receives data from another terminal 10 to carry out videoconference is referred to as the counterpart terminal 10B. For example, the request terminal 10A includes any terminal 10 that requests another terminal 10 to start videoconference, and the counterpart terminal 10B includes any terminal 10 that is requested by the request terminal 10A to start videoconference.

The terminal 10 transmits or receives contents data to or from another terminal 10. Examples of contents data include, but not limited to, image data and/or voice data to be transmitted or received through a session established between or among the terminals 10 for communication. In this example, it is assumed that a moving image is transmitted as the image data. Alternatively, a still image, or both of the still image and the moving image, may be transmitted as the image data. Further, the voice data is not limited to data generated based on the human's voice such that the voice data may include any desired type of data generated based on the sound. The relay terminal 30 relays image data and/or voice data between or among the plurality of terminals 10. The communication management system 50 centrally manages the terminal 10 and the relay terminal 30.

The plurality of routers 70a to 70f, which may be collectively or each referred to as the router 70, selects a route that is most suitable for transmitting contents data such as image data and voice data.

The program providing system 90 includes a hard disk device (HD) 204 (FIG. 4), which stores a terminal control program that causes the terminal 10 to perform various functions or operations. For example, the program providing system 90 sends the terminal control program to the terminal 10 through the Internet 2i to cause the terminal 10 to install the terminal control program. Further, the HD 204 of the program providing system 90 may store a relay control program that causes the relay terminal 30 to perform various functions or operations. For example, the program providing system 90 sends the relay control program to the relay terminal 30 through the Internet 2i to cause the relay terminal 30 to install the relay control program. Further, the HD 204 of the program providing system 90 may store a communication management program that causes the management system 50 to perform various functions or operations. For example, the program providing system 90 sends the communication management program to the management system 50 to cause the management system 50 to install the communication management program.

Still referring to FIG. 1, the terminals 10aa and 10ab, the relay terminal 30a, and the router 70a are connected to a local area network (LAN) 2a. The terminals 10ba and 10bb, the relay terminal 30b, and the router 70b are connected to a LAN 2b. The LAN 2a and the LAN 2b are connected to a leased line 2ab in which the router 70c is provided. It is assumed that these devices including the terminals 10aa to 10bb are located in an area A. For example, assuming that the area A is any area in Japan, the LAN 2a could be located within an office in a city such as Tokyo, and the LAN 2b could be located within an office in another city such as Osaka.

The terminals 10ca and 10cb, the relay terminal 30c, and the router 70f are connected to a LAN 2c. The terminals 10da and 10db, the relay terminal 30d, and the router 70d are connected to a LAN 2d. The LAN 2c and the LAN 2d are connected to a leased line 2cd in which the router 70e is provided. It is assumed that these devices including the terminals 10ca to 10dc are located in an area B apart from the area A. For example, assuming that the area is any area in the United States, the LAN 2c could be located within an office in a city such as New York, and the LAN 2d could be located within an office in another city such as Washington, D.C. The area A and the area B are connected through the Internet 2i, via the routers 70c and 70e.

The management system 50 and the program providing system 90 are connected through the Internet 2i to the terminal 10 and the relay terminal 30. Any one of the management system 50 and the program providing system 90 may be located at any location within or outside any one of the area A and the area B.

In this example, the communication network 2 includes the LAN 2a, LAN 2b, leased line 2ab, Internet 2i, leased line 2cd, LAN 2c, and LAN 2d. Any one or any portion of these lines or any other lines that may be included in the communication network 2 may be implemented as wired network or wireless network such as Wireless Fidelity (WiFi) network or Bluetooth network.

The management system 50, the terminal 10, and the relay terminal 30 may exchange XML-based messages according to the extensible messaging and presence protocol (XMPP) for notification regarding the operation state of each terminal or system. More specifically, the management system 50 manages information regarding the operation state of each terminal 10, which indicates, for example, the online state, the offline state, the state in which the terminal 10 is having videoconference, and the error state in case the terminal 10 is having troubles. When the management system 50 receives information indicating the operation state of one terminal 10 from the one terminal 10, the management system 50 sends information indicating the operation state of the one terminal 10 to another terminal 10.

The terminal 10 transmits contents data such as image data and/or voice data to another terminal 10 through the relay terminal 30, according to real-time transport protocol (RTP), for example, user datagram protocol (UDP).

As shown in FIG. 1, the terminal 10, the relay terminal 30, the management system 50, and the router 70, and the program providing system 90 are each provided with four digit numbers. These four digit numbers separated by dots are the simple expressions of IP addresses respectively assigned to any one of the devices shown in FIG. 1, each of which has a function of communication device. For example, the IP address of the terminal 10aa is "1.2.1.3". For simplicity, it is assumed that the IP address is expressed in IPv4. Alternatively, the IP address may be expressed in IPv6.

In the above-described examples, the communication system 1 allows videoconference to be performed between or among remotely located offices that are respectively located at different cities or countries. Alternatively, the communication system 1 is able to carryout videoconference between or among different rooms within the same building, or between or among different places within the same room. If a user desires, the user may use the communication system 1 to have communication with another user, even when the user is able to have face-to-face communication with another user. Further, videoconference may be carried out by any desired number of users.

Further, in the above-described examples, the communication system 1 is implemented as a videoconference system for use at offices. Other examples of use of the communication system 1 include, but not limited to, meetings, casual conversation among family members or friends, and distribution of information in one direction.

Further, any desired type of contents data may be transmitted in alternative or addition to image data and/or voice data. For example, when image data is transmitted without voice data, voice of a user may be displayed as text data on a screen.

Further, contents data to be transmitted during videoconference includes any desired type of data that is available from videoconference, including, for example, objects such as samples, materials distributed to attendants, and images displayed on a screen of a display device such as a projector.

Further, in this example, voice data includes not only data generated based on the human voice, but also includes data generated based on sounds other than the human voice <Hardware Structure of Communication System>

Next, a hardware structure of the communication system 1 is explained according to an example embodiment of the present invention. In this example, when any delay in data reception is observed at the counterpart terminal 10B or the relay terminal 30, the relay terminal 30 changes resolution of image data to obtain converted image data and sends the converted image data to the counterpart terminal 10B or the request terminal 10A.

Figure 2:
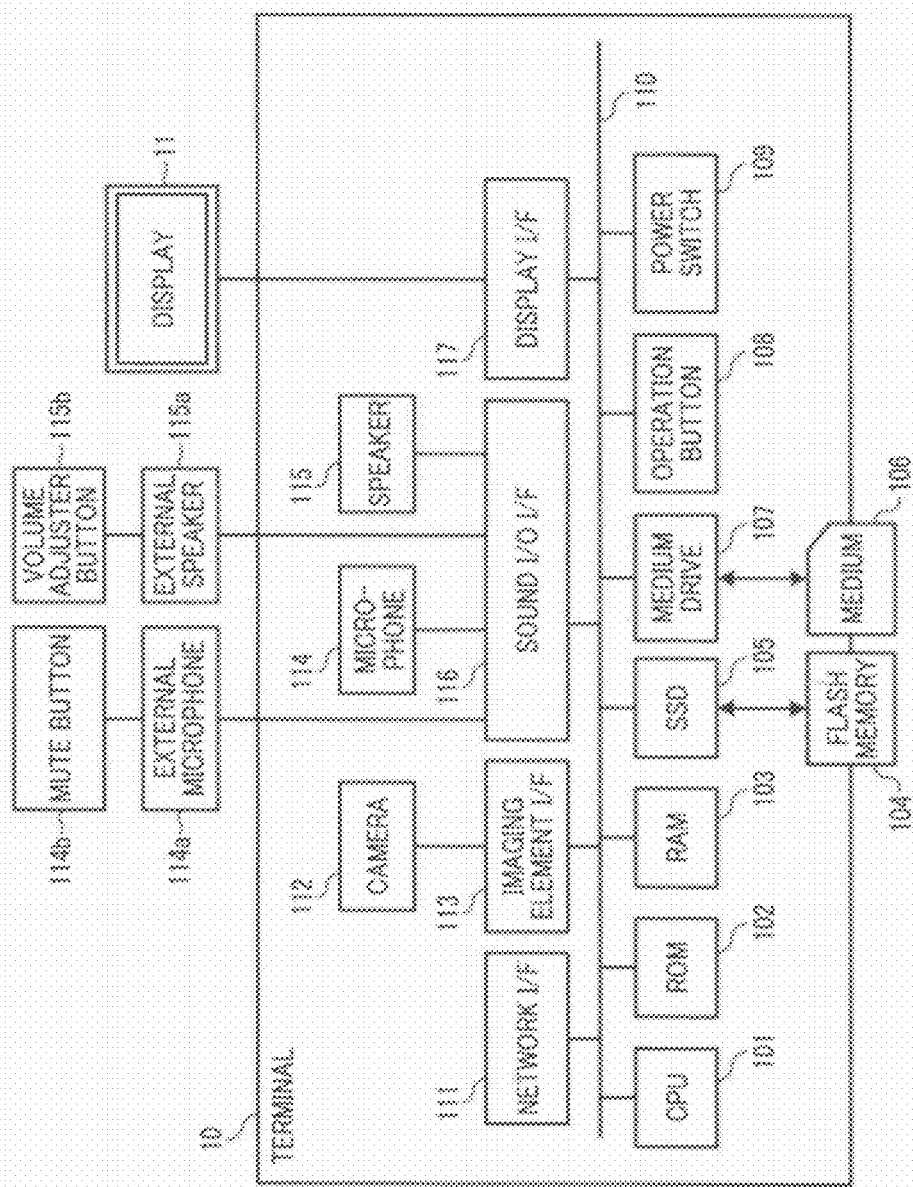
FIG. 2 is a schematic block diagram illustrating a hardware structure of a terminal of the communication system of FIG. 1.

FIG. 2 illustrates a hardware structure of the terminal 10 according to an example embodiment of the present invention. The terminal 10 includes a central processing unit (CPU) 101, a read only memory (ROM) 102, a random access memory (RAM) 103, a flash memory 104, a solid state drive (SSD) 105, a medium drive 107, an operation button 108, a power switch 109, a network interface (I/F) 111, a camera 112, an imaging element interface (I/F) 113, an internal microphone 114, an internal speaker 115, a sound input/output interface (I/O I/F) 116, and a display interface (I/F) 117, which are electrically connected through a bus 110 such as an address bus or data bus.

The CPU 101 controls entire operation of the terminal 10. The ROM 102 stores therein a control program for execution by the CPU 101, such as an initial program loader (IPL). In this example, the ROM 102 stores the terminal control program. The RAM 103 functions as a work area of the CPU 101. The flash memory 104 stores therein various data such as image data or voice data. The SSD 105 controls reading or writing of various data with respect to the flash memory 104 under control of the CPU 101. The medium drive 107 controls reading or writing of various data with respect to a removable recording medium 106 such as a flash memory. The operation button 108 allows the user to input a user instruction, for example, by allowing the user to select a communication destination such as the counterpart terminal 10B. In this example, the operation button 108 includes or operates as a mute button and a volume adjuster button. The power switch 109 allows the user to switch on or off the power of the terminal 10. The network I/F 111 allows the terminal 10 to transmit data through the communication network 2.

The camera 112 takes an image of an object to obtain image data under control of the CPU 101. The imaging element I/F 113 controls operation of the camera 112. The internal microphone 114 catches sounds such as voice of the user at the terminal 10. The internal speaker 115 outputs sounds such as sounds generated based on voice of the user at the counterpart terminal 10. The sound I/O I/F 116 controls input or output of sound signals such as voice signals with respect to the internal microphone 114 and the internal speaker 115 under control of the CPU 101. The display I/F 117 transmits image data to the display 11 under control of the CPU 101.

The display 11 may be implemented by a liquid crystal display (LCD) or an organic light emitting display, which displays various data such as an image of an object or an operation icon. As illustrated in FIGS. 2 and 3, the display 11 is connected to the display I/F 117 through a cable. The cable may be implemented by an analog RCB (VGA) signal cable, a component video cable, a high-definition multimedia interface (HDMI) signal cable, or a digital video interactive (DVI) signal cable.

The camera 112 includes a plurality of devices such as a lens system, and a solid-state image sensing device that photo-electrically converts a light to generate an image of an object. For example, the solid-state image sensing device includes a complementary metal oxide semiconductor (CMOS) or a charge coupled device (CCD).

The internal microphone 114 and the internal speaker 115 are each incorporated in the body of the terminal 10. The terminal 10 is further provided with one or more connection ports through which any external device is connected. For example, referring to FIG. 2, the terminal 10 is connected to an external microphone 114a that is connected to the sound I/O I/F 116 through the port, and to an external speaker 115a that is connected to the sound I/O I/F 116 through the port. With this external device, the user is able to collect sounds at various places using the external microphone 114a, or outputs sounds at various places using the external speaker 115a. More specifically, the user is able to freely choose a specific microphone or speaker to use depending on the circumstances.

In this example, a part of the operation button 108 functions as a mute button, which causes the internal microphone 114 to be in the mute on state. The external microphone 114a is provided with a mute button 114b, which causes the external microphone 114a to be in the mute on state. When the external microphone 114a is in use, data input through the external microphone 114a and the mute button 114b is accepted as it is valid, but data input through the internal microphone 114 and the mute button of the operation button 108 is not accepted as it is invalid.

In this example, a part of the operation button 108 functions as a volume adjuster button, which causes the internal speaker 115 to change its volume. The external speaker 115a is provided with a volume adjuster button 115b, which causes the external speaker 115a to change its volume. Further, in this example, the volume adjuster button 115b of the external speaker 115a may function as a mute button that causes the communication terminal 10 to be in the mute on state.

When the external speaker 115a is in use, data input through the external speaker 115a and the volume adjuster button 115b is accepted as it is valid, but data input through the internal speaker 115 and the volume adjuster button of the operation button 108 is not accepted as it is invalid.

The external microphone 114a and the external speaker 115a are connected through the ports, which are in compliance with the USB standards. The external microphone 114a and the external speaker 115a may be connected to the sound I/O I/F 116 through a wireless or wired network. In this example, the mute button of the internal microphone 114 and the volume adjuster button of the internal speaker 115, which are a part of the operation button 118, are each made invalid when the internal microphone 114 and the internal speaker 115 are made invalid. Alternatively, the mute button and the volume adjuster button of the operation button 118 may be continued to be valid even when the internal microphone 114 and the internal speaker 115 are made invalid.

The recording medium 106, which can be freely attached to or detached from the terminal 10, includes any desired type of recording medium. In alternative to the flash memory 104, any nonvolatile memory that is readable and writable under control of the CUP 101 may be used such as Electrically Erasable and Programmable ROM (EEPROM).

The terminal control program may be written onto a recording medium that is readable by a general-purpose computer such as the recording medium 106 in any format that is installable or executable by a general-purpose computer. Once the terminal control program is written onto the recording medium, the recording medium may be distributed. Further, the terminal control program may be stored in any desired memory other than the flash memory 104, such as the ROM 102.

FIG. 3 is a perspective view illustrating the outer appearance of the terminal 10 of the communication system 1. As illustrated in FIG. 3, the terminal 10 includes a body 1100, an arm 1200, and a camera housing 1300.

The body 1100 includes a back side wall 1110 having a plurality of air intake holes that are formed over the nearly entire surface of the intake surface of the back side wall 1100. The body 1100 further includes a front side wall 1120 provided with an exhaust surface 1121 having a plurality of exhaust holes over the nearly entire surface of the exhaust surface 1121. When a cooling fan that is provided within the body 1100 is driven, air flows in through the intake holes of the intake surface and out through the exhaust holes of the exhaust surface 1121. The body 1100 further includes a right side wall 1130 formed with a sound pickup hole 1131. Through the sound pickup hole 1131, the internal microphone 114 (FIG. 2) of the terminal 10 is able to catch sounds such as human voice or any sound including noise.

The right side wall 1130 is further provided with a plurality of connection ports 1132. The connection ports 1132 allow connection to an external device according to the Universal Serial Bus (USB) standards, such as the external microphone 114a and the external speaker 115a, to be connected to the sound I/O I/F 116.

The body 1100 further includes a left side wall 1140, which is provided with a connection port to connect the external display 11 to the display I/F 117.

The body 1100 has an operation panel 1150, which is provided at a front surface toward the right side wall 1130. The operation panel 1150 includes a plurality of operation buttons 108 ("the operation button 108"), the power switch 109, and a plurality of sound output holes 1151. Through the sound output holes 1151, the speaker 115 (FIG. 2) of the terminal 10 is able to output sounds such as sounds generated based on human voice. The body 1100 further includes a holder 1160, which is provided at the front surface toward the left side wall 1140. The holder 1160, which has a concave shape, accommodates therein the arm 1200 and the camera housing 1300.

The arm 1200 is fixed to the body 1100 via a torque hinge 1210. With the torque hinge 1210, the arm 1200 can be rotated in directions of up and down with respect to the body 1100, while making a tilt angle θ1 of up to 135 degrees. FIG. 3 illustrates the case where the tilt angle θ1 is 90 degrees.

Figure 4:
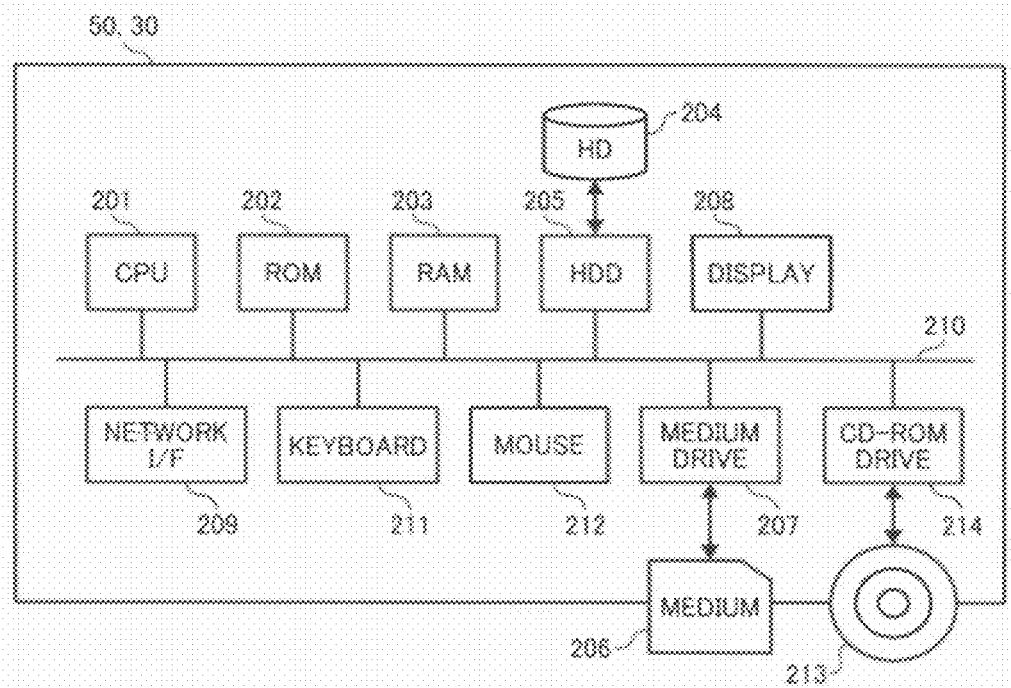
FIG. 4 is a schematic block diagram illustrating a hardware structure of any one of a communication management system, a relay terminal, and a program providing system of the communication system of FIG. 1.

The camera housing 1300 incorporates therein the camera 112 (FIG. 2) that takes an image of an object. The object may be a part of a user, document, or a room where the terminal 10 is located. The camera housing 1300 is fixed to the arm 1200 through a torque hinge 1310. With the torque hinge 1310, the camera housing 1300 can be rotated with respect to the arm 1200, in the direction of up, down, right, and left, such that the camera housing 1300 is kept at a desired position. More specifically, the camera housing 1300 can be rotated, while making a pan angle θ2 from about −180 degrees to +180 degrees in the direction right and left, and a tilt angle θ3 that ranges from about −45 degrees to +45 degrees in the direction of up and down. In FIG. 4, the pan angle θ2 and the tilt angle θ3 are each 0 degree.

The relay terminal 30, the management system 50, and the program providing system 90 are each implemented by a general-purpose computer such as a personal computer or a server computer. For simplicity, explanation of the outer appearance of the computer is omitted.

FIG. 4 illustrates a hardware structure of the communication management system 50 of FIG. 1. The management system 50 includes a CPU 201, a ROM 202, a RAM 203, the HD 204, a hard disk drive (HDD) 205, a medium drive 207, a display 208, a network interface (I/F) 209, a keyboard 211, a mouse 212, and a CD-ROM drive 214, which are electrically connected through a bus 210 such as an address bus or a data bus.

The CPU 201 controls entire operation of the management system 50. The ROM 202 stores a control program for execution by the CPU 201, such as the communication management program. The RAM 203 functions as a work area of the CPU 201. The HD 204 stores therein various data. The HDD 205 controls reading or writing of various data with respect to the HD 204 under control of the CPU 201. The medium drive 207 controls reading or writing of various data with respect to a removable recording medium 206 such as a flash memory. The display 208 displays various data such as a cursor, menu, window, character, or image. The network I/F 209 allows the management system 50 to transmit data through the communication network 2. The keyboard 211 includes a plurality of keys, each of which is used for inputting a user instruction through a character, a numeral, or a symbol. The mouse 212 allows the user to input a user instruction including, for example, selection or execution of a specific instruction, selection of an area to be processed, and instruction of cursor movement. The CD-ROM drive 214 controls reading or writing of various data with respect to a CD-ROM 213. In alternative to the CD-ROM 213, any removable recording medium may be used.

The communication management program may be written onto a recording medium that is readable by a general-purpose computer such as the recording medium 206 or the CD-ROM 213 in any format that is installable or executable by the general-purpose computer. Once the communication management program is written onto the recording medium, the recording medium may be distributed. Further, the communication management program may be stored in any desired memory other than the HD 204, such as the ROM 202.

The relay terminal 30 is substantially similar in hardware structure to the management system 50 of FIG. 3, except for replacement of the communication management program with a relay terminal control program that is used for controlling the relay terminal 30. The relay terminal control program may be written onto a recording medium that is readable by a general-purpose computer such as the recording medium 206 or the CD-ROM 213 in any format that is installable or executable by the general-purpose computer. Once the relay terminal control program is written onto the recording medium, the recording medium may be distributed. Further, the relay terminal control program may be stored in any desired memory other than the HD 204, such as the ROM 202.

The program providing system 90 is substantially similar in hardware structure to the management system 50 of FIG. 3, except for replacement of the communication management program with a program providing program that is used for controlling the program providing system 90. The program providing program may be written onto a recording medium that is readable by a general-purpose computer such as the recording medium 206 or the CD-ROM 213 in any format that is installable or executable by the general-purpose computer. Once the program providing program is written onto the recording medium, the recording medium may be distributed. Further, the program providing program may be stored in any desired memory other than the HD 204, such as the ROM 202.

Other examples of removable recording medium, which may be used in replace of the CD-ROM 213, include, but not limited to, compact disc recordable (CD-R), digital versatile disk (DVD), and blue ray disc.

<Functional Structure of System>

Figure 5:
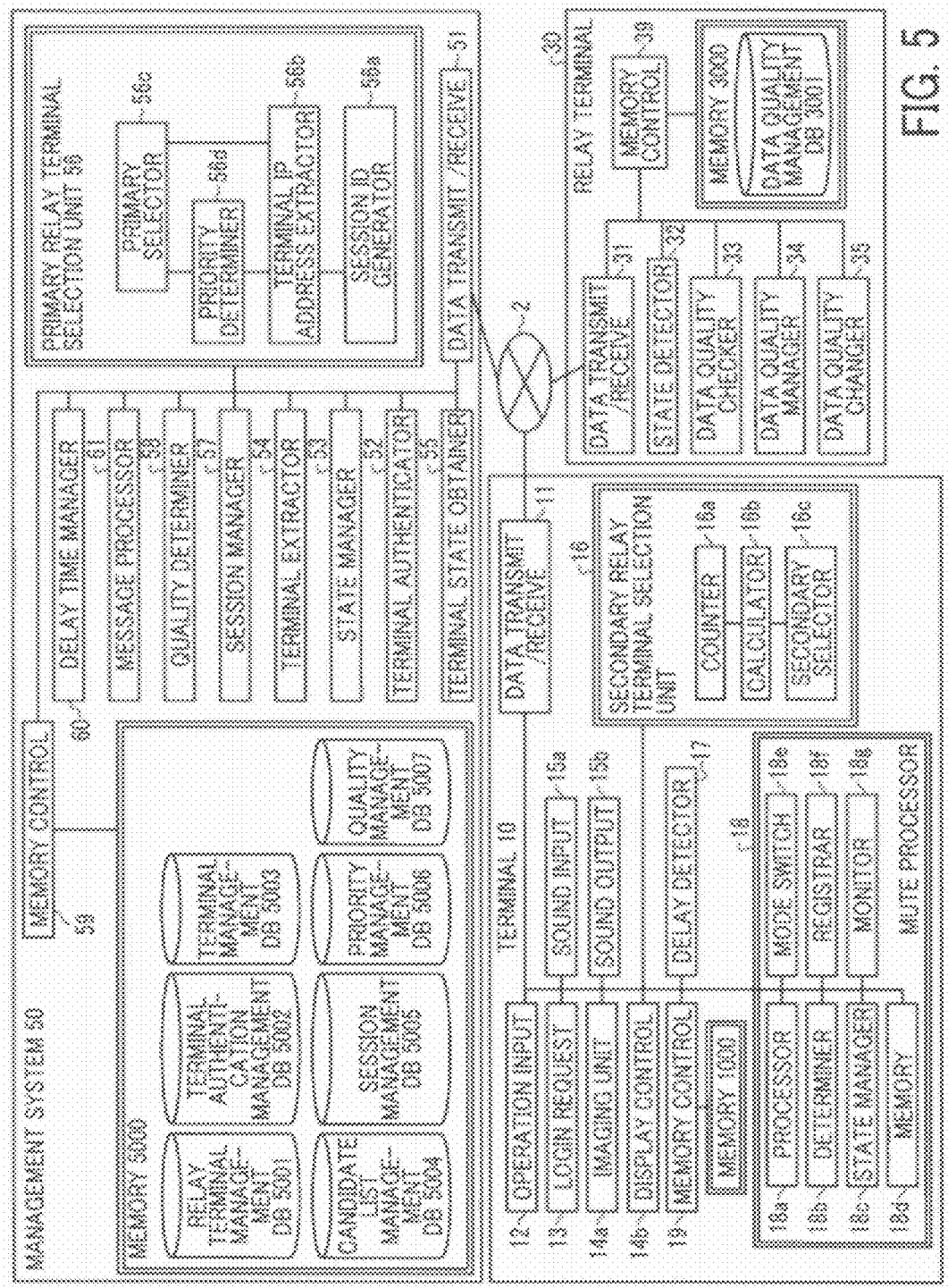
FIG. 5 is a schematic block diagram illustrating functional structures of the communication management system, the terminal, and the relay terminal, of the communication system of FIG. 1.

Referring now to FIG. 5, a functional structure of the communication system 1 of FIG. 1 is explained according to an example embodiment of the present invention. More specifically, FIG. 5 illustrates a functional structure of the communication terminal 10, the relay terminal 30, and the communication management system 50. As illustrated in FIG. 1, the terminal 10, the relay terminal 30, and the management system 50 exchange data with one another through the communication network 2. In FIG. 5, the program providing system 90 of FIG. 1 is omitted.

<Functional Structure of Terminal>

The terminal 10 includes a data transmit/receive 11, an operation input 12, a login request 13, an imaging unit 14a, a display control 14b, a sound input 15a, a sound output 15b, a secondary relay terminal selection unit 16, a delay detector 17, a mute processor 18, and a memory control 19. These units shown in FIG. 5 correspond to a plurality of functions or functional modules, which are executed according to an instruction of the CPU 101 (FIG. 2) that is generated according to the terminal control program being loaded from the ROM 102 onto the RAM 103. The terminal 10 further includes a memory 1000 that may be implemented by the SSD 105 of FIG. 2.

The mute processor 18, which controls the mute function, includes a processor 18a, a determiner 18b, a state manager 18c, a memory 18d, a mode switch 18e, a registrar 18f, and a monitor 18g.

(Functional Structure of Terminal)

Next, a functional structure of the terminal 10 is explained with reference to FIG. 5. The data transmit/receive 11, which may be implemented by the network I/F 111 (FIG. 2), transmits or receives various data or information to or from another terminal, device, or system, through the communication network 2.

The operations or functions of the operation input 12 of the terminal 10 of FIG. 5 are performed by the operation button 108 and the power switch 109 (FIG. 2) according to an instruction received from the CPU 101. The operation input 12 receives a user instruction input by the user through the operation button 108 or the power switch 109. For example, when the user selects "ON" using the power switch 109, the operation input 12 receives a user instruction for turning the power on, and causes the terminal 10 to turn on the power.

The operations or functions of the login request 13 are performed according to an instruction received from the CPU 101. When the power of the terminal 10 is turned on, the login request 13 automatically causes the data transmit/receive 11 to send login request information that requests the login process, and a current IP address of the terminal 10, to the management system 50 through the communication network 2

The operations or functions of the imaging unit 14a of the terminal 10 of FIG. 5 are performed by the camera 112 and the imaging element I/F 113 according to an instruction received from the CPU 101. The imaging unit 14a takes an image of an object to output image data of the object. The display control 14b may be implemented by the display I/F 117 (FIG. 2), and sends various data to the display 11 for display.

The operations or functions of the sound input 15a of the terminal 10 of FIG. 5 are performed by the sound I/O I/F 116 according to an instruction received from the CPU 101, in cooperation with any one of the internal microphone 114, a part of the operation button 108 functioning as the mute button of the internal microphone 114, the external microphone 114a, and the mute button 114b. After the internal microphone 114 or the external microphone 114a converts voice of the user at the terminal 10 to a voice signal, the sound input 15a inputs the voice signal in the form of voice data for further processing.

The operations or functions of the sound output 15b of the terminal 10 of FIG. 5 are performed by the sound I/O I/F 116 according to an instruction received from the CPU 101, in cooperation with any one of the internal speaker 115, the external speaker 115a, a part of the operation button 108 functioning as the volume adjuster button of the internal speaker 115, and the volume adjuster button 115b. The sound output 15b outputs a voice signal of voice data that is received from the counterpart terminal 10 through the speaker 115 or the external speaker 115a.

The secondary relay terminal selection unit 16 selects one of the relay terminals 30 that is suitable for communication to start videoconference. More specifically, according to an instruction received from the CPU 101 (FIG. 2), the secondary relay terminal selection unit 16 performs selection of the relay terminal 30 using a counter 16a, a calculator 16b, and a secondary selector 16c. The counter 16a obtains date and time information indicating the date and time at which the data transmit/receive 11 of the terminal 10 receives preparatory transmit information when the preparatory transmit information is transmitted from another terminal 10. The calculator 16b calculates a time period T between the time when the preparatory information is transmitted by another terminal 10 and the time when the preparatory information is received at the terminal 10, based on the difference between the time and date information obtained by the counter 16a and time and date information included in the preparatory transmit information. The secondary selector 16c selects one of the relay terminals 30 having the minimum value of the time period T calculated by the calculator 16b.

The delay detector 17 detects a delay time ms indicating a time period in which contents data such as image data or voice data sent through the relay terminal 30 from another terminal 10 is delayed, according to an instruction received from the CPU 101 (FIG. 2).

The memory control 19 is implemented by the SSD 105 (FIG. 2) according to an instruction received from the CPU 101. The memory control 19 stores various data in the memory 1000, or read out various data from the memory 1000. The memory 1000 stores therein various data such as terminal identification (ID) information for identifying the terminal 10, a password for authenticating a user at the terminal 10, image data, and voice data. The memory 1000 overwrites its memory space to store image data and/or voice data every time the terminal 10 communicates with another terminal 10. Before overwriting image data with new image data, the memory control 19 reads out the image data for display on the display 11, and the voice data for output through the internal speaker 115 or the external speaker 115a.

In this example, any one of the terminal ID of the terminal 10 and the relay terminal ID of the relay terminal 30 includes any type of identification information that can be expressed by any language, character, symbol, mark, or any combination of language, character, symbol, and mark.

The mute processor 18 controls mute processing of the terminal 10, for example, by activating or inactivating the mute function of the terminal 10 through the sound input 15a according to a user instruction. In this example, the mute processor 18 may be realized by the CPU 201, which operates in cooperation with the sound I/O I/F 116 functioning as the sound input 15a and/or the sound output 15b. Further, as described below, the mute processor 18 determines that the mute function of the terminal 10 is activated when a sound input device, such as the external microphone 114a, connected to the sound I/O I/F 116 activates its mute function such that the sound signal is not input to the sound I/O I/F 116 or the volume level of the sound signal is minimized. The mute processor 18 determines that the mute function of the terminal 10 is activated when it is determined that the sound I/O I/F 116 activates its mute function, either by blocking the sound signal or by minimizing the volume level of the sound signal. It is to be noted that examples of the mute on state of the terminal 10 are not limited to the examples described in this specification.

The processor 18a controls entire mute processing. The processor 18a obtains information indicating whether the mute function of the terminal 10 is activated, and causes the state manager 18c to generate and send notification indicating the mute state of the terminal 10. For example, the processor 18a obtains information indicating whether the mute function of the external microphone 114a is turned on, and information regarding the counterpart terminal 10B to which information regarding the mute state of the external microphone 114a at the request terminal 10A is to be transmitted. Based on the obtained information, the processor 18a sends an instruction to the state manager 18c to cause the state manager 18c to generate and send notification regarding the mute state of the external microphone 114a to the counterpart terminal 10B. The processor 18a further controls operation of registering a new external microphone 114a, which has not been registered to the terminal 10.

The determiner 18b determines a type of the external microphone 114a, for example, based on information obtainable from the external microphone 114a. Examples of the microphone type include, but not limited to, a microphone name, a model name, a model number, and a manufacturing name of the external microphone 114a. The determiner 18b determines the mute state of the external microphone 114a, which indicates whether the external microphone 114a is in the mute on state, the mute off state, or the mute none state, for example, by referring to information stored in the memory 18d.

The state manager 18c obtains information indicating the mute state of the terminal 10, generates notification indicating the mute state of the terminal 10, and sends notification to another terminal 10 to notify whether the terminal 10 is in the mute on state.

The memory 18d stores various information such as registration information indicating the type of the external microphone 114a that is previously registered to the terminal 10, settings of the mute state of the external microphone 114a, or the mute state data indicating whether the external microphone 114a is in the mute on state.

The mode switch 18e allows the user to change the operation mode of the terminal 10 between a conference mode in which videoconference is performed and a microphone registration mode in which registration of a new microphone 114a is performed. In the conference mode, the mute state data regarding the mute state of the microphone 114a is notified.

When registering a new microphone 114a to the terminal 10, the registrar 18f measures characteristics of the microphone 114a to be registered, and registers the microphone 114a to the terminal 10.

The monitor 18g monitors the volume level of a sound signal output from the sound output 15b, and sends information indicating that the volume is changed to the state manager 18c when any change in volume is detected. For example, the monitor 18g monitors whether the volume of sounds output from the sound output 15b is set to minimum. When it is determined that the volume level of the sound signal output from the sound output 15b is set to minimum, the monitor 18g causes the sound input 15a to turn on the mute function.

Referring to FIG. 6, operation and function of the sound input 15a and the sound output 15b of FIG. 5 are explained according to an example embodiment of the present invention.

Figure 6A:
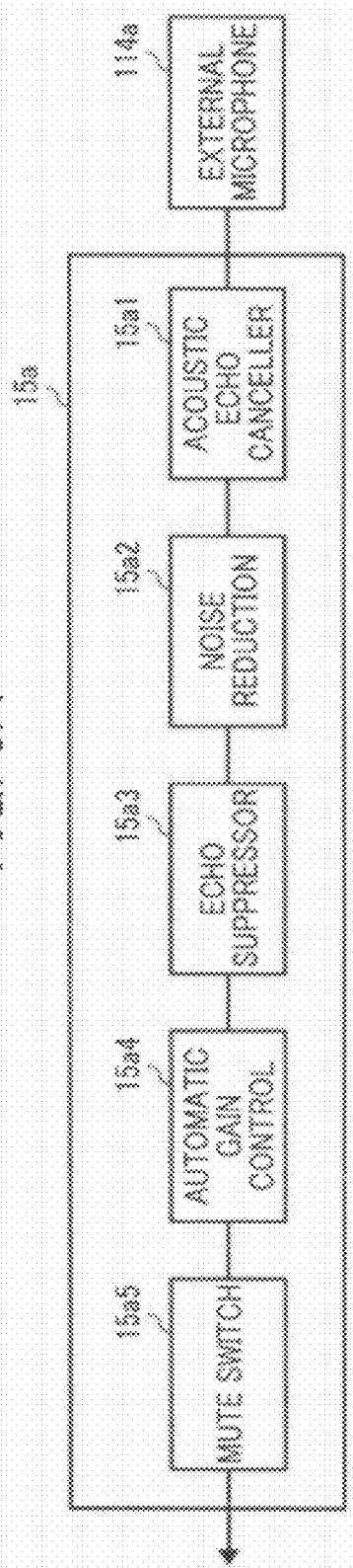
FIGS. 6A and 6B are a schematic block diagram illustrating circuit structures of a sound input and a sound output of the terminal of FIG. 5.

FIG. 6A illustrates a circuit structure of the sound input 15a to which the external microphone 114a is connected. The sound input 15a includes an acoustic echo canceller circuit 15a1, a noise reduction circuit 15a2, an echo suppressor circuit 15a3, an automatic gain control circuit 15a4, and a mute switch 15a5. The sound input 15a is input with a sound signal received through the external microphone 114a.

The acoustic echo canceller 15a1 removes echo signals form the input signal. When the sound collected by the microphone at the request terminal 10 is output through a speaker at the counterpart terminal 10, the microphone at the counterpart terminal 10 picks up this sound and sends it back to the request terminal 10 for output through the speaker at the request terminal 10, thus causing echo. The acoustic echo canceller 15a1 is in compliance with the ITU-T (International Telecommunication Union Telecommunication standardization sector) Recommendation G.16.

The noise reduction 15a2 detects noise signals, which may be generated by any peripheral devices of the terminal 10 such as computers, projectors, or air conditioners, and reduces the detected noise signals, for example, using spectral subtraction method.

The echo suppressor 15a3 is provided downstream of the acoustic echo canceller 15a1 to remove echo signals, which may be still present after being processed by the acoustic echo canceller 15a1. For example, echo signals may be present when the acoustic echo canceller 15a1 does not efficiently work due to nonlinearity of echo signals, noises, two-way communication such as double talk, etc. The echo suppressor 15a3 is made in compliance with the ITU-T Recommendation G. 165.

The automatic gain control 15a4 keeps the output signal level constant regardless of whether the input signal level is high or low. For example, when the input signal is low, the sensitivity is made high so as to keep the output signal level constant. When the input signal is high, the sensitivity is made low so as to keep the output signal level constant.

The mute switch 15a5 detects the on or off of the mute button 114b of the external microphone 114a, which is pressed by the user of the external microphone 114a. According to the detection of the on or off of the mute button 114b, the mute switch 15a5 controls passing of the signal input from the circuits located upstream of the mute switch 15a5, such as the echo suppressor 15a3 and the automatic gain control 15a4. In alternative or in addition to turning on or off the mute function based on detection of the on or off of the mute button 114b of the external microphone 114a, the mute switch 15a5 may turn on or off the mute function based on instructions received from the monitor 18g.

Figure 6B:
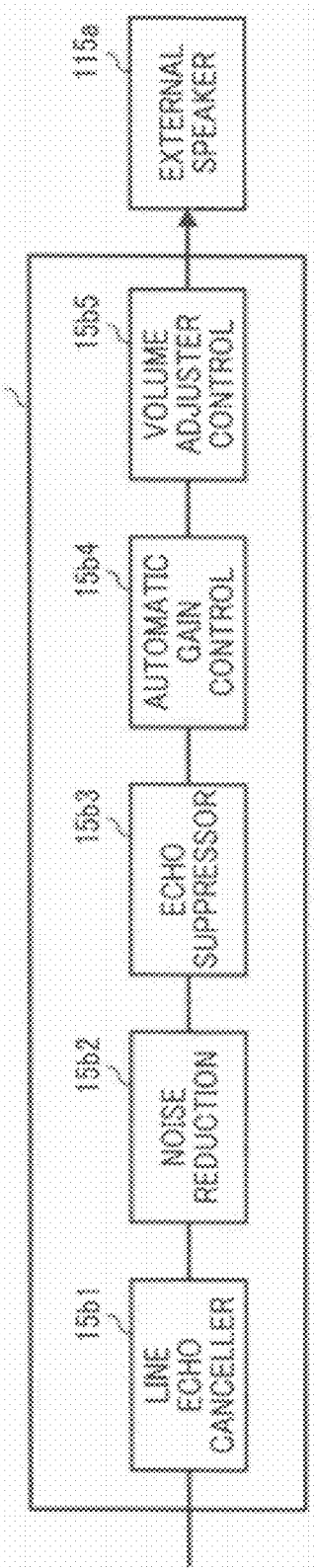

FIG. 6B illustrates a circuit structure of the sound output 15b to which the external speaker 115a is connected. The sound output 15b includes a line echo canceller circuit 15b1, a noise reduction circuit 15b2, an echo suppressor circuit 15b3, an automatic gain control circuit 154b, and a volume adjuster control circuit 15b5.

The sound output 15b outputs a sound signal, which is processed by the line echo canceller 15b, the noise reduction 15b2, the echo suppressor 15b3, the automatic gain control 15b4, and the volume adjuster control 15b5, to the external speaker 115a. Based on the received signal, the external speaker 115a outputs sounds.

The line echo canceller 15b1 removes the line echo, which may be caused in the Internet Protocol or telephone line, to keep the quality of communication sufficient for double talk. The line echo canceller 15b1 is made in compliance with the ITU-T Recommendation G.168.

The noise reduction 15b2, the echo suppressor 15b3, the automatic gain control 15b4 of the sound output 15b are substantially similar in function and structure to the noise reduction 15a2, the echo suppressor 15a3, and the automatic gain control 15a4 of the sound input 15a.

The volume adjuster control 15b5 changes the volume level of the sound signal processed by the automatic gain control 15b4, according to an instruction for adjusting the volume that is input through the volume adjuster button 115b of the external speaker 115a. As described above, the monitor 18g of the mute processor 18 monitors the change in volume of the sound signal, for example, by monitoring the sounds output from the speaker 115a or by monitoring the signal processed by the volume adjuster control 15b5.

In this example illustrated in FIGS. 6A and 6B, the sound input 15a and the sound output 15b each have circuit structures that are separate from each other. Alternatively, any desired portion of the circuits of the sound input 15a and the sound output 15b may be commonly shared, thus reducing the overall circuit size. For example, any one of the automatic gain control, the echo suppressor, and the noise reduction may be made in common.

Alternatively, any one of the above-described circuits illustrated in FIGS. 6A and 6B may be implemented by software, such as the audio mixer API.

(Functional Structure of Relay Terminal)

Still referring to FIG. 5, a functional structure of the relay terminal 30 is explained according to an example embodiment of the present invention. The relay terminal 30 includes a data transmit/receive 31, a state detector 32, a data quality checker 33, a data quality manager 34, a data quality changer 35, and a memory control 39. Upon execution, the CPU 201 (FIG. 4) loads the relay terminal control program from the HD 204 onto the RAM 203 to cause one or more of the units illustrated in FIG. 4 to perform functions or operations shown in FIG. 5. The relay terminal 30 further includes a memory 3000 that may be implemented by the HD 204 (FIG. 4).

(Data Quality Management Table)

The memory 3000 includes a data quality management database (DB) 3001, which stores a data quality management table illustrated in FIG. 8. The data quality management table of FIG. 8 stores an Internet protocol (IP) address of the counterpart terminal 10B to which image data is transmitted through the relay terminal 30, in association with quality of image data to be transmitted through the relay terminal 30 to the counterpart terminal 10B.

Referring now to FIGS. 7A to 7C, various image data having different resolution levels, which are respectively transmitted by the terminal 10 of the communication system 1, are explained. Referring to FIG. 7A, the low-level resolution image data, which functions as a base image, has 160 pixels in the horizontal direction and 120 pixels in the vertical direction. Referring to FIG. 7B, the medium-level resolution image data has 320 pixels in the horizontal direction and 240 pixels in the vertical direction. Referring to FIG. 7C, the high-level resolution image data has 640 pixels in the horizontal direction and 480 pixels in the vertical direction. In case of communicating with a narrowband signal line, low-quality image data that is generated based on the low-level resolution image data, which is the base image, is transmitted. In case of communicating with a wideband signal line, medium-quality image data that is generated based on the low-level resolution image data and the medium-level resolution image data is transmitted. In case of communicating with a broadband signal line, high-quality image data that is generated based on the low-level resolution image data, the medium-level resolution image data, and the high-level resolution image data is transmitted. Any one of the above-described types of image data may be transmitted together with voice data.

For example, the data quality management table of FIG. 8 indicates that, in case of relaying image data to the counterpart terminal 10 having the IP address of "1.3.2.4", the quality of the image data to be relayed is high image quality.

<Functional Structure of Relay Terminal>

Next, a functional structure of the relay terminal 30 is explained according to an example embodiment of the present invention. More specifically, in this example, the operations or functions that are performed by the relay terminal 30, which include the operations or functions performed by the units shown in FIG. 5, are performed in relation to one or more hardware devices of the relay terminal 30 that are shown in FIG. 4.

The data transmit/receive 31 of FIG. 5 is implemented by the network I/F 209 of FIG. 4 according to an instruction received from the CPU 201. The data transmit/receive 31 transmits or receives various data or information to or from another terminal, device, or system through the communication network 2.

The state detector 32, which is implemented by the CPU 201 of FIG. 4, detects an operation state of the relay terminal 30. For example, the operation state includes the on-line state ("ON LINE"), the off-line state ("OFF LINE"), the communicating state, the holding state, and the error state. The on-line state is a state in which the relay terminal 30 is turned on and available for data transmission/reception. The off-line state is a state in which the relay terminal 30 is not available for data transmission/reception, for example, as the power is not turned on. The communicating state is a state in which the relay terminal 30 is on-line, but is communicating with another terminal. The holding state is a state in which the relay terminal 30 is on-line, but is not available at least for temporarily. The error state is a state in which the relay terminal 30 is not available due to an error.

The data quality checker 33, which is implemented by the CPU 201 of FIG. 4, searches the data quality management DB 3001 (FIG. 8) using the IP address of the counterpart terminal 10B as a search key to extract information regarding the quality of image data suitable to communication with the counterpart terminal 10B. Based on the extracted information regarding the quality of image data, the relay terminal 30 determines the quality of image data to be transmitted to the counterpart terminal 10B.

The data quality manager 34, which may be implemented by the CPU 201 of FIG. 4, changes the contents of the data quality management DB 3001 based on the quality information that is received from the management system 50. For example, assuming that the request terminal 10aa having the terminal ID "01aa" communicates with the counterpart terminal 10db having the terminal ID "01db" to transmit or receive high quality image data during videoconference, transmission of image data may delay for various reasons. For example, if a request terminal 10bb and a counterpart terminal 10ca start videoconference over the communication network 2, transmission of image data from the request terminal 10aa to the counterpart terminal 10db tends to slow down due to the increase in traffic. In such case, the relay terminal 30 changes the quality of image data to be transmitted from high image quality to lower image quality. More specifically, the contents in the data quality management DB 3001 is changed from high-level image quality to medium-level image quality, based on the quality information indicating the use of medium-level image quality.

The data quality changer 35, which may be implemented by the CPU 201 of FIG. 4, changes the quality of image data received from the request terminal 10 to the quality of image data according to the contents of the data quality management DB 3001. The memory control 39 is implemented by the HDD 205 of FIG. 4 according to an instruction received from the CPU 201. The memory control 39 stores various data in the memory 3000, or reads out various data from the memory 3000.

<Functional Structure of Communication Management Apparatus>

Next, a functional structure of the communication management system 50 is explained according to an example embodiment of the present invention. In this example, the operations or functions that are performed by the communication management system 50, which include the operations or functions performed by the units shown in FIG. 5, are performed in relation to one or more hardware devices of the communication management system 50 that are shown in FIG. 4. Referring to FIG. 5, the communication management system 50 includes a data transmit/receive 51, a terminal authenticator 52, a state manager 53, a terminal extractor 54, a terminal state obtainer 55, a primary relay terminal selection unit 56, a session manager 57, a quality determiner 58, a memory control 59, a delay time manager 60, and a message processor 61. Upon execution, the CPU 201 (FIG. 4) loads the communication management program from the HD 204 onto the RAM 203 to cause the units shown in FIG. 4 to perform operations or functions as illustrated in FIG. 5. The communication management system 50 further includes a memory 5000, which may be implemented by the HD 204 of FIG. 4.

(Relay Terminal Management Table)

The memory 5000 includes a relay terminal management database (DB) 5001, which stores therein a relay terminal management table of FIG. 9. The relay terminal management table of FIG. 9 stores, for each relay terminal ID of the terminal 30, the operation state of the relay terminal 30, the received date and time at which the management system 50 receives the state information indicating the operation state of the relay terminal 30 from the relay terminal 30, the IP address of the relay terminal 30, and the maximum data transmission speed of the relay terminal 30 in Mbps. For example, for the relay terminal 30a having the relay terminal ID "111a", the relay terminal management table indicates that the operation state is "ON LINE", the received date and time at which the management system 50 receives the state information is "13:00 PM of Nov. 10, 2009", the IP address of the relay terminal 30a is "1.2.1.2", and the maximum data transmission speed of the relay terminal 30a is 100 Mbps.

(Terminal Authentication Management Table)

The memory 5000 further includes a terminal authentication management database (DB) 5002, which stores a terminal authentication management table of FIG. 10. The terminal authentication management table of FIG. 10 stores a plurality of terminal IDs respectively assigned to the terminals 10 that are managed by the management system 50, in association with a plurality of passwords that are previously determined for the respective terminals 10. For example, referring to the terminal authentication management table of FIG. 10, the terminal 10aa having the terminal ID "01aa" is assigned with the password "aaaa".

(Terminal Management Table)

The memory 5000 further includes a terminal management database (DB) 5003, which stores a terminal management table of FIG. 11. The terminal management table of FIG. 11 stores, for each one of the terminal IDs assigned to the terminals 10, the operation state of the terminal 10, the received date and time at which the management system 50 receives the login request information from the terminal 10, and the IP address of the terminal 10. For example, for the terminal 10aa having the terminal ID "01aa", the terminal management table of FIG. 11 indicates that the operation state of the terminal 10aa is on-line ("ON LINE"), the received date and time is "13:40 PM, Nov. 10, 2009", and the IP address of the terminal 10aa is "1.2.1.3". The terminal management table of FIG. 11 may additionally store the terminal name to be used for communication with the terminal 10, such as the terminal name "Japan Tokyo Office AA terminal" in case of the terminal 10aa. As described below, the terminal management database (DB) 5003 may store information regarding the mute state of one or more terminals 10 managed by the communication system 50, for example, in the form of table illustrated in FIG. 27.

(Candidate List Management Table)

The memory 5000 further includes a candidate list management database (DB) 5004, which stores a candidate list management table of FIG. 12. The candidate list management table of FIG. 12 stores, for each one of a plurality of request terminals 10A capable of requesting for videoconference communication, the terminal ID of the request terminal 10A, and one or more terminal IDs that are respectively assigned to candidate terminals 10 that are previously registered for the request terminal 10A. In this example, for the request terminal 10A, one or more terminals 10 of the communication system 1 of FIG. 1 are previously registered as the candidate terminal 10. For example, the candidate list management table of FIG. 12 indicates that the request terminal 10aa having the terminal ID "01aa" is most likely to request for videoconference with respect to the terminal 10ab having the terminal ID "01ab", the terminal 10ba having the terminal ID "01ba", and the terminal 10db having the terminal ID "01db". The management system 50 manages the candidate list management table of FIG. 12, for example, according to a user instruction received from any one of the terminals 10. For example, in response to a user instruction received from the terminal 10aa, the management system 50 may add or delete the contents of the candidate list management table of FIG. 12.

(Session Management Table)

The memory 5000 further includes a session management database (DB) 5005, which stores a session management table of FIG. 13. The session management table of FIG. 13 stores information regarding each of the sessions that are carried out by at least two terminals 10 of the communication system 1 for the purpose of selecting the relay terminal 30 that is most suitable for communication between at least two terminals 10. More specifically, for each session ID that uniquely identifies each session, the session management table of FIG. 13 stores a relay terminal ID of the relay terminal 30 to be used for transmitting or receiving contents data such as image data and voice data, a terminal ID of the request terminal 10A, a terminal ID of the counterpart terminal 10B, a delay time ms indicating a time period required for receiving contents data at the counterpart terminal 10B, the date and time information indicating the time at which the management system 50 receives delay information from the counterpart terminal 10B. For example, referring to the session management table of FIG. 13, for the session having the session ID "se1", the relay terminal 30a having the relay terminal ID "111a" is selected to relay contents data between the request terminal 10aa having the terminal ID "01aa" and the counterpart terminal 10db having the terminal ID "01db". Further, the management system 50 receives the delay information from the counterpart terminal 10db at 14:00 PM, Nov. 10, 2009. Based on this date and time information, the delay time ms of 200 milliseconds (ms) is obtained. In case of having videoconference between only two terminals 10, the delay time may be determined based on the time when the management system 50 receives the delay information transmitted from the request terminal 10A rather than based on the time when the management system 50 receives the delay information transmitted from the counterpart terminal 10B. In case of having videoconference with more than two terminals 10, the delay information transmitted from the counterpart terminal 10B that receives the contents data is used to manage the date and time at which the delay information is received.

(Address Priority Management Table)

The memory 5000 further includes a priority management database (DB) 5006, which stores an address priority management table of FIG. 14. The address priority management table of FIG. 14 defines a number of address priority points to be assigned to an arbitrary set of terminal 10 and relay terminal 30 based on the degree of similarity between the IP address of the terminal 10 and the IP address of the relay terminal 30. Assuming that the IP address of the terminal 10 and the IP address of the relay terminal 30 are each expressed in the form of four digital numbers as described above referring to FIG. 1, as the degree of similarity between the terminal IP address and the relay terminal IP address increases, a larger number of address priority points is assigned. In FIG. 14, the "S" indicates that one digit of the IP address, which may be referred to as the dot address, is the same for both of the terminal 10 and the relay terminal 30. The "D" indicates that one digit of the IP address, or the dot address, is different between the terminal 10 and the relay terminal 30. More specifically, in this example, when the first to third digits or dot addresses are the same between the terminal 10 and the relay terminal 30, the address priority point is 5. When the first and second digits or dot addresses are the same between the terminal 10 and the relay terminal 30, the address priority point is 3. In such case, the fourth digit or dot address does not affect the address priority point. When the first digit or dot address is the same between the terminal 10 and the relay terminal 30, the address priority point is 1. In such case, the third and fourth digits or dot addresses do not affect the address priority point. When the first digit or dot address is different between the terminal 10 and the relay terminal 30, the address priority point is 0. In such case, the second to fourth digits or dot addresses do not affect the address priority point.

(Transmission Speed Priority Management Table)

The priority management DB 5006 of the memory 5000 further includes a transmission speed priority management table of FIG. 15. The transmission speed priority management table of FIG. 15 stores a range of the maximum data transmission speeds in association with a transmission speed priority point. More specifically, the transmission speed priority management table of FIG. 15 indicates that the transmission speed priority point increases with the increase in value of the maximum data transmission speeds at the relay terminal 30. For example, referring to FIG. 15, when the maximum data transmission speed at the relay terminal 30 is equal to or greater than 1000 Mbps, the transmission speed priority point of 5 is assigned. For example, when the maximum data transmission speed at the relay terminal 30 is equal to or greater than 100 Mbps but less than 1000 Mbps, the transmission speed priority point of 3 is assigned. When the maximum data transmission speed at the relay terminal 30 is equal to or greater than 10 Mbps but less than 100 Mbps, the transmission speed priority point of 1 is assigned. When the maximum data transmission speed at the relay terminal 30 is less than 10 Mbps, the transmission speed priority point of 0 is assigned.

(Quality Management Table)

The memory 5000 further includes a quality management database (DB) 5007, which stores a quality management table of FIG. 16. The quality management table of FIG. 16 stores the delay time ms of image data in association with the quality of image data. More specifically, the quality management table of FIG. 16 indicates that the quality of image data to be processed by the relay terminal 30 is lowered, as the delay time ms of the image data at the request terminal 10A or the counterpart terminal 10B increases. For example, when the delay time ms is equal to or greater than 0 milliseconds (ms), but less than 100 ms, the image data quality is high. When the delay time ms is equal to or greater than 100 ms but less than 300 ms, the image data quality is medium. When the delay time ms is equal to or greater than 300 but less than 500 ms, the image data quality is low. When the delay time ms is equal to or greater than 500 ms, the management system 50 interrupts operation of transmitting data.

(Functional Structure of Management System)

Referring back to FIG. 5, the data transmit/receive 51, which may be implemented by the network I/F 209 (FIG. 4) according to an instruction received from the CPU 201, transmits or receives various data or information to or from another terminal, device, or system through the communication network 2.

Under control of the CPU 201 (FIG. 4), the terminal authenticator 52 obtains a terminal ID and a password from the login request information that is received from the data transmit/receive 51. Using the terminal ID and the password as a search key, the terminal authenticator 52 searches the terminal authentication management DB 5002 (FIG. 10) to determine whether the obtained set of terminal ID and password is registered. Based on the search result, the terminal authenticator 52 determines whether the user at the terminal 10 or the terminal 10 is allowed for access.

The state manager 53, which operates according to an instruction received from the CPU 201 (FIG. 4), manages the operation state of the request terminal 10A that sends the login request information using the terminal management DB 5003 (FIG. 11). More specifically, the state manager 53 stores the terminal ID of the request terminal 10A, the operation state of the request terminal 10A, the date and time at which the management system 50 receives the login request information from the request terminal 10A, and the IP address of the request terminal 10A.

The terminal extractor 54, which operates according to an instruction received from the CPU 201 (FIG. 4), searches the candidate list management DB 5004 (FIG. 12) using the terminal ID of the request terminal 10A as a key to obtain a list of terminal IDs each being assigned to a plurality of candidate terminals 10. Additionally, the terminal extractor 54 searches the candidate list management DB 5004 (FIG. 12) using the terminal ID of the request terminal 10A as a key to obtain a terminal ID of another request terminal 10A that registers the request terminal 10A as a candidate terminal for another request terminal 10A.

The terminal state obtainer 55, which operates under control of the CPU 201 (FIG. 4), searches the terminal management DB 5003 (FIG. 11) using the terminal ID of each candidate terminal 10 that is extracted by the terminal extractor 54 as a key to obtain the state information of each candidate terminal 10. Accordingly, the terminal state obtainer 55 obtains the operation state of each of the candidate terminal 10 that is previously determined for the request terminal 10A that sends the login request information. Further, the terminal state obtainer 55 searches the terminal management DB 5003 using the terminal ID extracted by the terminal extractor 54 as a key to obtain the state information of the request terminal 10A that sends the login request information.

The primary relay terminal selection unit 56, which operates according to an instruction received from the CPU 201 (FIG. 4), limits a number of relay terminals 30 each of which is a candidate relay terminal 30 that may be used for relaying contents data between at least two terminals 10. Based on the result obtained by the primary relay terminal selection unit 56, the secondary relay terminal selection unit 16 of the terminal 10 selects one terminal 30 that is most suitable for communication between at least two terminals 10. As illustrated in FIG. 5, the primary relay terminal selection unit 56 includes a session ID generator 56a, a terminal IP address extractor 56b, a primary selector 56c, and a priority determiner 56d.

The session ID generator 56a of the primary relay terminal selection unit 56 generates a session ID for identifying a session that is used for selecting the relay terminal 30. The terminal IP address extractor 56b extracts the terminal ID of the request terminal 10A and the terminal ID of the counterpart terminal 10B respectively from the session request information received from the request terminal 10A, and searches the terminal management DB 5003 (FIG. 11) to obtain the IP address of the request terminal 10A and the IP address of the counterpart terminal 10B. The primary selector 56c selects one or more relay terminals 30 having the online state from the relay terminal management DB 5001 (FIG. 9) to obtain the relay terminal ID of the selected relay terminal 30. In this example, it is assumed that more than two relay terminals 30 are selected as having the on-line state.

Further, the primary selector 56c obtains the IP address of each of the selected relay terminals 30. Once the IP address of the relay terminal 30 is obtained for each relay terminal 30, the primary selector 56c compares the IP address of the relay terminal 30 with at least one of the IP address of the request terminal 10A and the IP address of the counterpart terminal 10B that are respectively obtained by the terminal IP address extractor 56b to analyze the degree of similarity between the IP address of the terminal 10 and the IP address of the relay terminal 30. More specifically, the primary selector 56c compares between the IP address of the terminal 10 and the IP address of the relay terminal 30, digit by digit, or dot address by dot address, to determine the degree of similarity. Using the address priority management table of FIG. 14, the primary selector 56c obtains the address priority point for each one of the relay terminals 30. Assuming that the primary selector 56c compares the IP address of the terminal 10 with the IP address of the relay terminal 30, respectively for the request terminal 10A and the counterpart terminal 10B, the primary selector 56c obtains two address priority points for each one of the relay terminals 30. In such case, the primary selector 56c selects the highest one of the address priority points as the address priority point for the relay terminal 30.

Additionally, for each of the selected relay terminals 30 having the on-line state, the primary selector 56c obtains the maximum data transmission speed of the relay terminal 30 from the relay terminal management table of FIG. 9. Using the transmission speed priority management table of FIG. 15, the primary selector 506c obtains the transmission speed priority point that corresponds to the maximum data transmission speed of the selected relay terminal 30, for each of the selected relay terminals 30.

For each of the relay terminals 30, the primary selector 56c obtains a total priority point by adding the address priority point and the transmission speed priority point together. In this example, the primary selector 56c selects two relay terminals 30 including the relay terminal 30 having the highest total priority point and the relay terminal 30 having the second highest total priority point.

In this example, a number of relay terminals 30 that is finally selected by the primary selector 56c is not limited to two such that more than two relay terminals 30 may be finally selected for further processing as long as a number of relay terminals 30 is sufficiently reduced.

The priority determiner 56d refers to the priority management DB 5006 (FIG. 14) to determine the address priority point for each one of the relay terminals 30 that is selected by the primary selector 56c. The priority determiner 56d obtains the maximum data transmission speed of the relay terminal 30 from the relay terminal management DB 5001 (FIG. 9), and refers to the priority management DB 5006 (FIG. 15) to obtain the transmission speed priority point of the relay terminal 30 that is selected by the primary selector 56c.

Referring back to FIG. 4, the session manager 57, which operates according to an instruction received from the CPU 201, stores the session ID generated by the session ID generator 56a, the terminal ID of the request terminal 10A, and the terminal ID of the counterpart terminal 10B, in a corresponding manner, in the session management DB 5005 (FIG. 13) of the memory 5000. The session manager 57 further stores the relay terminal ID of the relay terminal 30 that is finally selected by the secondary selector 16c of the terminal 10 for each session ID, in the session management DB 5005 (FIG. 13).

The quality determiner 58, which operates according to an instruction received from the CPU 201 (FIG. 4), searches the quality management DB 5007 (FIG. 16) using the delay time ms obtained for the selected relay terminal 30 to obtain the image data quality that is desirable for communication using the relay terminal 30.

The memory control 59, which operates according to an instruction received from the CPU 201 (FIG. 4) in relation with the HDD 205 (FIG. 4), stores various data in the memory 5000 or read out various data from the memory 5000.

The delay time manager 60 searches the terminal management DB 5003 (FIG. 11) using the IP address of the counterpart terminal 10B to obtain the terminal ID of the counterpart terminal 10B. The delay time manager 60 further manages the session management table of FIG. 13 stored in the session management DB 5005 so as to keep updated the value stored in the "delay time" field for the obtained terminal ID of the counterpart terminal 10B.

The message processor 61 analyzes contents of a message, when the data transmit/receive 51 receives the message from the terminal 10 addressed to another terminal 10, and transmits the message to the destination terminal 10.

<Operations of Communication System>

Figure 17:
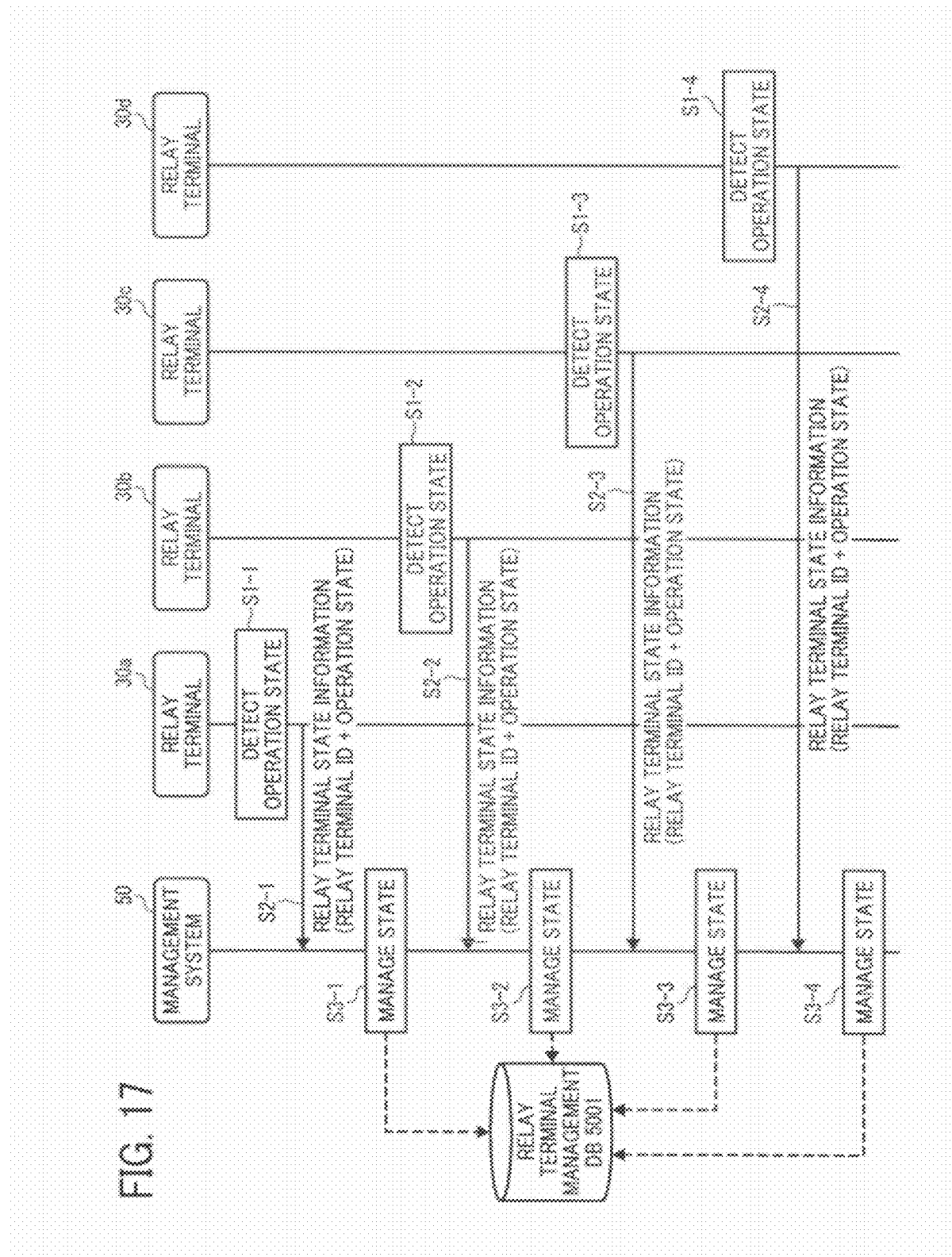
FIG. 17 is a data sequence diagram illustrating operation of managing state information indicating an operation state of the relay terminal of the communication system of FIG. 1, according to an example embodiment of the present invention.
Figure 18:
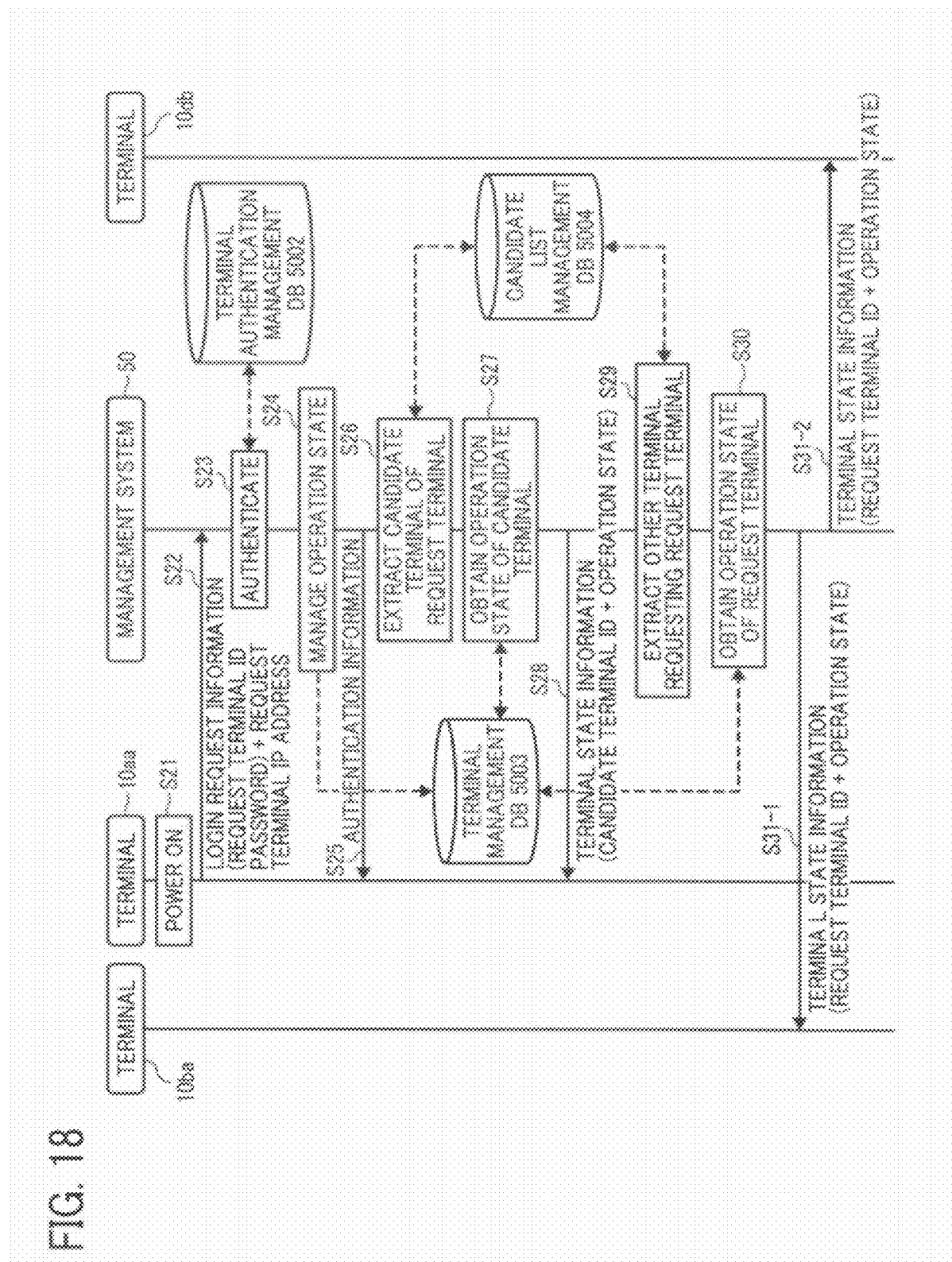
FIG. 18 is a data sequence diagram illustrating operation of establishing communication among two or more terminals of the communication system of FIG. 1, according to an example embodiment of the present invention.
Figure 19:
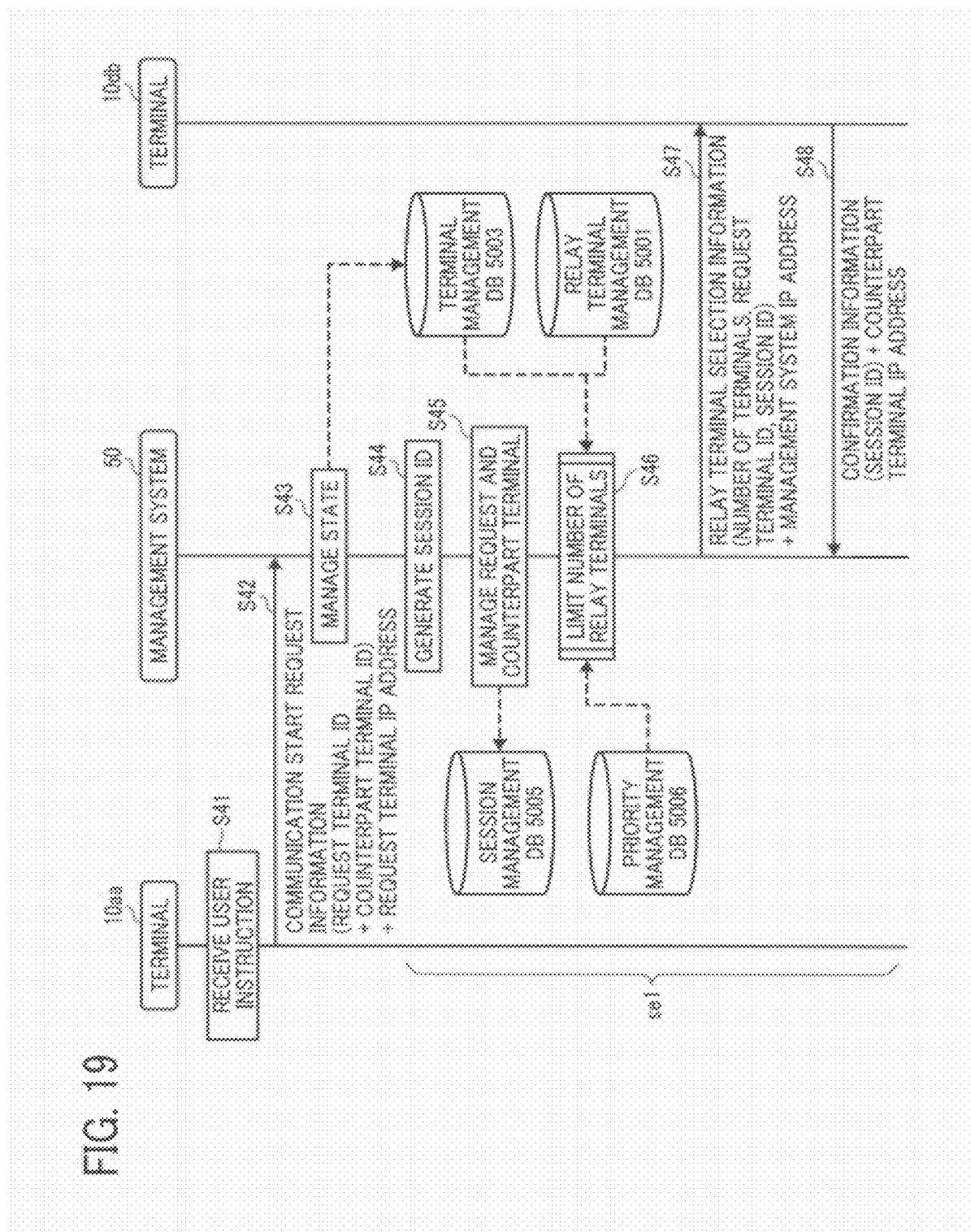
FIG. 19 is a data sequence diagram illustrating operation of limiting a number of candidate relay terminals, performed by the communication system of FIG. 1.
Figure 20:
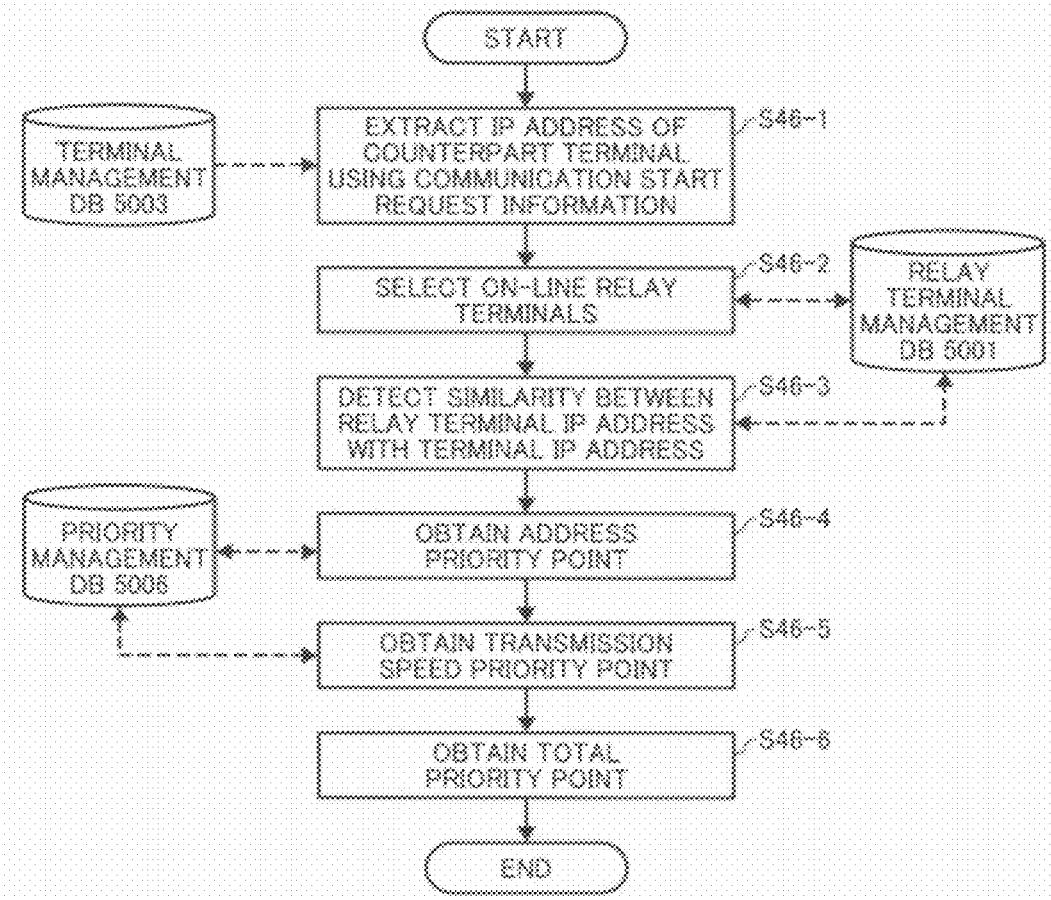
FIG. 20 is a flowchart illustrating operation of limiting a number of candidate relay terminals, performed by the communication management system of FIG. 5.

Referring now to FIGS. 17 to 24, operation performed by the communication system 1 is explained according to an example embodiment of the present invention. FIG. 17 is a data sequence diagram illustrating operation of managing state information indicating the operation state of the relay terminal 30, which is sent from the relay terminal 30 to the management system 50, according to an example embodiment of the present invention. FIG. 18 is a data sequence diagram illustrating operation of preparing for communication to be established between or among two or more of terminals 10. FIG. 19 is a data sequence diagram illustrating operation of selecting the relay terminal 30. FIG. 20 is a flowchart illustrating operation of selecting the relay terminal 30. FIG. 21 is a table for explaining operation of calculating a total priority point to be used for operation of selecting the relay terminal 30. FIGS. 22A and 22B are a data sequence diagram illustrating operation of selecting the relay terminal 30. FIG. 23 is a flowchart illustrating operation of selecting the relay terminal 30, performed by the terminal 10. FIG. 24 is a data sequence diagram illustrating operation of transmitting or receiving contents data such as image data and/or voice data to or from one terminal to another terminal.

Referring now to FIG. 17, operation of managing state information of the relay terminal 30, which is sent from each relay terminal 30 to the management system 50, performed by the communication system 1 is explained according to an example embodiment of the present invention. In this example, it is assumed that the relay terminals 30a, 30b, 30c, and 30d, which may be each or collectively referred to as the relay terminal 30, exist in the communication system 1.

At S1-1, S1-2, S1-3, and S1-4, the relay terminals 30a, 30b, 30c, and 30d each periodically monitors the operation state of the relay terminal 30. This monitoring is performed by the state detector 32 (FIG. 5) of the relay terminal 30.

At S2-1, S2-2, S2-3, and S2-4, the data transmit/receive 31 of the relay terminal 30 periodically transmits state information of the relay terminal 30 to the management system 50 through the communication network 2. With the state information of the relay terminal 30 that is periodically received, the management system 50 is able to manage the operation state of the relay terminal 30 in realtime. The state information of the relay terminal 30 includes an operation state of the relay terminal 30 that is detected by the state detector 32 of the relay terminal 30, which is sent together with a relay terminal ID that uniquely identifies each relay terminal 30. For the descriptive purposes, in this example, it is assumed that the relay terminals 30a, 30b, and 30d each have the on-line state, and the relay terminal 30c has the off-line state due to the failure in relay control program of the relay terminal 30c.

At S3-1, S3-2, S3-3, and S3-4, the management system 50 receives the state information from the relay terminal 30 at the data transmit/receive 51, and stores the received state information of the relay terminal 30 in the memory 5000 through the memory control 59. More specifically, the memory control 59 stores the state information of each relay terminal 30 in association with the relay terminal ID of the corresponding relay terminal 30 in the relay terminal management DB 5001 (FIG. 9).

For example, referring to FIG. 9, the management system 50 stores the state information of the relay terminal 30 indicating whether the relay terminal 30 is on-line, off-line, or in trouble, etc., in association with the relay terminal ID of the relay terminal 30. Additionally, the management system 50 stores the date and time information indicating the time when the management system 50 receives the state information of the relay terminal 30 in association with the relay terminal ID of the relay terminal 30. When the management system 50 does not receive any state information from the relay terminal 30, the relay terminal management table of FIG. 9 has an empty value for the "operation state" field and the "date and time" field for the subjected relay terminal 30. Alternatively, the value of the "operation state" field and the value of the "date and time" field may reflect the state information that is previously sent by the subjected relay terminal 30 to the management system 50 such that the relay terminal management table of FIG. 9 retains such value.

Referring now to FIG. 18, operation of transmitting and receiving various management data before starting videoconference by the request terminal 10aa is explained, according to an example embodiment of the present invention.

At S21, the user at the request terminal 10aa turns on the power of the request terminal 10aa through the power switch 109 (FIG. 2). The operation input 12 of the request terminal 10aa (FIG. 5) turns on the power of the request terminal 10aa.

At S22, as the power of the request terminal 10aa is turned on, the login request 13 of the request terminal 10aa automatically causes the data transmit/receive 11 to send the login request information that requests the login process to the management system 50 through the communication network 2. The login request information includes a terminal ID that identifies the request terminal 10aa, and a password assigned to the request terminal 10aa. The terminal ID and the password may be obtained by the memory control 19 from the memory 1000, and sent to the data transmit/receive 11. At the time of sending the login request information from the request terminal 10aa to the management system 50, the request terminal 10aa sends an IP address of the request terminal 10aa such that the management system 50 knows the IP address of the request terminal 10aa At S23, the terminal authenticator 52 of the management system 50 searches the terminal authentication management DB 5002 (FIG. 10) stored in the memory 5000 using the terminal ID and the password of the login request information received through the data transmit/receive 51. When it is determined that the terminal ID and the password of the login request information is stored in the terminal authentication management DB 5002, the terminal authenticator 52 determines that the terminal 10aa is authenticated.

At S24, when the terminal authenticator 52 authenticates that the login request information is received from the authenticated terminal 10, the state manager 53 of the management system 50 stores the operation state, the date and time at which the login request information is received, and the IP address of the terminal 10aa, with respect to the terminal ID in the terminal management DB 5003 (FIG. 11) to create a record of the terminal 10aa. Using the terminal management table of FIG. 11, which stores the operations state of online, the date and time of "13:40, Nov. 11, 2009", and the terminal IP address of "1.2.1.3" in association with the terminal ID "01aa", various information regarding the terminal 10aa can be managed.

At S25, the data transmit/receive 51 of the management system 50 sends the authentication result obtained by the terminal authenticator 52 to the request terminal 10aa that has sent the login request information through the communication network 2. As described above, in this example, it is assumed that the terminal authenticator 52 determines that the terminal 10aa is an authenticated terminal.

At S26, the terminal extractor 54 of the management system 50 searches the candidate list management table of FIG. 12 using the terminal ID "01aa" of the request terminal 10aa that has sent the login request information to extract a terminal ID of a candidate terminal 10 that is previously registered for the request terminal 10aa. For example, referring to FIG. 12, the terminal extractor 54 extracts terminal IDs including "01ab", "01 ba", and "01db" of the candidate terminals 10ab, 10ba, and 10db for the request terminal 10aa having the terminal ID of "01aa".

At S27, the terminal state obtainer 55 searches the terminal management table of FIG. 11 using the terminal IDs of the candidate terminals 10 that are extracted by the terminal extractor 504, such as the terminal IDs "01ab", "01ba", and "01db", as a search key to obtain the operation states of the candidate terminals 10. Referring to FIG. 11, the operation states including "OFFLINE", "ONLINE", and "ONLINE" are obtained, respectively, for the candidate terminals 10ab, 10ba, and 10db.

At S28, the data transmit/receive 51 sends the candidate list information including the terminal ID used as a search key at S27, and the operation state of each candidate terminal 10, to the request terminal 10aa through the communication network 2. With this candidate list information, the request terminal 10aa is able to know the current operation state of each of the candidate terminals 10ab, 10ba, and 10db that are registered for the request terminal 10aa.

At S29, the terminal extractor 54 of the management system 50 searches the candidate list management table of FIG. 12 using the terminal ID "01aa" of the request terminal 10aa that has sent the login request information as a search key to extract a terminal ID of a terminal 10 that registers the request terminal 10aa as a candidate terminal. Referring to FIG. 12, the terminal IDs including "01ab", "01ba", and "01db" of the terminals 10ab, 10ba, and 10db are extracted as the terminal 10 having the request terminal 10aa as a candidate terminal.

At S30, the terminal state obtainer 55 searches the terminal management table of FIG. 11, stored in the terminal management DB 5003, using the terminal ID "01aa" of the request terminal 10aa that has sent the login request information to obtain the operation state of the request terminal 10aa.

At S31-1 and S31-2, the data transmit/receive 51 sends the terminal state information including the terminal ID "01aa" and the operation state "ONLINE" of the request terminal 10aa, which are obtained at S30, respectively, to the terminals 10ba and 10db. At this step, the data transmit/receive 51 sends the terminal state information to the terminal 10 having the operation state of "ONLINE". When transmitting the terminal state information to the terminals 10ba and 10db, the data transmit/receive 51 refers to the terminal management table of FIG. 11 to obtain an IP address of each of the terminals 10ba and 10db using the terminal ID "01 ba" and "01db". With the IP address, the data transmit/receive 51 is able to communicate with the terminals 10ba and 10db to notify the terminal ID "01aa" of the request terminal 10aa and the operation state of the request terminal 10aa.

The above-described operation of S22 to S31-1 and S31-2 is performed by any desired terminal 10 as the power of the terminal 10 is turned on through the power switch 109 (FIG. 2).

Referring now to FIG. 19, operation of limiting a number of candidate relay terminals 30 is explained according to an example embodiment of the present invention.

When the terminal state information is received from the management system 50, the operation input 12 (FIG. 5) of the request terminal 10aa generates a candidate list based on the terminal state information such as the operation state of each one of the candidate terminals 10 for display through the display 11. In this example, the request terminal 10aa is able to start videoconference with at least one of the terminals 10ba and 10db each having the on-line state and is available. For the descriptive purposes, it is assumed that the user at the request terminal 10aa starts videoconference with the terminal 10db.

At S41, the user at the request terminal 10aa operates the operation button 108 to select the terminal 10db as a counterpart terminal. Upon selection, the operation input 12 (FIG. 5) of the request terminal 10aa receives a user instruction for starting communication with the counterpart terminal 10db.

At S42, the data transmit/receive 11 of the request terminal 10aa sends the communication start request information that requests the management system 50 to start communication with the counterpart terminal 10db to the management system 50. The communication start request information at least includes identification information such as the terminal ID "01aa" of the request terminal 10aa and the terminal ID "01db" of the counterpart terminal 10db, with a message requesting to start videoconference.

At the time of receiving the communication start request information, the data transmit/receive 51 of the management system 50 obtains the IP address "1.2.1.3" of the request terminal 10aa.

At S43, the state manager 53 looks for records in the terminal management table of FIG. 11 stored in the terminal management DB 5003 based on the terminal ID "01aa" of the request terminal 10aa and the terminal ID "01db" of the counterpart terminal 10db, which are included in the communication start request information. The state manager 53 changes each of the operation states of the request terminal 10aa and the counterpart terminal 10db in the records, from the online state to the communicating state.

At this time, the request terminal 10aa and the counterpart terminal 10db has not started communication, but the request terminal 10aa and the counterpart terminal 10db each have the communicating state. In case another terminal 10 tries to communicate with the request terminal 10aa or the counterpart terminal 10db, the management system 50 causes the another terminal 10 to output voice or display indicating that the request terminal 10aa or the counterpart terminal 10db is in the communicating state.

Next, operation of selecting the relay terminal 30 for communication, performed at S44 to S48, and S61-1 to S66 (FIGS. 22A and 22B), is explained according to an example embodiment of the present invention.

At S44, the management system 50 prepares for a session that is performed for selecting the relay terminal 30 for communication between the request terminal 10aa and the counterpart terminal 10db. More specifically, at S44, the session ID generator 56a (FIG. 5) of the management system 50 generates a session ID for a session that is to be performed for selection of the relay terminal 30 that relays data between the request terminal 10aa and the counterpart terminal 10db.

At S45, the session manager 57 stores the session ID "se1" generated at S44, the terminal ID "01aa" of the request terminal 10aa, and the terminal ID "01db" of the counterpart terminal 10db, in the session management DB 5005 (FIG. 13) stored in the memory 5000.

At S46, the primary relay terminal selection unit 56 of the management system 50 limits a number of candidate relay terminals 30 from which one relay terminal 30 to be used for communication between the request terminal 10aa and the counterpart terminal 10db is selected, using the relay terminal management DB 5001, the terminal management DB 5003, and the priority management DB 5006.

Referring now to FIG. 20, operation performed at S46 of FIG. 19 is explained in detail.

At S46-1, the terminal IP address extractor 56b of the management system 50 searches the terminal management DB 5003 (FIG. 11) using the terminal ID "01aa" of the request terminal 10aa and the terminal ID "01db" of the counterpart terminal 10db included in the communication start request information sent from the request terminal 10aa as a key to obtain the IP addresses of the terminals 10aa and 10db, i.e., the IP address "1.2.1.3" and the IP address "1.3.2.4".

At S46-2, the primary selector 56c refers to the relay terminal management DB 5001 (FIG. 9) to select one or more relay terminals 30 having the on-line operation state, and obtains the relay terminal ID of the selected relay terminal 30. More specifically, in this example, the primary selector 506c obtains the relay terminal IDs 111a, 111b, and 111d of the relay terminals 30a, 30b, and 30d.

At S46-3, the primary selector 56c searches the relay terminal management DB 5001 (FIG. 9) to obtain the IP address of each of the relay terminals 30a, 30b, and 30d, using the relay terminal IDs 111a, 111b, and 111d obtained at S46-2. Further, the primary selector 56c compares each one of the IP addresses "1.2.1.2", "1.2.2.2", and "1.3.2.2" of the relay terminals 30a, 30b, and 30d, with each one of the IP addresses "1.2.1.3" and "1.3.2.4" obtained at S46-1, dot address by dot address, to determine the degree of similarity between the relay terminal IP address and the terminal IP address.

At S46-4, the priority determiner 56d refers to the priority management DB 5006 (FIG. 14) to determine a value of address priority point for each one of the relay terminals 30a, 30b, and 30d. In this example, as illustrated in FIG. 21, for each one of the relay terminals 30a, 30b, and 30d, the priority determiner 56d obtains an address priority point with respect to the request terminal 10aa and an address priority point with respect to the counterpart terminal 10db.

FIG. 21 illustrates a table storing a calculation result of a priority point, which is used for limiting a number of candidate relay terminals 30. The table of FIG. 21 stores an address priority point, a transmission speed priority point, and a total priority point, for each one of the relay terminals IDs of the relay terminals 30. The address priority point includes a first address priority point with respect to the request terminal 10aa, and a second address priority point with respect to the counterpart terminal 10db. The total priority point is obtained by adding the highest one of the first and second address priority points with the transmission speed priority point.

In this example, based on comparison between the IP address "1.2.1.2" of the relay terminal 30a and the IP address "1.2.1.3" of the request terminal 10aa, the degree of similarity is "S.S.S.D" such that the address priority point of 5 is obtained. Similarly, based on comparison between the IP address "1.2.1.2" of the relay terminal 30a and the IP address "1.3.2.4" of the counterpart terminal 10db, the degree of similarity is "S.D.D.D" such that the address priority point of 1 is obtained.

Based on comparison between the IP address "1.2.2.2" of the relay terminal 30b and the IP address "1.2.1.3" of the request terminal 10aa, the degree of similarity is "S.S.D.D" such that the address priority point of 3 is obtained. Similarly, based on comparison between the IP address "1.2.2.2" of the relay terminal 30b and the IP address "1.3.2.4" of the counterpart terminal 10*db*, the degree of similarity is "S.D.S.D" such that the address priority point of 1 is obtained.

Based on comparison between the IP address "1.3.2.2" of the relay terminal 30*d* and the IP address "1.2.1.3" of the request terminal 10*aa*, the degree of similarity is "S.D.D.D" such that the address priority point of 1 is obtained. Similarly, based on comparison between the IP address "1.3.2.2" of the relay terminal 30*a* and the IP address "1.3.2.4" of the counterpart terminal 10*db*, the degree of similarity is "S.S.S.D" such that the address priority point of 5 is obtained.

Referring back to FIG. 20, at S46-5, the priority determiner 56*d* searches the priority management table of FIG. 15 of the priority management DB 5006 using the maximum data transmission speed of the relay terminal 30 that is stored in the relay terminal management table of FIG. 9 of the relay terminal management DB 5001 to determine a transmission priority point for each one of the relay terminals 30*a*, 30*b*, and 30*d* that are selected at S46-2.

In this example, referring to FIG. 9 and FIG. 15, the relay terminal 30*a* having the maximum data transmission speed of 100 Mbps is assigned with the transmission priority point of 3. Similarly, the relay terminal 30*b* having the maximum data transmission speed of 1000 Mbps is assigned with the transmission priority point of 5. Similarly, the relay terminal 30*d* having the maximum data transmission speed of 10 Mbps is assigned with the transmission priority point of 1. Accordingly, the priority determiner 506*d* stores the transmission priority point for each one of the relay terminals 30*a*, 30*b*, and 30*d* in the table of FIG. 23.

At S46-6, for each one of the relay terminals 30*a*, 30*b*, and 30*d*, the primary selector 56*c* adds the highest one of the first and second address priority points with the transmission speed priority point to obtain a total priority point. The primary selector 56*c* selects the total of two relay terminals 30 having the highest priority point. For example, the primary selector 56*c* selects the relay terminal 30 having the highest total priority point and the relay terminal 30 having the second highest total priority point as a candidate relay terminal 30 for further processing. In this example, referring to FIG. 21, the relay terminals 30*a*, 30*b*, and 30*d* having the relay terminal IDs 111*a*, 111*b*, and 111*d* respectively have the total priority points of 8, 8, and 6. Accordingly, the primary selector 56*c* selects the relay terminal 30*a* having the relay terminal ID 111*a*, and the relay terminal 30*b* having the relay terminal ID 111*b*.

After the operation of S46 described above referring to FIG. 20 completes, at S47 of FIG. 19, the data transmit/receive 51 (FIG. 5) of the management system 50 sends the relay terminal selection information to the counterpart terminal 10*db* through the communication network 2. The relay terminal selection information includes a number of candidate relay terminals 30, which is "2", the terminal ID "01aa" of the request terminal 10*aa*, and the session ID "se1" for relay terminal selection. With this relay terminal selection information, the counterpart terminal 10*db* is able to obtain information including the number of candidate relay terminals 30, the request terminal 10*aa* that requests for videoconference, and the session ID "se1" of the session for relay terminal selection. In addition, the counterpart terminal 10*db* obtains the IP address "1.1.1.2" of the management system 50 that has sent the relay terminal selection information At S48, the data transmit/receive 11 of the counterpart terminal 10*db* sends confirmation information indicating that the relay terminal selection information is received, to the management system 50 through the communication network 2, with the IP address of the counterpart terminal 10*db*. The confirmation information includes the session ID "se 1". With this confirmation information, the management system 50 is able to know that the counterpart terminal 10*db* is notified with the number of candidate relay terminals 30 obtained during the session se1, and the IP address "1.3.2.4" of the counterpart terminal 10*db*.

Figure 22B:
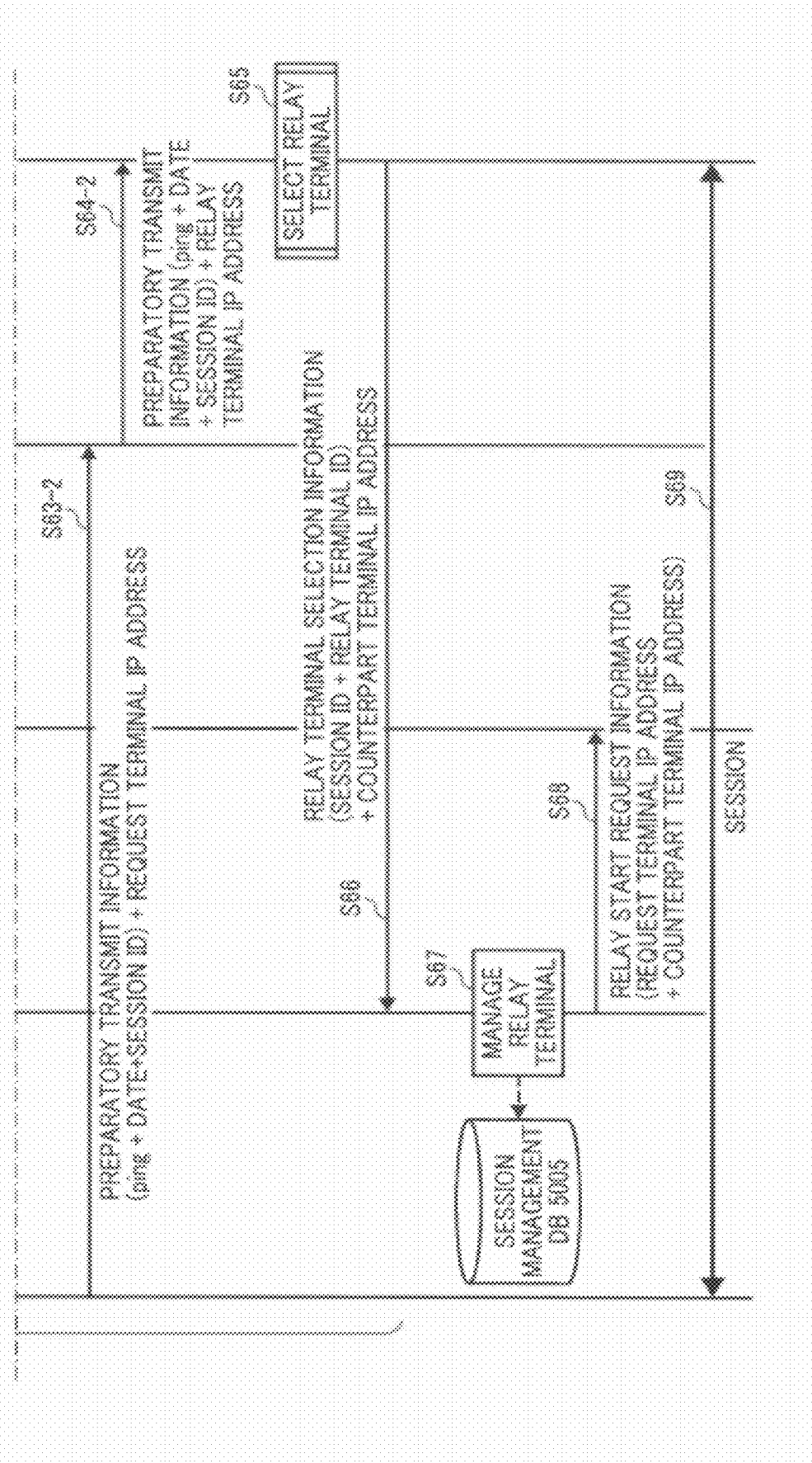

Referring now to FIGS. 22A, 22B, and 23, operation of selecting the relay terminal 30, performed by the counterpart terminal 10*db*, is explained according to an example embodiment of the present invention.

Referring now to FIGS. 22A and 22B, operation of selecting the relay terminal 30, performed by the request terminal 10*aa*, is explained according to an example embodiment of the present invention.

Before starting videoconference between the terminals 10*aa* and 10*db*, at S61-1 and S61-2, the communication management system 50 sends preparatory relay request information, respectively, to the relay terminals 30*a* and 30*b*, which are selected by the management system 50 at S46 as candidate relay terminals. The preparatory relay request information requests the relay terminal 30 to perform relay processing before starting the videoconference. More specifically, the preparatory relay request information includes the session ID "se1", the IP address "1.2.1.3" of the request terminal 10*aa*, and the IP address "1.3.2.4" of the counterpart terminal 10*db*, and is transmitted with the IP address of the management system 50. With this preparatory relay request information, the relay terminals 30*a* and 30*b* are each able to obtain information including the session, the request terminal, the counterpart terminal, and the IP address "1.1.1.2" of the management system 50 that has sent the preparatory relay request information.

At S62-1 and S62-2, the relay terminals 30*a* and 30*b* each cause the data transmit/receive 31 to send preparatory transmit request information to the request terminal 10*aa* through the communication network 2. The preparatory transmit request information requests the request terminal 10*aa* to send preparatory transmit information including the Packet Internet Grouper (PING) to each one of the relay terminals 30*a* and 30*b* before starting the videoconference. More specifically, the preparatory transmit request information includes the session ID "se1", and is transmitted with the IP addresses of the relay terminals 30*a* and 30*b*. With this preparatory transmit request information, the request terminal 10*aa* is able to know that the preparatory transmit information is to be sent during the session with the session ID "se1", as well as the IP addresses "1.2.1.2" and "1.2.2.2" of the relay terminals 30*a* and 30*b*.

As described above, the management system 50 does not directly send the IP address of the counterpart terminal 10*db* to the request terminal 10*aa*. Instead, as described above referring to S61-1 and S61-2, the management system 50 sends the IP address of the counterpart terminal 10*db* respectively to the relay terminal 30*a* and the relay terminal 30*b*. As described above referring to S62-1, the relay terminal 30*aa* requests the request terminal 10*aa* to send the preparatory transmit information to the relay terminal 30*aa*. In this manner, the management system 50 prevents the terminal 10 from obtaining the IP address of another terminal 10, thus improving the security.

At S63-1 and S63-2, the request terminal 10*aa* causes the data transmit/receive 11 to send the preparatory transmit information, respectively, to the relay terminals 30*a* and 30*b* through the communication network 2. The preparatory transmit information is sent to the counterpart terminal 10*db* through each one of the relay terminals 30*a* and 30*b* before the contents data such as the image data and the voice data is transmitted. By sending the preparatory transmit information in replace of the contents data, the management system 50 is able to calculate a time period required for transmitting the contents data from the request terminal 10*aa* to the counterpart terminal 10*db* through each one of the relay terminals 30*a* and 30*b*. Further, the preparatory transmit information includes PING information used for checking whether the request terminal 10*aa*, the relay terminal 30*a* or 30*b*, and the counterpart terminal 10*db* are each connected to allow communication, the date and time of which the request terminal 10*aa* sends the preparatory transmit information, and the session ID "se1". With this preparatory transmit information, each of the relay terminals 30*a* and 30*b* knows that the preparatory transmit information is transmitted in the session with the session ID "se1", and the IP address "1.2.1.3" of the request terminal 10*aa* that has sent the preparatory transmit information.

At S64-1 and S64-2, the relay terminals 30*a* and 30*b* each transmit the preparatory transmit information to the counterpart terminal 10*db* having the IP address "1.3.2.4", which is obtained from the preparatory transmit information. With the preparatory transmit information, the counterpart terminal 10*db* is able to know that the preparatory transmit information is transmitted during the session with the session ID "se1", and the IP addresses "1.2.1.2" and "1.2.2.2" of the relay terminals 30*a* and 30*b* that respectively send the preparatory transmit information.

Referring to FIG. 22B, at S65, the secondary relay terminal selection unit 16 of the counterpart terminal 10*db* selects one of the relay terminals 30*a* and 30*b* to be used for videoconference, based on the preparatory transmit information.

Referring now to FIG. 5 and FIG. 23, operation of selecting the relay terminal 30 for videoconference, which is performed at S65 of FIG. 22B, is explained.

At S65-1, the counter 16*a* of the secondary relay terminal selection unit 16 (FIG. 5) obtains the date and time at which the data transmit/receive 11 of the counterpart terminal 10*db* receives the preparatory transmit information for each one of the relay terminals 30*a* and 30*b*.

At S65-2, the calculator 16*b* calculates, for each one of the relay terminals 30*a* and 30*b*, a time period between the time when the preparatory transmit information is transmitted by the request terminal 10*aa* and the time when the preparatory transmit information is received by the counterpart terminal 10*db*. The date and time at which the preparatory information is transmitted by the request terminal 10*aa* is obtainable from the preparatory transmit information. The date and time of which the preparatory transmit information is received at the counterpart terminal 10*db* is obtained by the counter 16*a*.

At S65-3, the secondary selector 16*c* determines whether all items of preparatory transmit information is received for all of candidate relay terminals, during the session with the session ID "se1". In this example, the secondary selector 16*c* counts a total number of items of preparatory transmit information that have been received, and compares with the total number of candidate relay terminals 30 of "2".

When it is determined that the preparatory transmit information has not been received for at least one relay terminal 30 ("NO" at S65-3), the operation proceeds to S65-4. When it is determined that the preparatory transmit information has been received for all of the candidate relay terminals 30 ("YES" at S65-3), the operation proceeds to S65-5.

At S65-4, the secondary selector 16*c* determines whether a predetermined time period passes after the preparatory transmit information is received at the counterpart terminal 10*db*. In this example, the predetermined time period is set to one minute. When it is determined that the predetermined time period has not passed ("NO" at S65-4), the operation returns to S65-1. When it is determined that the predetermined time period has passed ("YES" at S65-4), the operation proceeds to S65-5.

At S65-5, the secondary selector 16*c* selects one of the relay terminals 30, which has the least value of the time period required for transmitting the preparatory transmit information based on the calculation of the calculator 16*b*.

In this example, it is assumed that the relay terminal 30*a* is selected as a time period for transmitting the preparatory transmit information that is relayed through the relay terminal 30*a* has a value less than the value of the time period for transmitting the preparatory transmit information that is relayed through the relay terminal 30*b*.

Referring back to FIG. 22B, at S66, the data transmit/receive 11 of the counterpart terminal 10*db* sends the relay terminal selection information to the management system 50 through the communication network 2. In this example, the relay terminal selection information indicates that the relay terminal 30*a* is selected. More specifically, the relay terminal selection information includes the session ID "se1", and the relay terminal ID "111a" of the selected relay terminal 30*a*, and is transmitted with the terminal IP address of the counterpart terminal 10*db*. With the relay terminal selection information, the management system 50 is able to know that the relay terminal 30*a* has been selected during the session with the session ID "se1", and the IP address "1.3.2.4" of the counterpart terminal 10*db* that has sent the relay terminal selection information.

At S67, the session manager 57 of the management system 50 stores, in the session management table of FIG. 13 stored in the session management DB 5005, the relay terminal ID "111a" of the relay terminal 30*a*, which is finally selected for communication, in the "relay terminal ID" field of a record provided for the session with the session ID "se1".

At S68, the data transmit/receive 51 of the management system 50 sends the relay start request information to the relay terminal 30*a* through the communication network 2. The relay start request information requests the relay terminal 30*a* to start relay operation. More specifically, the relay start request information includes the IP address "1.2.1.3" of the request terminal 10*aa*, and the IP address "1.3.2.4" of the counterpart terminal 10*db*.

At S69, the relay terminal 30*a* establishes four sessions between the request terminal 10*aa* and the counterpart terminal 10*db* including a session for transmission of low-level resolution image data, a session for transmission of medium-level resolution image data, a session for transmission of high-level resolution image data, and a session for transmission of voice data. Once these sessions are established, the request terminal 10*aa* is able to start videoconference with the counterpart terminal 10*db*.

In the above-described example, the communication management system 50 sends the relay terminal selection information to the counterpart terminal 10*db* at S47 (FIG. 19), and the counterpart terminal 10*db* performs operation of S48, S64-1 (FIG. 22A), S64-2 (FIG. 22B), and S65 (FIG. 22B) to select the relay terminal 30. In alternative to this example, the communication management system 50 may send the relay terminal selection information to the request terminal 10*aa* to cause the request terminal 10*aa* to perform selection of the relay terminal 30. In such case, the request terminal 10*aa* performs operation of S48, S64-1 (FIG. 22A), S64-2 (FIG. 22B), and S65 (FIG. 22B) in a substantially similar manner as described above. Further, at S66, the request terminal 10*aa* sends the relay terminal selection information to the communication management system 50.

Alternatively, the counterpart terminal 10*db* may send information indicating a time period counted from the time when the preparatory transmit information is transmitted and the time when the preparatory transmit information is received to any one of the request terminal 10*aa* or the management system 50. Based on this information, the request terminal 10*aa* or the management system 50 may select one relay terminal 30*a*.

Referring now to FIG. 5 and FIG. 24, operation of transmitting and receiving contents data such as image data and voice data between the request terminal 10A and the counterpart terminal 10B to carry out videoconference, performed by the communication system 1, is explained according to an example embodiment of the present invention.

In this example, the contents data such as the image data and the voice data flows in a direction from the request terminal 10*aa* to the counterpart terminal 10*db*, or in another direction from the counterpart terminal 10*db* to the request terminal 10*aa*. Since operation such as transmission and reception of the contents data or detection of delay time is the same for both of the directions, the following example focuses on communication in which data flows from the request terminal 10*aa* to the counterpart terminal 10*db*.

Referring to FIG. 24, at S81, the data transmit/receive 11 of the request terminal 10*aa* sends the contents data to the relay terminal 30*a* through the communication network 2. The contents data includes image data such as image data of an object captured by the imaging unit 14*a* and voice data that is input through the sound input 15*a*. In this example, it is assumed that the high-quality image data based on the low-level resolution image data, the medium-level resolution image data, and the high-level resolution image data, and the voice data, are transmitted. Accordingly, the data transmit/receive 31 of the relay terminal 30*a* receives the image data of three different resolution levels, and the voice data.

At S82, the data quality checker 33 searches the data quality management DB 3001 (FIG. 8) using the IP address "1.3.2.4" of the counterpart terminal 10*db* as a key to obtain the quality of the image data to be transmitted to the relay terminal 30*a*.

In this example, the quality of image data to be transmitted to the relay terminal 30*a* is the high-quality image data. Since the image data that is received at the data transmit/receive 31 has the quality that is the same as the quality of the image data obtained from the data quality management DB 3001, at S83, the relay terminal 30*a* sends the high-quality image data and the voice data to the counterpart terminal 10*db*, without applying further image processing.

The counterpart terminal 10*db* receives the high quality image data that is generated based on the low-level resolution image data, medium-level resolution image data, and high-level resolution image data, and the voice data, at the data transmit/receive 11. The display control 14*b* combines the image data of three different resolution levels into the high quality image data for display onto the display 11. Further, the sound output 15*b* outputs the voice sound based on the voice data.

At S84, the delay detector 17 of the counterpart terminal 10*db* periodically detects a delay time indicating the time at which the image data is received at the data transmit/receive 11, for example, every one second. In this example, it is assumed that the delay time of 200 ms is obtained.

At S85, the data transmit/receive 11 of the counterpart terminal 10*db* sends the delay time information indicating the delay time of 200 ms to the communication management system 50 through the communication network 2. With the delay time information, the communication management system 50 is notified of the delay time, and the IP address "1.3.2.4" of the counterpart terminal 10*db* that has sent the delay time information.

At S86, the delay time manager 60 of the communication management system 50 searches the terminal management DB 5003 (FIG. 11) using the IP address "1.3.2.4" of the counterpart terminal 10*db* as a search key to extract the terminal ID "01db" of the counterpart terminal 10*db*. The delay time manager 60 stores the delay time of 200 ms obtained from the delay time information in a "delay time" field of the record of the terminal ID "01db" of the session management table stored in the session management DB 5005 (FIG. 13).

At S87, the quality determiner 58 searches the quality management DB 5007 (FIG. 16) using the delay time of 200 ms to extract the image data quality of "MEDIUM". Based on the extracted image data quality, the quality determiner 58 determines that the quality of image data suitable for the delay time of 200 ms is medium.

At S88, the data transmit/receive 51 searches the relay terminal management DB 5001 (FIG. 9) using the relay terminal ID "111a", which is stored in the session management DB (FIG. 13) in association with the counterpart terminal ID "01db", to extract the IP address "1.2.1.2" of the relay terminal 30*a*.

At S89, the data transmit/receive 51 sends the quality information indicating that the image data quality that has been determined at S87 is medium-level, to the relay terminal 30*a* through the communication network 2. The image quality information is transmitted with the IP address "1.3.2.4" of the counterpart terminal 10*db*, which was used as a search key at S86.

At S90, the change quality manager 34 of the relay terminal 30*a* stores the IP address "1.3.2.4" of the counterpart terminal 10*db* in association with the "medium-level" quality image data to be relayed by the counterpart terminal 10*db*, in the data quality management DB 3001 (FIG. 8).

At S91, the request terminal 10*aa* transmits the high quality image data including the low-level resolution image data, the medium-level resolution image data, and the high-level resolution image data, and the voice data, to the relay terminal 30*a*, in a substantially similar manner as described above referring to S81.

At S92, the data quality checker 33 of the relay terminal 30*a* searches the data quality management DB 3001 (FIG. 8) using the IP address "1.3.2.4" of the counterpart terminal 10*db* as a search key to extract the quality of the image data suitable for the counterpart terminal 10*db*, in a substantially similar manner as described above referring to S82.

At S93, since the image data quality that is stored for the counterpart terminal 10*db* is the medium-level, which is lower than the quality of the image data that is received at the data transmit/receive 31, the data quality changer 35 changes the quality of the image data from the high-level to the medium level. In this example, the quality of the voice data remains the same.

At S94, the data transmit/receive 31 of the relay terminal 30 sends the image data having the quality that is lowered to the medium-level, and the voice data, to the counterpart terminal 10*db* through the communication network 2. The data transmit/receive 11 of the counterpart terminal 10*db* receives the medium-quality image data that is generated based on the low-level resolution image data and the medium-level resolution image data, and the voice data. The display control 16 of the counterpart terminal 10*db* combines the image data of two different resolution levels to generate the medium-level image data for display on the display 120. Further, the sound output 15*db* outputs the voice sound generated based on the voice data.

As described above, when any delay in receiving the image data at the counterpart terminal 10*db* is observed, the relay terminal 30*a* changes the quality of image data by lowering the quality of image data. Accordingly, the users participating the videoconference are able to carry out communication more smoothly.

Referring now to FIG. 25, operation of transmitting information indicating the mute state of the external microphone 114*a* through the communication network 2, performed by the terminal 10, is explained according to an example embodiment of the present invention. The operation of FIG. 25 is performed while the session is established between or among the terminals 10, for example, through the relay terminal 30 that is previously selected during the session for selecting the relay terminal 30 of FIG. 22. In this example, it is assumed that the external microphone 114*a* is caused to be in the mute on state during the session for transmitting contents data including voice data between or among the terminals 10. More specifically, in this example, it is assumed that the terminal 10*aa* having the terminal ID "01aa" and the IP address "1.2.1.3" executes mute processing, after the terminal 10*aa* logs in the communication system 1 for videoconference. The terminal 10*aa* is connected to the external microphone 114*a*.

At S101-1, the processor 18*a* of the mute processor 18 obtains identification information of the external microphone 114*a*, through the sound input 15*a*. In this example, the processor 18*a*, which operates under the Windows operating system, uses the audio mixer API to obtain the name of the external microphone 114*a* ("the microphone name") as identification information of the external microphone 114*a*.

The processor 18*a* sends the microphone name of the external microphone 114*a* to the determiner 18*b*, and requests the determiner 18*b* to determine whether the external microphone 114*a* is capable of notifying the mute processor 18 of information indicating the mute state of the external microphone 114*a*, which is referred to as the "mute state data" of the external microphone 114*a*.

At S101-2, the determiner 18*b* searches microphone data, which is stored in the memory 18*d*, to determine whether the external microphone 114*a* is capable of notifying the terminal 10 of the mute state data of the external microphone 114*a*. FIG. 26A illustrates example microphone data, which lists one or more microphone names of the microphones each capable of notifying the terminal 10 of the mute state data.

When the determiner 18*b* determines that the microphone name of the external microphone 114*a* that is obtained at S101-1 has been registered to the microphone data of FIG. 26A, the determiner 18*b* determines that the external microphone 114*a* is capable of notifying the terminal 10 of the mute state data, and the operation proceeds to S101-3. When the determiner 18*b* determines that the microphone name of the external microphone 114*a* that is obtained at S101-1 has not been registered to the microphone data of FIG. 26A, the determiner 18*b* determines that the external microphone 114*a* is not capable of notifying the terminal 10 of the mute state data, and the operation proceeds to S101-4.

The operation performed at S101-3 will be described below referring to FIG. 30.

The operation performed at S101-4 will be described below referring to FIG. 31.

At S101-5, the processor 18*a* obtains information regarding the counterpart terminal 10. For example, the terminal 10*aa* receives information regarding one or more counterpart terminals 10 each having videoconference with the request terminal 10*aa*, such as identification information of each counterpart terminal 10B and mute state data of each terminal 10B, from the communication management system 50 according to XMPP. FIG. 27 illustrates an example data structure of such information, which stores, for each terminal 10, terminal ID and mute state data. In addition to information regarding the counterpart terminal 10B, the communication terminal 10*aa* may receive the terminal ID and the mute state data of its own. Referring to FIG. 27, the request terminal 10*aa* is having videoconference with the terminal 10*ab* having the terminal ID 01*aa*, the terminal 10*ba* having the terminal ID 01*ba*, and the terminal 10*bb* having the terminal ID 01*bb*. Once the processor 18*a* identifies each counterpart terminal 10, the operation proceeds to S101-4.

At S101-6, the processor 18*a* determines whether there is at least one counterpart terminal 10B, to which the terminal 10*aa* needs to transmit a message. When it is determined that there is at least one counterpart terminal 10B to which the message is to be transmitted ("YES" at S101-6), the operation proceeds to S101-7. When it is determined that there is no counterpart terminal 10B to which the message is to be transmitted ("NO" at S101-6), the operation ends.

At S101-7, the processor 18*a* requests the state manager 18*c* to generate a message for transmission to the counterpart terminal 10B, which is identified at S101-6. The state manager 18*c* generates an XML-based message according to Extensible Messaging and Presence Protocol Instant Messaging and Presence (XMPP IM) defined by RFC3921, for example, as illustrated in FIG. 28.

More specifically, in the example illustrated in FIG. 28, it is assumed that the request terminal 10*aa* sends the mute state data of the terminal 10*aa* to the counterpart terminal 10*bb*. In FIG. 28, the state manager 18*c* enters the terminal ID "01aa" of the request terminal 10*aa* into the "from" attribute of the presence tag, and the terminal ID "01bb" of the counterpart terminal 10*bb* into the "to" attribute of the presence tag. The state manager 18*c* enters the value of the mute state data into the status tag, which may be selected from "MUTE_ON", "MUTE_OFF", and "MUTE_NONE". The "MUTE_ON" value, shown in FIG. 28(*a*), that the microphone 114*a* of the terminal 10*aa* is in the mute on state. The "MUTE_OFF" value, shown in FIG. 28(*b*), indicates that the microphone 114*a* of the terminal 10*aa* is in the mute off state. The "MUTE_NONE" value, shown in FIG. 28(*c*), indicates that the microphone 114*a* of the terminal 10*aa* is not capable of notifying its mute state and is not registered to the terminal 10. Further, the state manager 18*c* enters "CHAT" into the "show" tag, which indicates that the terminal 10*aa* is having videoconference with the counterpart terminal 10*bb*.

At S101-8, the state manager 18*c* requests the data transmit/receive 11 to transmit the message generated at S101-7. The data transmit/receive 11 transmits the message according to XMPP to the counterpart terminal 10B. In the example case illustrated in FIG. 28, the message is sent to the counterpart terminal 10*bb*.

After transmitting of the message, the operation returns to S101-6 to determine whether there is at least one counterpart terminal 10B to which the message is to be transmitted. When there is no counterpart terminal 10B to which the message is to be transmitted, the operation ends.

In this example, at the time of transmitting the message, the data transmit/receive 11 replaces the terminal ID "01aa" of the request terminal 10*aa* and the terminal ID "01bb" of the counterpart terminal 10*bb*, respectively, with the IP address of the request terminal 10*aa* and the IP address of the counterpart terminal 10*bb*. The IP address of the counterpart terminal 10 may be obtained, for example, at the time when the session is established.

Alternatively, the state manager 18*c* may enter the IP address of the request terminal 10*aa* into the "from" attribute, and the IP address of the counterpart terminal 10*bb* into the "to" attribute such that conversion from the terminal ID to the IP address is not performed by the data transmit/receive 11.

In the above-described example of FIG. 25, the request terminal 10*aa* sends the message to the counterpart terminal 10 through the communication network 2. Alternatively, the request terminal 10*aa* may send the message to the counterpart terminal 10 through the management system 50. In such case, the request terminal 10 performs operation of FIG. 25 in a substantially similar manner as described above, except that the message is generated differently and the message is transmitted to the management system 50. The management system 50 receives the message from the request terminal 10*aa*, and sends the message to the counterpart terminal 10.

In case of transmitting the message via the management system 50, the state manager 18*c* generates a message as illustrated in FIG. 29. Assuming that the request terminal 10*aa* sends the message to the counterpart terminal 10*bb* through the management system 50, the state manager 18*c* enters the IP address "1.2.1.3" of the request terminal 10*aa* into the attribute "from" of the presence tag, and the IP address "1.1.1.2" of the management system 50 into the attribute "to" of the presence tag. The IP address of the management system 50 may be obtained, for example, when the session is established.

When the request terminal 10*aa* transmits the message at S101-8, the management system 50 receives the message at the data transmit/receive 51. The message processor 61 analyzes the "ID" attribute of the presence tag according to XMPP IM to obtain the terminal ID "01aa" of the terminal 10*aa*. The message processor 61 further refers to the session management table stored in the session management DB 5005 (FIG. 13) to obtain the terminal ID "01db" of the counterpart terminal 10*db* having videoconference with the request terminal 10*aa* having the terminal ID "01aa". The message processor 61 refers to the terminal management table stored in the terminal management DB 5003 (FIG. 11) to specify the IP address "1.3.2.4" of the counterpart terminal 10*db*.

The message processor 61 generates a message to be transmitted to the counterpart terminal 10*db*, for example, as follows. The data transmit/receive 51 transmits the message generated by the message processor 61 to the counterpart terminal 10*db*.

---

<presence from = "1.1.1.2" to = "1.3.2.4"
<show>CHAT</show>
<id>01aa</id>
<status>MUTE_ON</status>
</presence>

---

In the above-described example, the mute state data indicates that the microphone of the request terminal 10*aa* is in the mute on state. The value of the status tag to be included in the message should be the same as the value of the status tag included in the message that is transmitted from the request terminal 10*aa*.

As described above, when the request terminal 10*aa* generates a message of FIG. 29, which has the IP address of the request terminal 10*aa* and the IP address of the management system 50, and sends the message to the management system 50, the management system 50 specifies the IP address of the counterpart terminal 10 to generate a new message addressed to the counterpart terminal 10. In this way, the request terminal 10A is able to send a message to the counterpart terminal 10B even when the request terminal 10A does not know the IP address of the counterpart terminal 10B.

In alternative to generating a message addressed to the management system 50 or the counterpart terminal 10, the request terminal 10 may generate a message addressed to the relay terminal 30, if the request terminal 10 and the counterpart terminal 10 communicate with each other through the relay terminal 30. In such case, the relay terminal 30 generates a message addressed to the counterpart terminal 10 based on the message received from the request terminal 10, and sends the message to the counterpart terminal 10.

Figure 30:
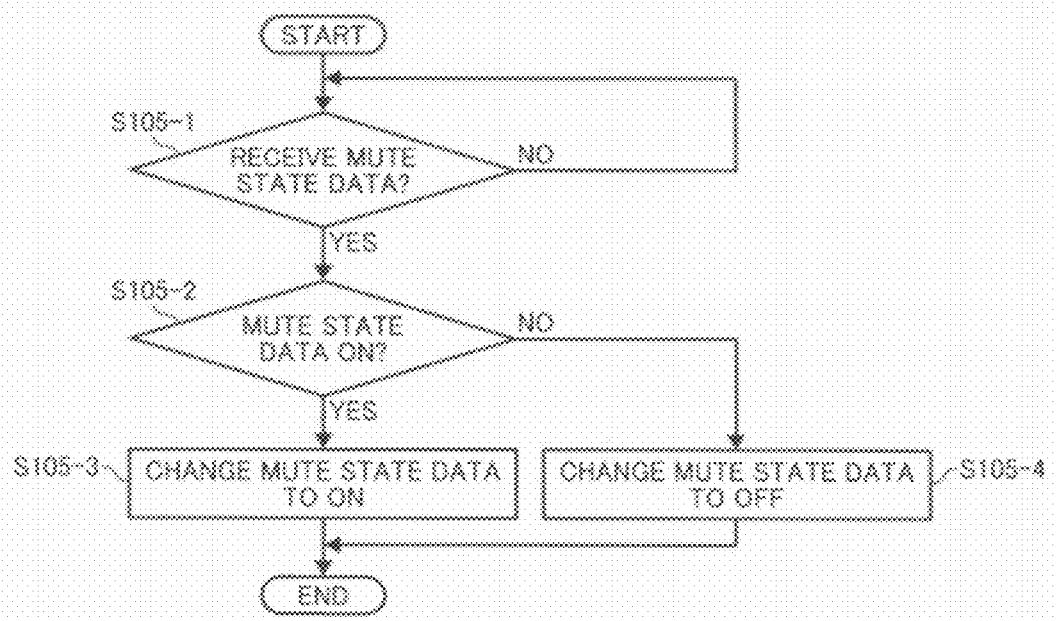
FIG. 30 is a flowchart illustrating operation of managing mute state data of a microphone when the microphone has the function of notifying mute state, performed by the terminal of FIG. 5.

Referring now to FIG. 30, operation of obtaining mute state data, performed at S101-3 of FIG. 25, is explained according to an example embodiment of the present invention. The operation of FIG. 30 is performed when the mute processor 18 determines that the external microphone 114*a* connected to the sound input 15*a* of the terminal 10 is capable of transmitting mute state data, for example, when the mute button 114*b* of the external microphone 114*a* is pressed by the user.

At S105-1, the processor 18*a* determines whether the mute state data, which is expected to be notified when the mute button 114*b* is pressed by the user, is received. When it is determined that the mute state data is received ("YES" at S105-1), the operation proceeds to S105-2. When it is determined that the mute state data is not received ("NO" at S105-1), the operation repeats S105-1.

At S105-2, the processor 18*a* analyzes the mute state data that is notified to determine whether the mute state data indicates on or off of the mute function. When it is determined that the mute state data indicates that the mute function is on ("YES" at S105-2), the operation proceeds to S105-3. When it is determined that the mute state data indicates that the mute function is off ("NO" at S105-2), the operation proceeds to S105-4.

At S105-3, the processor 18*a* requests the state manager 18*c* to change the mute state data of the request terminal 10*aa*, which is stored in the form of table as illustrated in FIG. 27, to the mute on state.

At S105-4, the processor 18*a* requests the state manager 18*c* to change the mute state data of the request terminal 10*aa*, which is stored in the form of table as illustrated in FIG. 27, to the mute off state.

After performing the above-described steps, the operation proceeds to S101-5 of FIG. 25, and ends after transmitting the message at S101-8.

Figure 31:
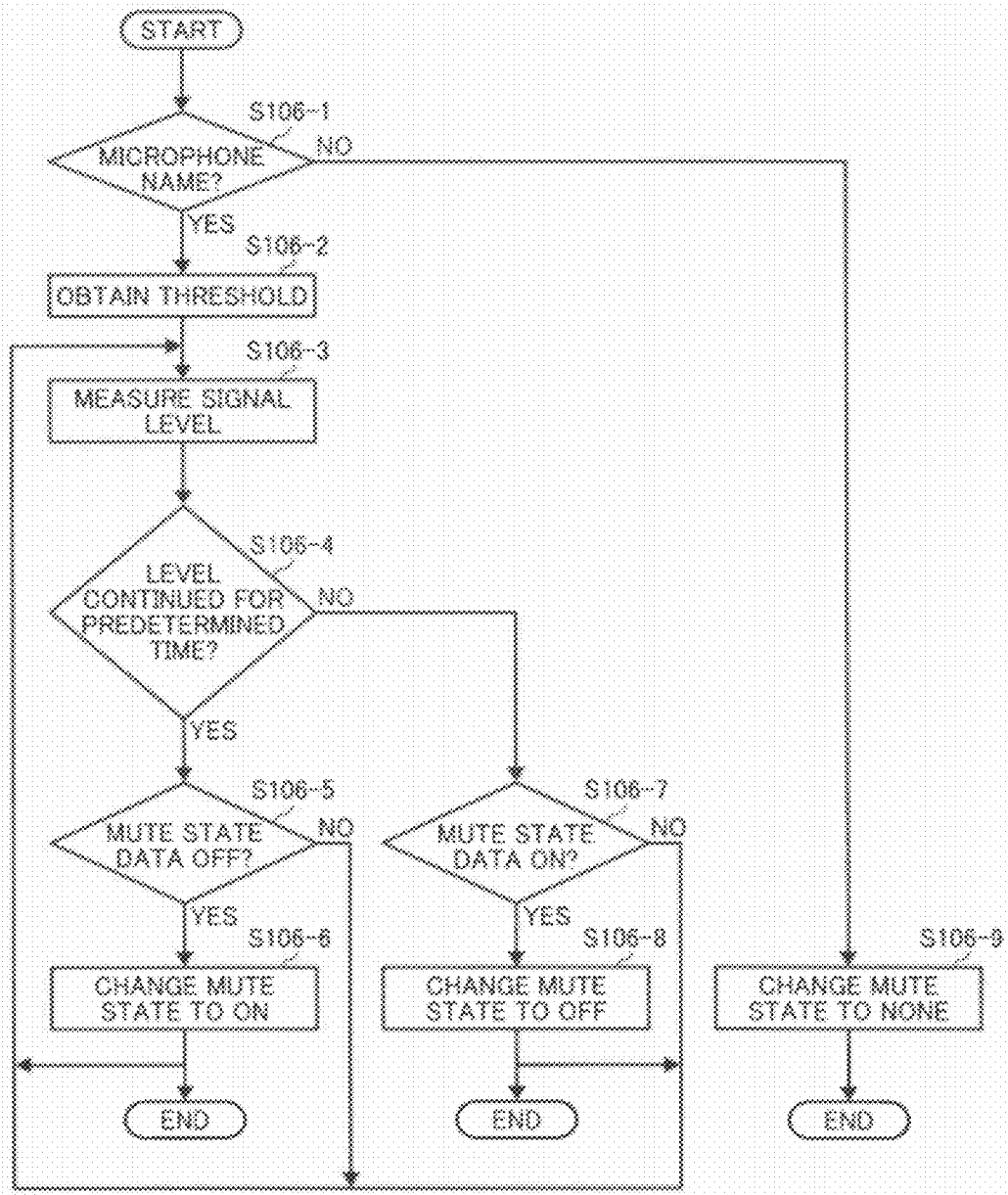
FIG. 31 is a flowchart illustrating operation of managing mute state data of a microphone when the microphone is not provided with the function of notifying mute state, performed by the terminal of FIG. 5.

Referring now to FIG. 31, operation of obtaining mute state data, performed at S101-4 of FIG. 25, is explained according to an example embodiment of the present invention. The operation of FIG. 31 is performed when the mute processor 18 determines that the external microphone 114*a* connected to the sound input 15*a* of the terminal 10 is not capable of transmitting mute state data, for example, when the mute button 114*b* of the external microphone 114*a* is pressed by the user.

At S106-1, the processor 18*a* requests the determiner 18*b* to refer to the microphone data of FIG. 26B, which is stored in the memory 18*d*, to search for the microphone name of the external microphone 114*a* that is obtained at S101-1 of FIG. 25. As described below, the microphone data of FIG. 26B stores a list of names of microphones not provided with the function of notifying mute state, each of which is previously registered.

When the determiner 18b finds the microphone name of the microphone 114a in the memory 18d ("YES" at S106-1), the operation proceeds to S106-2. When the determiner 18b does not find the microphone name of the microphone 114a in the memory 18d ("NO" at S106-1), the operation proceeds to S106-9.

At S106-9, the processor 18a changes the mute state data of the request terminal 10aa having the terminal ID 01aa, which is stored in the form of table illustrated in FIG. 27, to the mute none state. The mute none state indicates that the microphone currently used by the terminal 10 is not capable of notifying its mute state and is not registered to the terminal 10. The operation then proceeds to S101-5 of FIG. 25, and ends after transmitting the message at S101-8.

At S106-2 of FIG. 31, the determiner 18b refers to the microphone data of FIG. 26B to obtain a threshold x that is stored in association with the microphone name of the microphone 114a obtained at S101-1 of FIG. 25.

At S106-3, the determiner 18b samples the level of the sound signal that passes the mute switch 15a5 of the sound input 15a for a predetermined time. In this example, the predetermined time is set to 16 samples, which is equal to 1 milliseconds (ms) when a sample frequency is 16 kHz.

The determiner 18b determines whether the level of the sound signal, sampled at S106-3, is within a predetermined range. In this example, the sound signal is encoded into a 16-bit digital audio signal. The determiner 18b determines whether the level of the sound signal ranges between the value −x and the value x to output a determination result. In this example, the value x is the threshold value previously set and stored as the microphone data in the form of table as illustrated in FIG. 26B. For example, referring to FIG. 26B, for the microphone 114a having the name "MIC3", the threshold value x is 3. The determination result is output to the processor 18a. When the determination result indicates that the level of the sound signal is within the range, that is, when the level of the sound signal within the predetermined range is continued for the predetermined time ("YES" at S106-4), the operation proceeds to S106-5. When the determination result indicates that the level of the sound signal is not within the range, that is, when the level of the sound signal within the predetermined range is not continued for the predetermined time ("NO" at S106-4), the operation proceeds to S106-7.

At S106-5, the processor 18a requests the state manager 18c to refer to the mute state data of the request terminal 10aa, which is stored in the memory 18d in the form of table illustrated in FIG. 27, to determine whether the mute state data indicates that the mute function is off. When it is determined that the mute state data indicates that the mute function is off ("YES" at S106-5), the operation proceeds to S106-6. When it is determined that the mute state data indicates that the mute function is not off, that is, the mute function is on ("NO" at S106-5), the operation returns to S106-3.

At S106-6, the state manager 18c changes the mute state data of the terminal 10aa, which is stored in the memory 18d in the form of table illustrated in FIG. 27, to the mute on state, and the operation of FIG. 31 ends to proceed to S101-5 of FIG. 25. The operation also returns to S106-3 of FIG. 31 to repeat S106-3. In this manner, the level of the sound signal is constantly measured during when the communication terminal 10 is having videoconference with the counterpart terminal 10, in case the microphone 114a is not capable of notifying its mute state. Based on the measurement, the communication terminal 10 determines whether the mute state of the communication terminal 10 changes, and generates a message when the mute state is changed.

At S106-7, the state manager 18c refers to the mute state data of the request terminal 10aa having the terminal ID 01aa, which is stored in the memory 18d in the form of table illustrated in FIG. 27, to determine whether the mute state data indicates that the mute function is on. When it is determined that the mute state data indicates that the mute function is on ("YES" at S106-7), the operation proceeds to S106-8. When it is determined that the mute state data indicates that the mute function is not on, that is the mute function is off ("NO" at S106-7), the operation returns to S106-3.

When the mute state data indicates that the mute function is on ("YES" at S106-7), at S106-8, the state manager 18c changes the mute state data of the request terminal 10aa, which is stored in the memory 18d in the form of table illustrated in FIG. 27, to the mute off state, and the operation of FIG. 31 ends to proceed to S101-5 of FIG. 25. The operation also returns to S106-3 of FIG. 31 to repeat S106-3. In this manner, the level of the sound signal is constantly measured during when the communication terminal 10 is having videoconference with the counterpart terminal 10, in case the microphone 114a is not capable of notifying its mute state. Based on the measurement, the communication terminal 10 determines whether the mute state of the communication terminal 10 changes, and generates a message when the mute state is changed.

In the above-described example, the threshold x is a previously stored value, which is defined to be a value smaller than the value obtained by measuring the minimum level of the sound signal input to the sound input 15a through the external microphone 114a. This process of registering the threshold x is described below referring to FIG. 39.

In case when the external microphone 114a is provided with the function of adjusting volume, the level of the sound signal is made lower as long as the volume of the microphone 114a is set to minimum, even when the mute switch 15a5 of the sound input 15a (FIG. 6) is released, i.e., the mute function is off, according to the instruction received from the mute button 114b of the microphone 114a. If this level of the sound signal is the same with a value obtained when the mute switch 15a5 is activated, it would be impossible for the mute processor 18 of the terminal 10 to determine whether the microphone 114a is in the mute on state or mute off state, based on the processed input signal of the sound input 15a. In view of this, in this example, the mute switch 15a5 of the sound input 15a is provided at most downstream of the signal processing circuits of the sound input 15a. With this circuit structure, the level of the sound signal obtained when the mute switch 15a5 is on and the level of the sound signal obtained when the mute switch 15a5 is off can be distinguish from each other, even when the volume of the microphone 114a is set to minimum.

Figure 32:
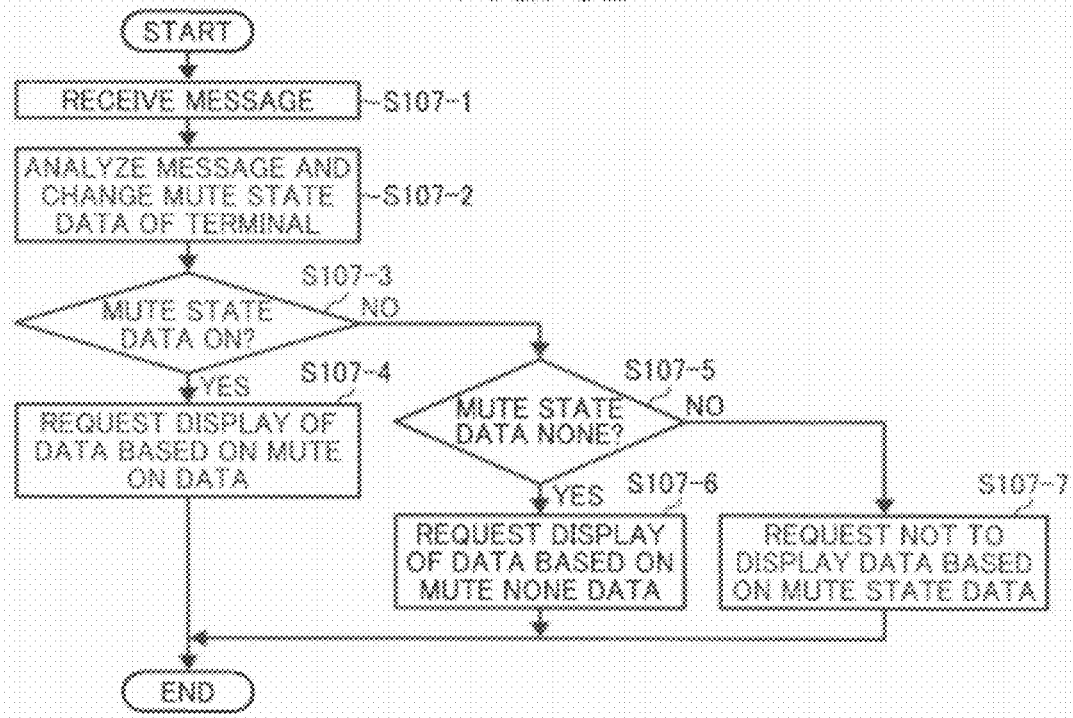
FIG. 32 is a flowchart illustrating operation of processing a message generated based on mute state data, which is received from the request terminal, performed by the counterpart terminal of FIG. 5.

Referring now to FIG. 32, operation of processing the message including the mute state data received from the request terminal 10A, performed by the counterpart terminal 10B that communicates with the request terminal 10A, is explained according to an example embodiment of the present invention. In this example, the counterpart terminal 10bb having the terminal ID 01bb is assumed to receive the message including the mute state data from the request terminal 10aa.

At S107-1, when the data transmit/receive 11 receives the message including the mute state data, the processor 18a of the mute processor 18 requests the state manager 18c to analyze the message.

At S107-2, the state manager 18c analyzes the received message to obtain the terminal ID of the request terminal from the "from" attribute of the presence tag, which is the terminal ID "01aa" of the request terminal 10aa in this example. Further, the state manager 18c obtains the mute state data from the status tag. The state manager 18c changes the mute state data of the terminal 10aa having the terminal ID 01 aa, which is stored in the memory 18d in the form of table illustrated in FIG. 27, to the mute state specified by the obtained mute state data.

At S107-3, the processor 18a determines whether the obtained mute state data indicates that the mute function is on. When it is determined that the mute state data indicates that the mute function is on ("YES" at S107-3), the operation proceeds to S107-4. When it is determined that the mute state data does not indicate that the mute function is on ("NO" at S107-3), the operation proceeds to S107-5.

At S107-4, the processor 18a requests the display control 14b to display data generated based on the mute state data indicating that the mute function is on, together with the terminal ID 01aa of the request terminal 10aa, onto the display 11, and the operation ends.

At S107-5, the processor 18a determines whether the mute state data indicates that the mute function is none, meaning that there is no function to notify mute state and is not registered to the terminal 10. When it is determined that the mute function is none ("YES" at S107-5), the operation proceeds to S107-6. When it is determined that the mute function is not none ("NO" at S107-5), the operation proceeds to S107-7.

At S107-6, the processor 18a requests the display control 14b to display data generated based on the mute state data indicating that the mute function is none, together with the terminal ID 01aa of the request terminal 10aa, onto the display 11, and the operation ends.

At S107-7, the processor 18a requests the display control 14b to display data generated based on the mute state data indicating that the mute function is off, together with the terminal ID 01aa of the request terminal 10aa, onto the display 11, and the operation ends.

The above-described control of display or not to display a message may be realized using any desired known method of image layering. For example, the display control 14b generates a mute state data display/undispaly layer separately from a layer of the moving image that is transmitted from the request terminal 10, for example, through the relay terminal 30. When displaying through the display 11, the mute state data display/undispaly layer is superimposed over the moving image layer.

Figure 33:
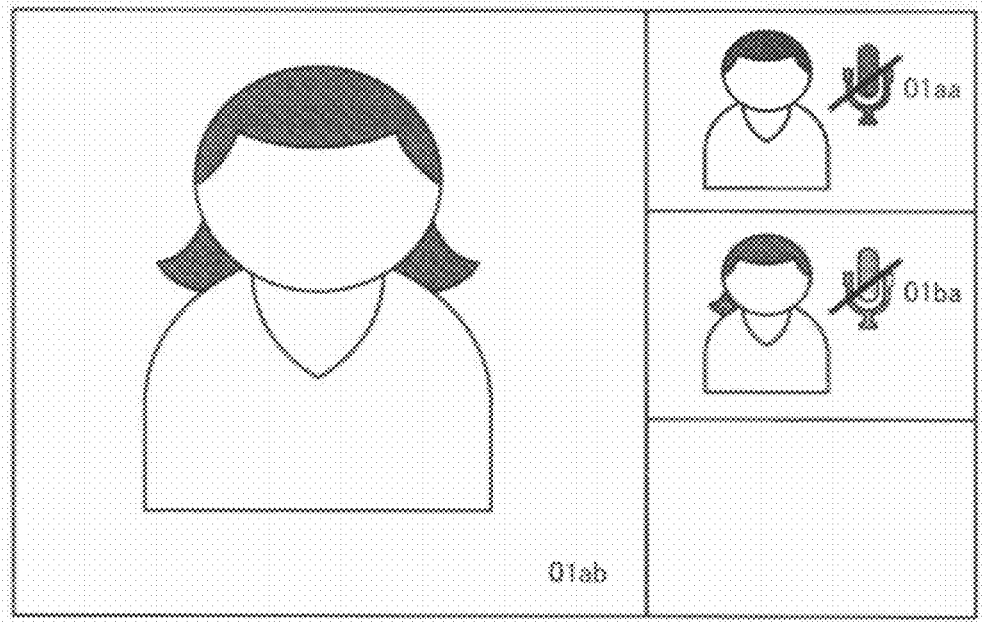
FIG. 33 is an example screen displayed by the counterpart terminal of FIG. 5 based on the message received from the request terminal.

FIG. 33 illustrates an example screen, displayed by the display 11 of the terminal 10ab, which is generated based on information regarding the mute state data of the terminals 10, which is obtainable from the table of FIG. 27. In this example, it is assumed that the terminal 10ab is having videoconference with the terminal 10aa and the terminal 10ba.

In this example, since the terminal 10aa having the terminal ID 01aa is in the mute on state, an icon indicating the mute on state and the text "01aa" indicating the terminal ID of the terminal 10aa are displayed side by side.

Since the terminal 10ab having the terminal ID 01ab is in the mute off state, no icon is displayed to indicate that the terminal 10ab is in the mute off state while displaying the text "01ab" indicating the terminal ID of the terminal 10ab.

Since the terminal 10ba having the terminal ID 01ba is in the mute none state, an icon indicating the mute none state and the text "01ba" indicating the terminal ID of the terminal 10ba are displayed side by side.

As described above, in this example, when the external microphone 114a is used, even without installing a device driver having the function of notifying the mute function of the microphone 114a, information indicating the mute state data of the microphone 114a can be transmitted to the terminal 10 for display, thus carrying out videoconference more smoothly. For example, even when the user at the request terminal 10 realizes that there is no voice from the counterpart terminal 10, the user at the request terminal 10 is able to instantly know that the user at the counterpart terminal 10 is using the mute function through data generated based on the mute state data received from the counterpart terminal 10. In this manner, the user at the request terminal 10 does not have to worry about whether there is an error.

Further, since a device driver specific to each terminal 10 or each microphone does not have to be developed, the overall development costs that are otherwise required can be reduced.

Further, since a device driver is not needed, any desired microphone may be used for the terminal 10, thus improving operability for the user.

In the above-described example, the message indicating the mute state data of the external microphone 114a is transmitted for display onto the display 11 at the counterpart terminal 10. Alternatively, the counterpart terminal 10, which receives the message, may notify the user at the counterpart terminal 10 of the mute state of the request terminal 10 in various other ways. For example, the counterpart terminal 10 may generate alarm sounds indicating the mute state of the request terminal 10.

Further, in the above-described example, information indicating the mute state of each terminal 10, which is constantly updated by the terminal 10 during the session, may be synchronized with the information indicating the mute state of each terminal 10 managed by the management system 50 at any desired time.

Next, operation of registering a new microphone to the terminal 10 is explained according to an example embodiment of the present invention.

Figure 34:
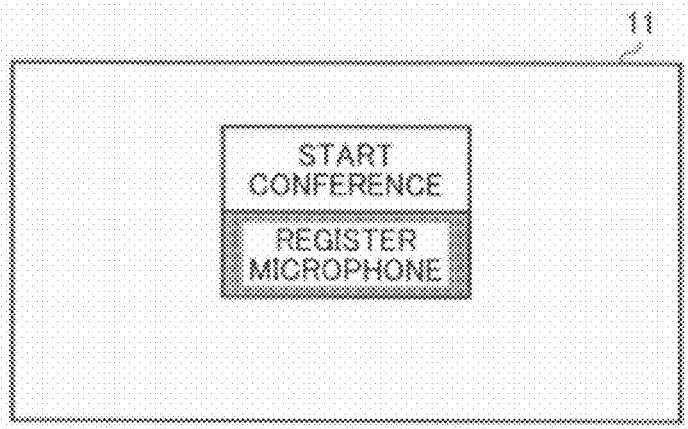
FIG. 34 is an example menu screen, which allows the user to switch between a conference mode and a microphone registration mode of the terminal of FIG. 5.

FIG. 34 illustrates an example menu screen, which is displayed onto the display 11 under control of the display control 14b when the terminal 10 is turned on. The menu screen of FIG. 34 includes the "START CONFERENCE" button, and the "REGISTER MICROPHONE" button. For example, the user at the terminal 10 may move the cursor being displayed on the menu screen using the cursor key of the operation button 108 to selected one of the buttons, and selects the selected button by pressing the enter key of the operation button 108. When the enter key is pressed, the operation input 12 of the terminal 10 detects a user input through the operation button 108 and sends the user input regarding the selection to the mute processor 18. Using these buttons, the user is able to switch between a conference mode and a registration mode.

When the user selects the "START CONFERENCE" button, the mode switch 18e of the mute processor 18 changes the mode of the terminal 10 to a conference mode, which allows the user to start videoconference with another terminal 10. During the videoconference, when the microphone is in the mute on state, the terminal 10 transmits mute state data indicating that the mute function is on to the counterpart terminal 10.

Figure 35:
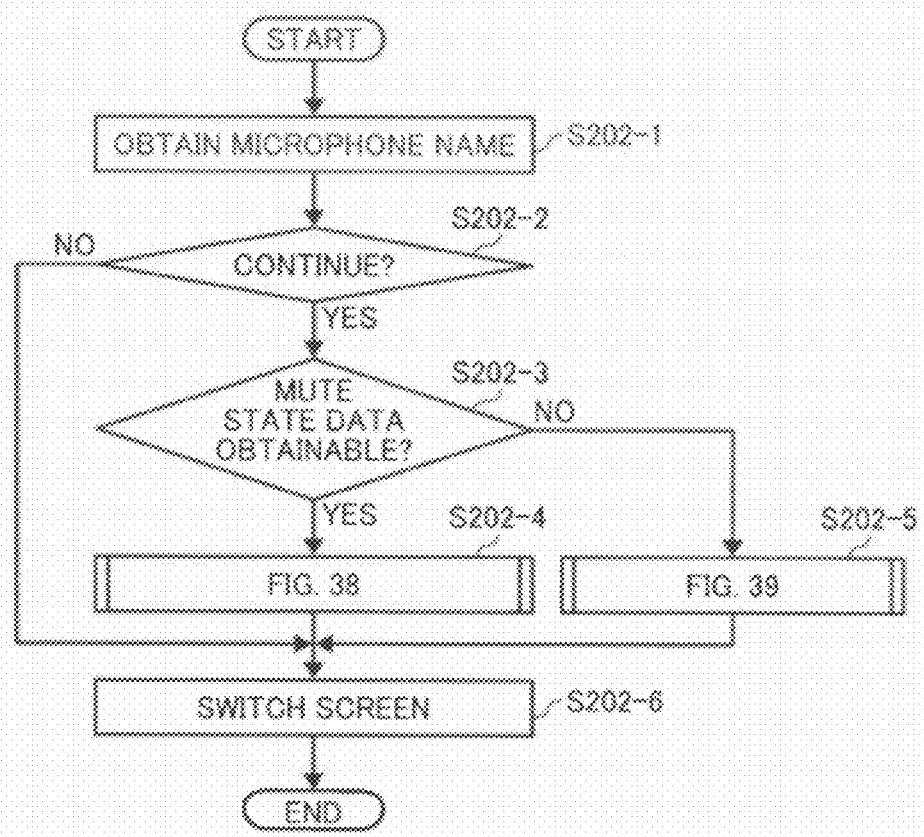
FIG. 35 is a flowchart illustrating operation of registering a microphone for use by the terminal of FIG. 5, performed by the terminal of FIG. 5.

When the "REGISTER MICROPHONE" button of FIG. 34 is selected, the registrar 18f of the mute processor 18 performs operation of FIG. 35. The operation of FIG. 35 is performed, when the microphone to be registered is connected to the terminal 10 such that it is ready to receive input sounds. Further, in this example, it is assumed that the mute processor 18 operates under the Windows operating system, and performs one or more processes described below using the audio mixer API. In this example, it is assumed that a new external microphone 114a is connected to the terminal 10.

At S202-1, the processor 18a of the mute processor 18 obtains the microphone name of the microphone 114a connected to the sound input 15a.

Figure 36:
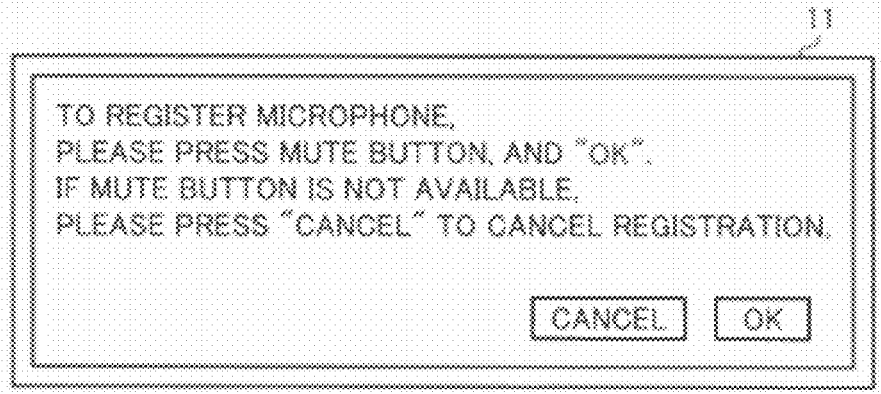
FIG. 36 is an example dialog screen displayed by the terminal of FIG. 5 when the operation of registration a microphone is started.
Figure 37:
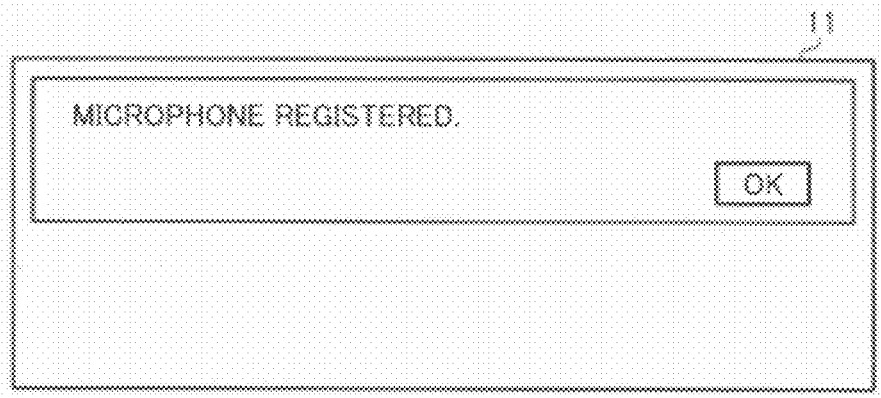
FIG. 37 is an example dialog screen displayed by the terminal of FIG. 5 when the operation of registering a microphone is completed.

At S202-2, the registrar 18f requests the processor 18a to display a dialog screen, such as the dialog screen of FIG. 36, onto the display 11. The registrar 18f sets a mute function flag of the registrar 18f to FALSE. The mute function flag of the registrar 18f indicates whether the mute state data of the microphone 114a is obtainable. The mute function flag with TRUE indicates that the mute state data is obtainable. The mute function flag with FALSE indicates that the mute state data is not obtainable. Further, at this step, the registrar 18f determines whether a user input that requests for continuation of registration process is received. For example, when the registrar 18f determines that "CANCEL" button of the dialog screen of FIG. 36 is selected by the user, the registrar 18f determines that registration process is not continued ("NO" at S202-2), and the operation proceeds to S202-6.

At S202-6, the display control 14b switches the display on the display 11 from the dialog screen of FIG. 36 to the menu screen of FIG. 34. The user may want to press the cancel button of the dialog screen of FIG. 36, when the user knows that the microphone 114a is not provided with the mute function. The user can easily determine that the mute function is not provided by checking whether the microphone 114a is not provided with the mute button 114b. Alternatively, the user may press the cancel button at any time when the user decides to cancel the registration process.

At S202-2, when the user wants to proceed with registration process, the user presses the mute button 114b of the microphone 114a that is connected to the terminal 10, and presses the "OK" button of the dialog screen of FIG. 36. When the "OK" button is detected, the operation proceeds to S202-3.

At S202-3, the registrar 18f determines whether the mute state data is obtainable from the microphone 114a. More specifically, in this example, the registrar 18f determines whether the mute state data is received from the microphone 114a, which is in the mute on state as the mute button 114b is pressed. When the mute state data is obtained, the registrar 18f determines that the mute state data is obtainable ("YES" at S202-3), and changes the mute function flag of the registrar 18f to TRUE. When the mute state data is not obtained, the registrar 18f determines that the mute state data is not obtainable ("NO" at S202-3), and changes the mute function flag of the registrar 18f to FALSE.

When the mute function flag is TRUE, the operation proceeds to S202-4 to perform operation described below referring to FIG. 38. When the mute function flag is FALSE, the operation proceeds to S202-5 to perform operation described referring to FIG. 39.

At S202-6, the registrar 18f requests the processor 18a to switch the display 11 from the dialog screen of FIG. 36 to the menu screen of FIG. 34, and the operation ends.

Figure 38:
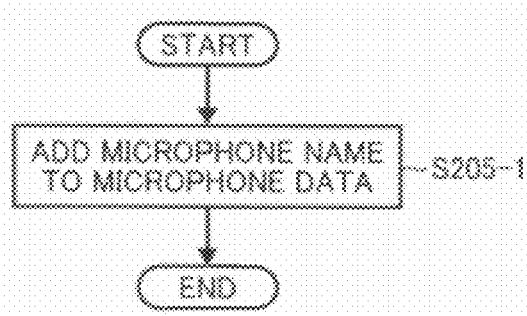
FIG. 38 is a flowchart illustrating operation of registering a microphone, when the microphone is provided with the function of notifying mute state, performed by the terminal of FIG. 5.

Referring now to FIG. 38, operation performed at S202-4 of FIG. 35 is explained according to an example embodiment of the present invention. As described above, the mute processor 18 performs operation of FIG. 38 when the mute function flag of the registrar 18f is TRUE, and pressing of the "OK" button of the dialog screen of FIG. 36 is detected.

At S205-1, the registrar 18f requests the processor 18a to add the microphone name of the microphone 114a that is obtained at S202-1 of FIG. 35 to the microphone data, which is stored in the memory 18d. For example, assuming that the obtained microphone name is "MIC2", the microphone name "MIC2" is added to a list of microphone names of the microphones having the function of notifying mute state as illustrated in FIG. 26A. The table of FIG. 26A shows that the microphone name "MIC1" has been already registered, and the microphone name "MIC2" is added to the list. In this example, the microphone data stored in the table of FIG. 26A lists one or more microphone names of microphones provided with the function of notifying mute state. Using the table of FIG. 26A, the mute processor 18 is able to determine whether a specific microphone has the function of notifying the mute state data.

Figure 39:
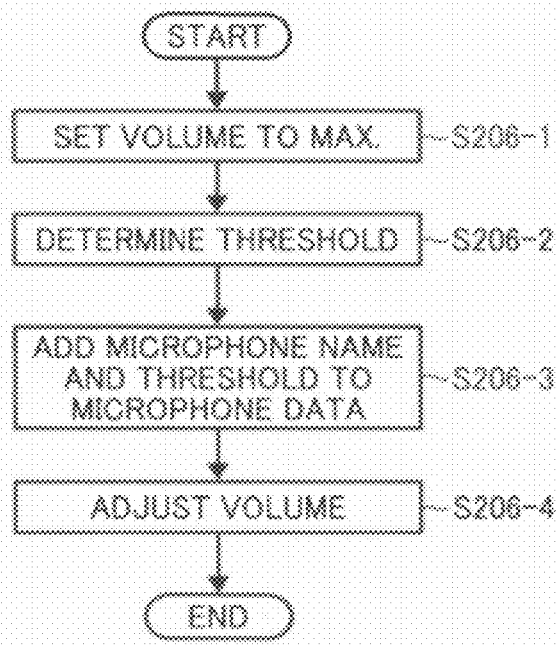
FIG. 39 is a flowchart illustrating operation of registering a microphone, when the microphone is not provided with the function of notifying mute state, performed by the terminal of FIG. 5.

Referring now to FIG. 39, operation performed at S202-5 of FIG. 35 is explained according to an example embodiment of the present invention. As described above, the mute processor 18 performs operation of FIG. 39 when the mute function flag of the registrar 18f is FALSE, and pressing of the "OK" button of the dialog screen of FIG. 36 is detected.

At S206-1, the processor 18a obtains the current volume level of a sound signal received from the microphone 114a, and stores information regarding the current volume level in any desired memory such as the memory 18d. The processor 18a then sets the volume level of the sound signal input from the microphone 114a to the maximum level.

By setting the volume level of the microphone 114a to maximum, the threshold x, which is used to determine the mute state of the microphone 114a, does not have to be obtained for each one of different types of microphones. Once the maximum volume level is set, as long as the input level of the sound signal input from the microphone 114a having the mute off state is obtained, the threshold x that is applicable to various types of microphones can be obtained.

For example, at S206-2, using the audio mixer API under the Windows operating system, the level of sound signal after being digitalized is sampled for a predetermined time period, such as for five seconds. In this example, the sound signal is digitalized into 16 bit encoded data, with sampling frequency of 16 kHz such that about 80000 samples of the measured levels "x" of sound signals are obtained. The processor 18a selects the level x_max, which has the absolute maximum value, from the measured levels x of sound signals obtained through sampling. When the level x_max is less than a predetermined value, such as 100, the processor 18a sets this level x_max to a threshold x, and the operation proceeds to S206-3.

Figure 40:
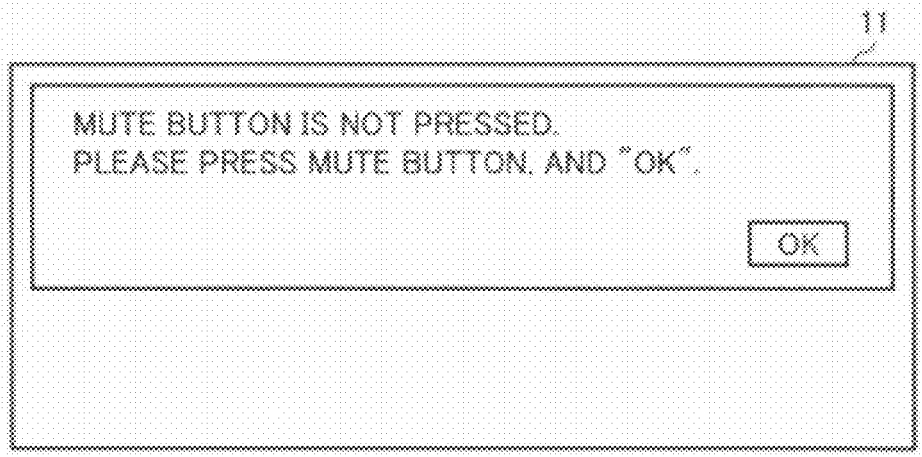
FIG. 40 is an example dialog screen displayed by the terminal of FIG. 5 when registration of a microphone cannot be started.

When the level x_max is greater than the predetermined value, such as 100, the processor 18a requests the display control 14b to display a dialog screen of FIG. 40 onto the display 11. When the "OK" button of the dialog screen of FIG. 40 is detected, the operation repeats sampling of the sound signal to obtain measured levels x to determine a threshold x. Since the threshold x is set only when the level x_max is less than the predetermined value, the threshold x has a value small enough to indicate whether the microphone is in the mute on state. This process at S206-2 may be repeated until the threshold x is determined. Alternatively, the process at S206-2 may be only repeated for a predetermined time. In case the threshold x is not determined after repeating the process for the predetermined time, the terminal 10 may return an error message.

At S206-3, the processor 18a adds the microphone name obtained at S202-1 of FIG. 35 and the threshold x_max obtained at S206-2 to the microphone data stored in the memory 18d. For example, when the microphone name is "MIC4", and the threshold x_max is 4, the processor 18a registers these data to the microphone data stored in the memory 18d as illustrated in FIG. 26B. In this example, the threshold x_max is set to the threshold x, which is used to determine whether the microphone is in the mute on state.

In FIG. 26B, the microphone name "MIC3" and the threshold x_max of 3 has been previously registered. The microphone name "MIC4" and the threshold x_max of 4 are now added. In this example, it is assumed that the microphone data of FIG. 26B lists one or more microphone names of the microphones without the function of notifying mute state.

At S206-4, the processor 18a adjusts the volume level of the microphone 114a to the level stored in the memory at S206-1, using the audio mixer API, and the operation ends.

As described above, even when the user uses an external microphone 114a, which is not provided with the function of notifying mute state, the terminal 10 can obtain the mute state data from the external microphone 114a once it is registered to the microphone data of the terminal 10, and transmit a message based on the mute state data to the counterpart terminal 10. The user is able to register any desired microphone 114a for use at the terminal 10, for example, by performing the operation of FIG. 39, thus improving user operability.

In the above-described examples, the mute processor 18 of the terminal 10 executes mute processing when the mute button 114b of the external microphone 114a is selected. Alternatively, the mute processor 18 of the terminal 10 may execute mute processing when the volume adjuster button 115b of the external speaker 115a is selected. For example, when mute processing is executed in response to the volume adjuster button 115b of the external speaker 115a, the data transmit/receive 11 of the request terminal 10A transmits a message indicating that mute function is on to the counterpart terminal 10B. For this reasons, the volume adjuster button 115b of the speaker 115a functions as the mute button 114b of the microphone 114a such that the mute button 114b does not have to be provided with the microphone 114a. With this function, even when the microphone is not provided with the mute button, the user is able to activate the mute function of the terminal 10.

Figure 41:
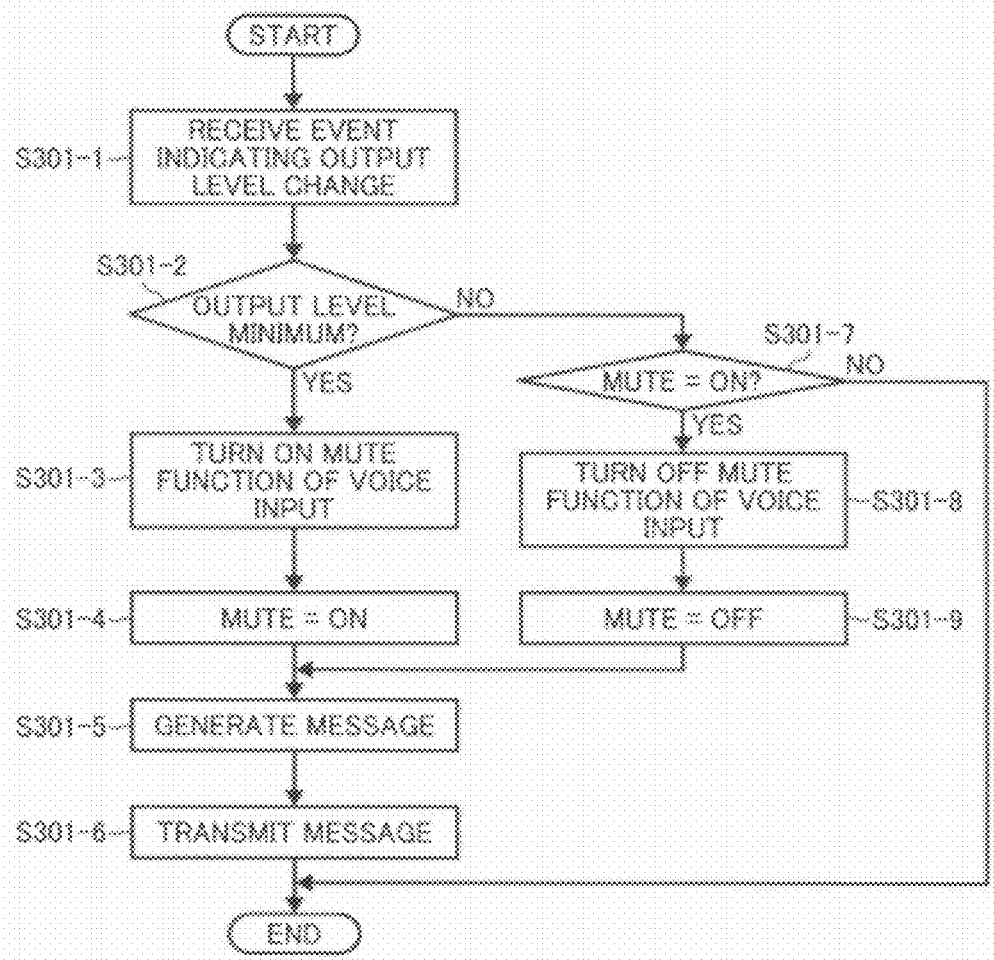
FIG. 41 is a flowchart illustrating operation of transmitting a message based on mute state data, when an event indicating the change in volume output from a speaker is detected, according to an example embodiment of the present invention.

Referring now to FIG. 41, operation of transmitting a message to the counterpart terminal 10B to indicate that the mute function is on in response to the selection of the volume adjuster button 115a, performed by the request terminal 10A, is explained according to an example embodiment of the present invention. In this example, it is assumed that the request terminal 10aa transmits mute state data to the counterpart terminal 10bb, during when the session for videoconference is carried out between or among the terminals 10, for example, through the relay terminal 30.

At S301-1, the monitor 18g of the mute processor 18 monitors the event indicating the change in output level of the sound output 15b. When the event of the output level change is received at S301-1, the operation proceeds to S301-2.

In this example, the event indicating the change in output level may be detected using the audio mixer API under the Windows operating system. More specifically, when the operation input 12 receives a user input through the volume adjuster button 115b of the external speaker 115a, the volume adjuster control 15b5 of the sound output 15b (FIG. 6) analyzes the user input and changes the output level of the sound output 15b, thus causing the event indicating the change in output level to occur. Accordingly, when the user presses the volume adjuster button 115b of the external speaker 115a, the event indicating the change in output level is generated.

At S301-2, the monitor 18g obtains the output level of the sound signal, which is changed by the sound output 15b, and determines whether the obtained output level is set to minimum. For example, the monitor 18g compares the obtained output level with the minimum value, such as 0, to generate a determination result. When it is determined that the obtained output level is set to minimum ("YES" at S301-2), the operation proceeds to S301-3. When it is determined that the obtained output level is not set to minimum ("NO" at S301-2), the operation proceeds to S301-7. Information regarding the minimum output level is stored in any desired memory.

At S301-3, the monitor 18g turns on the mute function of the sound input 15a, for example, using the audio mixer API such that any signal input through the sound input 15a will be ignored. For example, the monitor 18g may instruct the mute switch 15a5 to turn off the mute function, thus not allowing passing of the signal input to the mute switch 15a5. This process is applicable when the sound I/O I/F 116 supports an interface for mute function such that the function of the mute switch 15a5 is provided. In case the sound I/O I/F 116 does not support the interface for mute function, the monitor 18g may cause the level of the input signal input to the sound input 15a to be minimum, such as 0.

Figure 46:
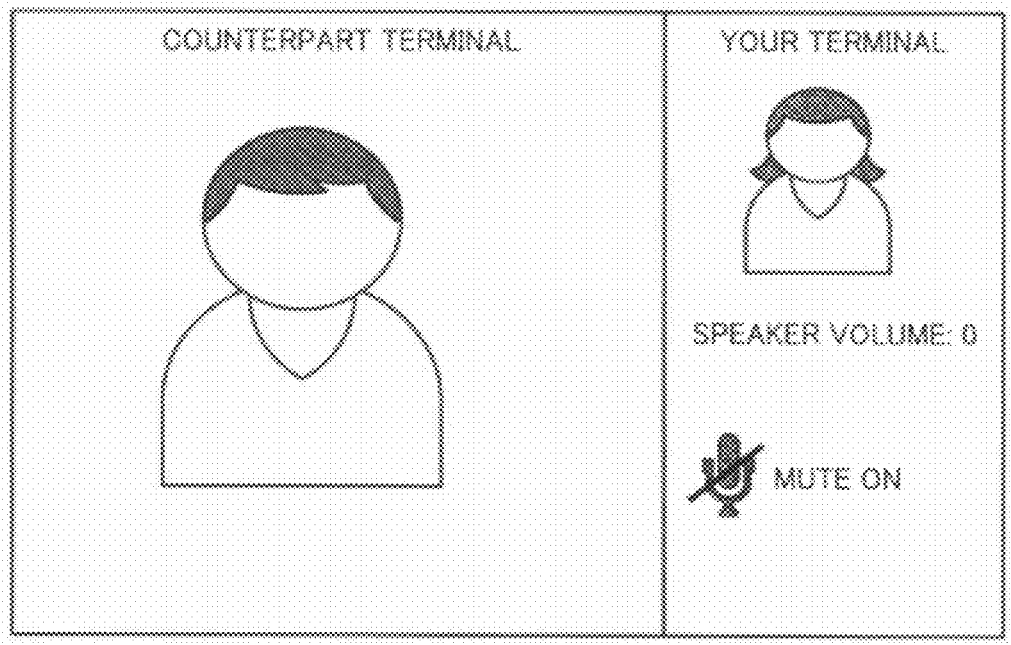

At S301-4, the monitor 18g sets the mute state data, which is stored in the memory 18d, to the mute on state. The processor 18a requests the display control 14b to display through the display 11 the icon indicating that the terminal 10aa is in the mute on state and the text indicating the mute on state. For example, the display 11 may display a screen of FIG. 46. For example, the display control 14b accesses the memory 1000 via the memory control 19 to obtain the icon indicating the mute on state and the text "MUTE_ON", and displays the obtained data over the moving image layer. The screen of FIG. 46 further displays that the volume level of the external speaker 115a is set to minimum, such as 0.

At S301-5, the state manager 18c generates a message, for example a message indicating the mute on state as illustrated in FIG. 42(a) or FIG. 43(a).

In one example, when the request terminal 10aa is to transmit the message to the counterpart terminal 10bb directly through the communication network 2, the request terminal 10aa generates a message as illustrated in FIG. 42. The message shown in FIG. 42 is an XML-based message according to XMPP IM, defined by RFC3921. More specifically, the state manager 18c enters the terminal ID of the request terminal 10aa and the terminal ID of the counterpart terminal 10bb, respectively, into the "from" attribute and the "to" attribute of the presence tag. The state manager 18c enters the mute state data into the value of the status tag. Referring to FIG. 42(a), the state manager 18c enters the value "MUTE_ON" into the status tag to indicate that the mute state function is on. Referring to FIG. 42(b), the state manager 18c enters the value "MUTE_OFF" into the status tag to indicate that the mute state function is off. In either case of FIGS. 42(a) and 42(b), the state manager 18c enters the value "CHAT" into the show tag to indicate that the terminal 10aa is having videoconference with the terminal 10bb. In the example illustrated in FIG. 42, the terminal ID of the terminal 10 is entered into the presence tag. Alternatively, the IP address of the terminal 10 may be entered either by the state manager 18c at the time of generating the message at S301-5, or by the data transmit/receive 11 at the time of transmitting the message at S301-6.

In another example, when the request terminal 10aa is to transmit the message to the counterpart terminal 10bb via the management system 50, the request terminal 10aa generates a message as illustrated in FIG. 43. In such case, the management system 50 receives a message from the request terminal 10aa, and sends the message to the counterpart terminal 10bb. Referring to FIG. 43, the state manager 18c enters the IP address of the request terminal 10aa and the IP address of the management system 50, respectively, into the "from" attribute and the "to" attribute of the presence tag. The state manager 18c enters the terminal ID "01aa" of the request terminal 10*aa* into the id tag. Referring to FIG. 43(*a*), the state manager 18*c* enters the value "MUTE_ON" into the status tag to indicate that the mute state function is on. Referring to FIG. 43(*b*), the state manager 18*c* enters the value "MUTE_OFF" into the status tag to indicate that the mute state function is off. In alternative to entering the IP address of the terminal 10 into the presence tag, the state manager 18*c* may enter the terminal ID of the terminal 10.

In alternative to the messages shown in FIGS. 42 and 43, the request terminal 10*aa* may generate a message addressed to the relay terminal 30. In such case, the relay terminal 30 generates a message addressed to the counterpart terminal 10*bb* based on information obtainable from the message received from the request terminal 10*aa*, and sends the message to the counterpart terminal 10*bb*.

Referring back to FIG. 41, at S301-6, the state manager 18*c* requests the data transmit/receive 11 to transmit the message generated at S301-5. The data transmit/receive 11 transmits the message to another apparatus on the network, such as the counterpart terminal 10*bb*, the management system 50, or the relay terminal 30, according to XMPP.

When it is determined that the output level is not set to minimum at S301-2 ("NO" at S301-2), at S301-7, the monitor 18*g* determines whether the mute function is on by referring to the mute state data of the request terminal 10*aa* stored in the memory 18*d*. When the mute state data indicates that the mute function is on ("YES" at S301-7), the operation proceeds to S301-8. When the mute state data indicates that the mute function is not on, i.e., off ("NO" at S301-7), the operation ends.

At S301-8, when the mute state data indicates that the mute function is on, the monitor 18*g* turns off the mute function of the sound input 15*a*, for example, using the audio mixer API, thus allowing the sound input 15*a* to receive sound signals input through the microphone 114*a*.

At S301-9, the monitor 18*g* changes the mute state data, which is stored in the memory 18*d*, from the mute on state to the mute off state. The monitor 18*g* requests the display control 14*b* to stop displaying the icon and the text each indicating the mute on state, which is displayed on the display 11.

At S301-5, the state manager 18*c* generates a message indicating the mute off state, for example, as described in FIG. 42(*b*) or 43(*b*).

At S301-6, the state manager 18*c* requests the data transmit/receive 11 to transmit the message generated at S301-5 to the destination apparatus, such as the counterpart terminal 10*bb*, the management system 50, or the relay terminal 30. When the message is transmitted to the destination apparatus such as the counterpart terminal 10*bb*, the management system 50, or the relay terminal 30, the operation ends.

As described above, even when the external microphone 114*a* is not provided with the mute button 114*b*, when the request terminal 10A determines that the output level of the external speaker 115*a* is set to minimum through the volume adjuster button 115*b*, the request terminal 10A is able to turn on the mute function of the request terminal 10A and transmits a message indicating that the mute function is on to the counterpart terminal 10B.

When the user at the request terminal 10A sets the output level of the external speaker 15*a* to minimum, videoconference will be interrupted, as the user at the request terminal 10A cannot hear the voice of the user at the counterpart terminal 10B. In this example, when the user at the request terminal 10A sets the output level of the external speaker 15*a* to minimum, the request terminal 10A determines that the user desires to interrupt videoconference. In order to notify the user at the counterpart terminal 10B that the user at the request terminal 10A wants to hold the videoconference, the request terminal 10A generates a message based on the mute state data indicating that mute function is turned on, and transmits the message to the counterpart terminal 10B. In this manner, the user at the counterpart terminal 10B is able to instantly know that the user at the request terminal 10A turns on the mute function such that interruption is not due to an error in system.

Referring now to FIG. 44, operation of transmitting a message to the counterpart terminal 10B to indicate that the mute function is on in response to the selection of the volume adjuster button 115*a*, performed by the request terminal 10A, is explained according to another example embodiment of the present invention. In this example, it is assumed that the request terminal 10*aa* transmits mute state data to the counterpart terminal 10*bb*, during when the session for videoconference is established between or among the terminals 10.

At S303-1, the monitor 18*g* of the mute processor 18 monitors the event indicating the change in output level of the sound output 15*b*, in a substantially similar manner as described above referring to S301-1 of FIG. 41. When the event of the output level change is received at S301-1, the operation proceeds to S303-2.

At S303-2, the monitor 18*g* obtains the output level of the sound signal, which is changed by the sound output 15*b*, and determines whether the obtained output level is set to minimum, for example, the value 0. When it is determined that the obtained output level is set to minimum ("YES" at S301-2), the operation proceeds to S303-3. When it is determined that the obtained output level is not set to minimum ("NO" at S303-2), the operation proceeds to S303-8.

At S303-3, the monitor 18*g* obtains the input level of the sound signal input to the sound input 15*a*, and stores the obtained input level in any desired memory such as the memory 18*d* as a variable of INPUT_LEVEL.

At S303-4, the monitor 18*g* sets the input level of the sound input 15*a* to minimum, such as the value 0, for example, using the audio mixer API.

At S303-5, the monitor 18*g* sets the mute state data, which is stored in the memory 18*d* as a variable "MUTE", to the mute on state ("MUTE=ON"). The monitor 18*g* further requests the display control 114*b* to display an icon indicating that the mute function is on and a text indicating the mute on staste, onto the display 11.

At S303-6, the state manager 18*c* generates a message indicating that the mute function is on, as illustrated in FIG. 42(*a*) or FIG. 43(*a*).

At S303-7, the state manager 18*c* requests the data transmit/receive 11 to send the message generated at S303-6. The data transmit/receive 11 transmits the message to the destination apparatus such as the counterpart terminal 10*bb* or the management system 50 according to XMPP, and the operation ends.

At S303-2, when it is determined that the output level is not set to minimum (NO at S303-2), the operation proceeds to S303-8.

At S303-8, the monitor 18*g* determines whether the mute function is on by referring to the mute state data of the request terminal 10*aa* stored in the memory 18*d*. When the mute state data indicates that the mute function is on ("YES" at S303-8), the operation proceeds to S303-9. When the mute state data indicates that the mute function is not on, i.e., off ("NO" at S303-8), the operation ends.

At S303-9, the monitor 18*g* refers to the input level of the sound input 15*a* stored in the memory 18*d* as the INPUT_LEVEL variable at S303-3, and sets the current input level of the sound input 15a, which is set minimum at S303-4, to the original input level stored at S303-3.

At S303-10, the monitor 18g sets the mute state data stored in the memory 18d to the mute off state. The processor 18a requests the display control 14b to stop displaying the icon indicating the mute on state and the text indicating the mute on state, which are respectively displayed on the display 11.

At S303-6, the state manager 18c generates a message indicating the mute off state, for example, as illustrated in FIG. 42(b) or FIG. 43(b).

At S303-7, the state manager 18c requests the data transmit/receive 11 to transmit the message generated at S303-6 to the destination apparatus such as the counterpart terminal 10bb or the management system 50, and the operation ends.

As described above, even when the mute button 114b is not provided with the external microphone 114a of the request terminal 10A, and/or even when the sound I/O I/F 116 of the request terminal 10A does not support mute function, the request terminal 10A is able to execute mute function in response to the selection of the volume adjuster button 115b of the external speaker 115a, specifically, by setting the input level of the sound input 15a to minimum. Further, the request terminal 10A is able to send a message indicating the mute on state to the counterpart terminal 10B.

Figure 45:
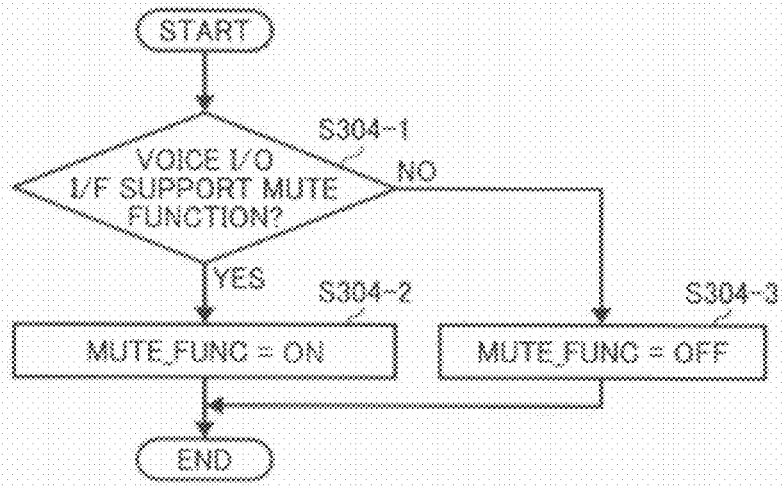
FIG. 45 is a flowchart illustrating operation of selecting between the process shown in FIG. 41 and the process shown in FIG. 44.

Whether to perform operation of FIG. 41 or operation of FIG. 44 is determined based on a determination result indicating whether the sound I/O I/F 16 supports mute function as described below referring to FIG. 45. The operation of FIG. 45 may be performed when the terminal 10 is turned on.

At S304-1, the monitor 18g determines whether the sound I/O I/F 116 supports the mute function of the sound input 15a. When it is determined that the sound I/O I/F 116 supports the mute function ("YES" at S304-1), the operation proceeds to S304-2. When it is determined that the sound I/O I/F 116 does not support the mute function ("NO" at S304-1), the operation proceeds to S304-3. In order to determine whether the sound I/O I/F 116 supports the mute function, the monitor 18g may obtain property information of the sound I/O I/F 116, using the audio mixer API.

At S304-2, the monitor 18g sets data indicating the mute function support, such as the variable "MUTE_FUNC" to ON, and the operation ends. The variable "MUTE_FUNC" is stored in the memory 18d.

At S304-3, the monitor 18g sets data indicating the mute function support, such as the variable "MUTE_FUNC" to OFF, and the operation ends.

In operation, in order to determine whether to perform operation of FIG. 41 or operation of FIG. 44, the mute processor 18 may refer to the variable MUTE_FUNC, which is stored in the memory 18d, and select one of the operation of FIG. 41 and the operation of FIG. 44 based on the obtained variable MUTE_FUNC. More specifically, when the variable MUTE_FUNC is ON, the mute processor 18 determines that the sound I/O I/F 116 supports mute function, and performs operation of FIG. 41. When the variable MUTE_FUNC is OFF, the mute processor 18 determines that the sound I/O I/F 116 does not support mute function, and performs operation of FIG. 44.

As described above, with or without the mute function support of the sound I/O I/F 116 for the sound input 15a, the request terminal 10A is able to execute mute processing based on determination that the user at the request terminal 10A sets the output level of the external speaker 115a to minimum, and transmit a message indicating the mute on state to the counterpart terminal 10B.

Figure 47:
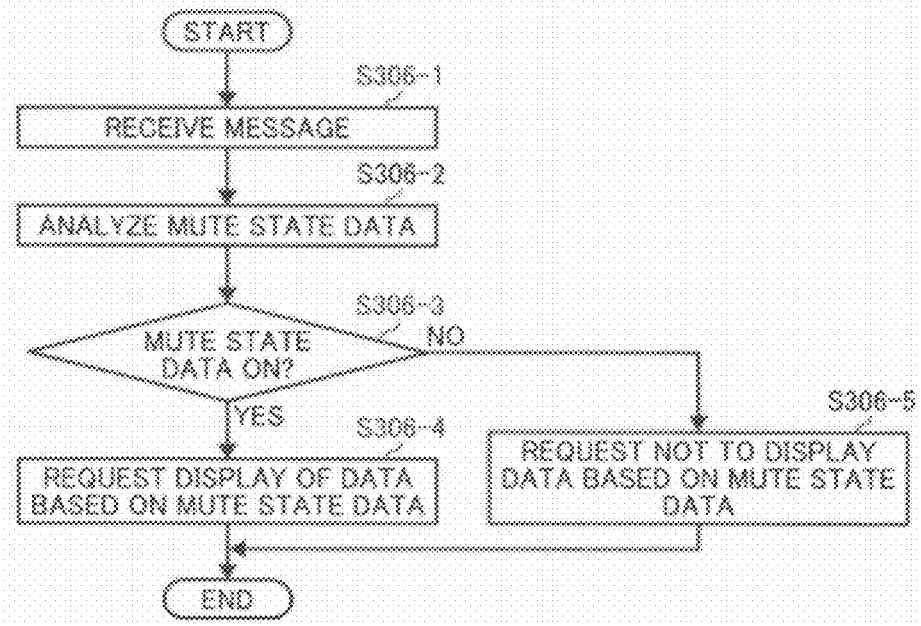
FIG. 47 is a flowchart illustrating operation of processing a message generated based on mute state data, performed by the request terminal, according to an example embodiment of the present invention.

Referring now to FIG. 47, operation of processing a message indicating the mute state of the request terminal 10A, performed by the counterpart terminal 10B, is explained according to an example embodiment of the present invention.

At S306-1, the data transmit/receive 11 of the counterpart terminal 10B receives a message, which includes the mute state data of the request terminal 10A, from the request terminal 10A.

At S306-2, the state manager 18c analyzes the message received from the request terminal 10A, and obtains the mute state data from the status tag of the message.

At S306-3, the processor 18a determines whether the mute state data obtained at S306-2 indicates that mute function is on. When it is determined that the mute state data indicates that mute function is on ("YES" at S306-3), the operation proceeds to S306-4.

When it is determined that the mute state data indicates that mute function is not on ("NO" at S306-3), the operation proceeds to S306-5.

At S306-4, the processor 18a requests the display control 14b of the counterpart terminal 10B to display the icon indicating the mute on state of the request terminal 10A and the text indicating the mute on state of the request terminal 10A onto the display 11 of the counterpart terminal 10B, and the operation ends.

Figure 48:
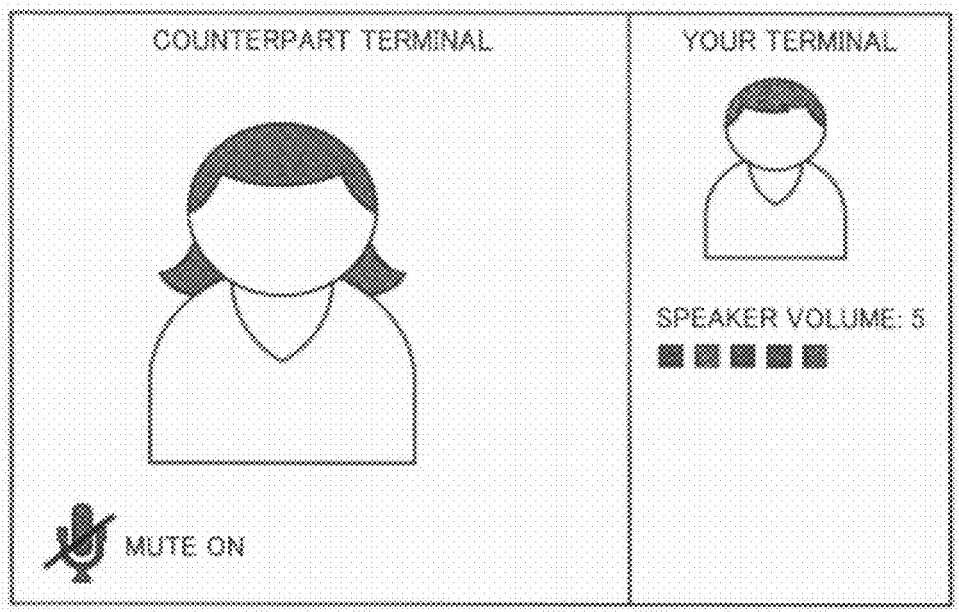

For example, as illustrated in FIG. 48, the display control 14b of the counterpart terminal 10B refers to the icon indicating the mute on state and the text indicating the mute on state, which are respectively stored in the memory 1000, via the memory control 19, and causes the display 11 to display the icon and the text over the moving image layer. Referring to FIG. 48, over the moving image layer in which the moving image of the user at the request terminal 10A is displayed, the icon indicating the mute on state and the text indicating the mute on state are displayed.

At S306-5, the processor 18a requests the display control 14b of the counterpart terminal 10B not to display, or stop displaying if displayed, the icon indicating the mute on state of the request terminal 10A and the text indicating the mute on state of the request terminal 10A onto the display 11 of the counterpart terminal 10B, and the operation ends.

As described above, the counterpart terminal 10B is able to receive the mute state data of the request terminal 10A for display onto the display 11 of the counterpart terminal 10B. In this manner, the user at the counterpart terminal 10B is able to instantly know that the user at the request terminal 10A executes mute processing, and not being able to hear sounds is not caused by an error in system.

Numerous additional modifications and variations are possible in light of the above teachings. It is therefore to be understood that within the scope of the appended claims, the disclosure of the present invention may be practiced otherwise than as specifically described herein.

For example, elements and/or features of different illustrative embodiments may be combined with each other and/or substituted for each other within the scope of this disclosure and appended claims.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, involatile memory cards, ROM (read-only-memory), etc.

Alternatively, any one of the above-described and other methods of the present invention may be implemented by ASIC, prepared by interconnecting an appropriate network of conventional component circuits or by a combination thereof with one or more conventional general purpose microprocessors and/or signal processors programmed accordingly.

Any information stored in a specific memory or storage device described above may be stored in any desired memory or storage device other than the examples described above. For example, the communication terminal 10 stores various information regarding the microphone, such as a list of one or more microphones each capable of notifying mute state, and a list of one or more microphones each of which is not capable of notifying mute state. Such information regarding the microphones may be stored in any storage device other than the internal memory of the communication terminal 10.

In one example, the present invention may reside in a communication terminal, which transmits or receives at least sound data to or from a counterpart terminal through a network. The communication terminal includes: a sound input to be input with a sound signal from a sound input device; a determiner to determine a type of the sound input device; a processor to manage mute processing of the communication terminal; a state manager to manage a mute state of the sound input device; and a data transmit/receive to communicate data through the network. The determiner determines whether the sound input device is capable of notifying the communication terminal of the mute state of the sound input device. When the determiner determines that the sound input device is capable of notifying the communication terminal of the mute state of the sound input device, the processor determines the mute state of the sound input device based on mute state data obtained from the sound input device. When the determiner determines that the sound input device is not capable of notifying the mute state of the sound input device, the determiner determines the mute state of the sound input device based on a volume level of the sound signal input from the sound input device. The processor notifies the state manager of the mute state of the sound input device determined by the determiner. The state manager generates a message including information indicating the mute state of the sound input device, identification information for identifying the communication terminal, and identification information for identifying a destination apparatus to which the message is addressed. The state manager further requests the data transmit/receive to send the message to the destination apparatus.

The communication terminal further includes a first list of sound input devices each of which is capable of notifying the mute state of each sound input device. The processor obtains a type of the sound input device, and sends the type of the sound input device to the determiner. The determiner searches the first list of sound input devices for the obtained type of the sound input device. When it is determined that the obtained type of the sound input device is stored in the first list, the determiner determines that the sound input device is capable of notifying the communication terminal of the mute state of the sound input device. When it is determined that the obtained type of the sound input device is not stored in the first list, the determiner determines that the sound input device is not capable of notifying the communication terminal of the mute state of the sound input device.

The communication terminal further includes a second list of sound input devices each of which is not capable of notifying the communication terminal of the mute state of each sound input device. When it is determined that the obtained type of the sound input device is not stored in the first list, the determiner further searches the second list of sound input devices for the obtained type of the sound input device. When it is determined that the obtained type of the sound input device is not stored in the second list, the determiner instructs the state manager to send a message indicating that the mute state of the sound input device is not obtainable.

The second list of sound input devices stores, for each of sound input device types, a threshold previously determined for each of sound input device types. The determiner refers to the threshold stored in the second list. When it is determined that the measured volume level of the sound signal is within a range specified by the threshold, the determiner determines that the sound input device is in the mute on state. When it is determined that the measured volume level of the sound signal is out of the range specified by the threshold, the determiner determines that the sound input device is in the mute off state.

The threshold of the sound volume level stored in the second list is set to be lower than the minimum volume level of the sound signal input to the sound input from the sound input device.

The volume level of the sound signal obtained by the determiner is obtained by sampling the sound signal for a predetermined time period.

In the mute on state, the mute switch of the sound input is provided at most downstream of the signal processing circuits of the sound input such that the mute switch controls transmission of the signal processed by the signal processing circuits of the sound input.

The communication terminal further includes a display to display information indicating the mute state of the counterpart terminal. When the data transmit/receive of the communication terminal receives a message through the network from the counterpart terminal, the data transmit/receive sends the message to the state manager. The state manager analyzes the message to specify the counterpart terminal and the mute state of the counterpart terminal. The display displays identification information for identifying the counterpart terminal specified by the state manager, and displays or stop displaying information indicating the mute on state of the counterpart terminal.

When the mute state of the counterpart terminal is on, the display displays information indicating that the mute function of the counterpart terminal is on.

When the mute state of the counterpart terminal is off, the display stops displaying information indicating that the mute function of the counterpart terminal is on.

When the mute state of the counterpart terminal is none, indicating that mute state cannot be notified, the display displays information indicating that the mute state of the counterpart terminal not notifiabe.

In another example, the present invention may reside in a communication terminal control program, which causes the communication terminal to perform any one of the above-described functions.

In one example, a communication management system is provided, which is connected to the communication terminal through the network. The communication management system receives the message transmitted from the communication terminal, and sends the message to the counterpart terminal through the network.

The communication management system includes a message processor and a data transmit/receive. When the data transmit/receive receives the message from the communication terminal, the data transmit/receive sends the message to the message processor. The message processor obtains the identification information for identifying the communication terminal, and refers to a management table that stores identification information for identifying the counterpart terminal that is communicating with the communication terminal to specify the identification information for identifying the counterpart terminal. The message processor generates a message including the information indicating the mute state of the communication terminal, the identification information for identifying the communication terminal, and the identification information for identifying the counterpart terminal. The data transmit/receive receives the message from the message processor, and sends the message to the counterpart terminal.

In another example, the present invention may reside in a communication management control program, which causes the communication management system to perform any one of the above-described functions.

As described above, in case the communication terminal is connected to the sound input device, such as the microphone, with the mute function, even when the communication terminal cannot be notified from the sound input device of the mute state of the sound input device, such as when no device driver for the sound input device is installed onto the communication terminal, the communication terminal is able to send information indicating the mute state of the sound input device to the counterpart terminal, either directly, or via the communication management system or the relay terminal.

In one example, the present invention may reside in a communication terminal, which transmits or receives at least sound data to or from a counterpart terminal through a network. The communication terminal includes: a sound input to be input with a sound signal from a sound input device; a determiner to determine a type of the sound input device; a processor to manage mute processing of the communication terminal; a state manager to manage the mute state of the communication terminal; and a data transmit/receive to communicate data through the network. The determiner determines whether the sound input device is capable of notifying the communication terminal of the mute state of the sound input device. When the determiner determines that the sound input device is capable of notifying the communication terminal of the mute state, the processor determines the mute state based on the mute data obtained from the sound input device. When the determiner determines that the sound input device is not capable of notifying the communication terminal of the mute state, the determiner determines the mute state of the sound input device based on a volume level of the sound signal input to the sound input. The processor notifies the state manager of the mute state of the sound input device determined by the determiner. The state manager generates a message including information indicating the mute state of the sound input device, identification information for identifying the communication terminal, and identification information for identifying a destination apparatus to which the message is addressed. The state manager further requests the data transmit/receive to send the message to the destination apparatus. The communication terminal further includes a mode switch to switch between a communication mode in which communication is performed between the communication terminal and the counterpart terminal, and a registration mode in which information regarding the sound input device is registered. When the mode switch switches the operation mode to the registration mode, and when the determiner determines that the sound input device is capable of notifying mute state, the communication terminal registers the identification information for identifying the sound input device. When the determiner determines that the sound input device is not capable of notifying mute state, the communication terminal samples the volume level of the sound signal input from the sound input device that is in the mute state, and registers the sampled volume level with the identification information for identifying the sound input device.

In prior to sampling, the registrar stores the current volume level of the sound signal input to the sound input from the sound input device, and changes the volume level of the sound signal to the maximum. After sampling, the registrar changes the volume level of the sound signal input to the sound input from the sound input device from the maximum to the volume level that is stored.

The registrar of the communication terminal obtains the samples of the volume level of the sound signal for a predetermined time period, and selects the maximum value of the samples for registration.

When the value of the samples selected for registration is greater than a predetermined value, the communication terminal repeats sampling.

In one example, the present invention may reside in a method of registering a sound input device using a communication terminal having a registration mode in which information regarding the sound input device is registered. The method includes the steps of requesting a user to activate the mute function of the sound input device; determining that the sound input device is capable of notifying mute state when mute state data indicating the mute function of the sound input device is obtained and registering identification information for identifying the sound input device; determining that the sound input device is not capable of notifying mute state when mute state data indicating the mute function of the sound input device is not obtained and registering identification information for identifying the sound input device in association with the volume level obtained through sampling the volume levels of the sound signal input to the sound input from the sound input device.

When it is determined that the mute function is not provided with the sound input device, the communication terminal allows the user to cancel registration of the sound input device.

When it is determined that mute state data indicating the mute function of the sound input device is not obtained, the communication terminal requests the user to activate the mute function of the sound input device.

The method further includes determining whether the maximum value of the samples of volume levels of the sound signal input to the sound input is less than a predetermined value; and registering the value of at least one sample in association with the identification information for identifying the sound input device when it is determined that the maximum value is less than the predetermined value.

In one example, the present invention may reside in a communication terminal control program, which causes the communication terminal to perform any one of the above-described functions or operations.

In one example, the present invention may reside in a communication terminal, which transmits or receives at least sound data to or from a counterpart terminal through a network. The communication terminal includes a sound output to output a sound signal based on data transmitted from the counterpart terminal; a volume adjuster operation unit to control the change in volume level of the sound signal output by the sound output; a monitor to monitor the volume level of the sound signal output by the sound output after being adjusted by the volume adjuster operation unit; and a data transmit/receive to communicate data through the network. When the volume level of the sound signal is set to minimum, the monitor causes a sound input to be in the mute on state. The communication terminal further includes a state manager that generates a message including information indicating the mute state of the sound input and identification information for identifying a destination apparatus such as the counterpart terminal. The state manager further requests the data transmit/receive to send the message to the destination apparatus such as the counterpart terminal.

When the sound input is in the mute on state, and the volume level of the sound signal output from the sound output according to instructions through the volume adjuster operation unit is set to a value other than the minimum value, the communication terminal changes the mute state of the sound input to off, generates a message including the identification information for identifying the destination apparatus such as the counterpart terminal and information indicating the mute state of the sound input, and requests the data transmit/receive to send the message to the destination apparatus such as the counterpart terminal.

The monitor stores the volume level of the sound signal input before the mute function of the sound input is activated, and causes the sound input to be in the mute on state.

When the sound input is in the mute on state, and the volume level of the sound signal output from the sound output according to instructions through the volume adjuster operation unit is set to a value other than the minimum value, the communication terminal changes the volume level of the input sound signal to the stored volume level, generates a message including identification information for identifying the destination apparatus such as the counterpart terminal and information indicating the mute state of the sound input, and requests the data transmit/receive to send the message to the destination apparatus such as the counterpart terminal.

The mute state of the communication terminal includes a state in which the sound input of the communication terminal is not input with the sound signal from the sound input device.

The mute state of the communication terminal includes a state in which the volume level of the sound signal input to the sound input from the sound input device is 0 or approximately 0.

The monitor determines whether the communication terminal has an interface provided with the function of blocking the sound signal from being input to the sound input of the communication terminal. When it is determined that the interface with the blocking function is provided, the interface blocks the sound signal from being input such that the sound input is not input with the sound signal when the mute function is activated. When it is determined that the interface is not provided with the blocking function, the volume level of the sound signal input to the sound input is made at about 0.

The communication terminal further includes a display control that displays information based on the contents of the received message onto a display. When the monitor is notified from the data transmit/receive that the message is received, the monitor analyzes information indicating the mute state of the sound input, which is included in the received message, and requests the display control to display or not display data corresponding to the information indicating the mute state of the sound input.

What is claimed is:

1. A communication terminal to transmit sound data to a counterpart terminal through a network, the communication terminal comprising:
    a sound input output interface to receive a sound signal input from a sound input device connected to the sound input output interface;
    a processor configured to:
        obtain information for identifying a type of the sound input device;
        determine whether the sound input device is capable of notifying the communication terminal of a mute state of the sound input device based on the obtained type of the sound input device to generate a determination result, the mute state of the sound input device indicating whether a mute function of the sound input device is activated or inactivated;
        determine the mute state of the sound input device based on notification received from the sound input device when the determination result indicates that the sound input device is capable of notifying the communication terminal of the mute state of the sound input device;
        determine whether the mute state of the sound input device is active based on a volume level of the sound signal input to the sound input output interface from the sound input device when the determination result indicates that the sound input device is not capable of notifying the communication terminal of the mute state of the sound input device; and
        generate a message including identification information for identifying the communication terminal, mute state data indicating a mute state of the communication terminal, and identification information for identifying a destination apparatus; and
    a network interface to send the message generated by the processor to the destination apparatus through the network to cause the counterpart terminal to output data based on the mute state data extracted from the message.

2. The communication terminal of claim 1, further comprising:
    a storage device to store a first table including information indicating one or more types of sound input devices each of which is capable of notifying the communication terminal of the mute state, wherein
    the processor determines that the sound input device connected to the sound input output interface is not capable of notifying the communication terminal of the mute state when the obtained type of the sound input device does not match any one of the one or more types of sound input devices stored in the first table.

3. The communication terminal of claim 2, wherein:
    the storage device is further configured to store a second table including information indicating one or more types of sound input devices each of which is not capable of notifying the communication terminal of the mute state, and
    the processor is further configured to:
        determine whether the obtained type of the sound input device matches any one of the one or more types of sound input devices stored in the second table; and
        cause the message to include the mute state data indicating that the mute state of the communication terminal is not available when the obtained type of the sound input device does not match any one of the one or more types of sound input devices stored in the second table.

4. The communication terminal of claim 3, wherein:
    the second table further stores, for each one of the one or more types of sound input devices stored in the second table, a threshold volume level that is previously determined for each one of the one or more types of sound input devices, and
    the processor determines that the mute function of the sound input device is activated when the volume level of the sound signal input from the sound input device is within a range specified by the threshold volume level.

5. The communication terminal of claim 4, wherein the threshold volume level of the sound signal is set lower than a minimum volume level of the sound signal that can be input to the sound input output interface from the sound input device.

6. The communication terminal of claim 5, wherein the processor is further configured to:

measure the volume level of the sound signal input to the sound input output interface for a predetermined time period to obtain a predetermined number of samples of the volume level of the sound signal; and determine that the volume level of the sound signal is within the range specified by the threshold volume level when none of the samples of the volume level of the sound signal is out of the range specified by the threshold volume level.

7. The communication terminal of claim 6, wherein the sound input output interface includes:

signal processing circuits to process the sound signal input from the sound input device; and a mute switch circuit provided downstream of the signal processing circuits and to control transmission of the sound signal processed by the signal processing circuits based on an instruction for activating the mute function of the sound input device.

8. The communication terminal of claim 1, further comprising:

a display device to display data based on mute state data indicating a mute state of the counterpart terminal, the mute state data being extracted from a message received from the counterpart terminal through the network.

9. The communication terminal of claim 1, further comprising:

a storage device to store the mute state data of the communication terminal that reflects the mute state data of the sound input device in association with the identification information for identifying the communication terminal.

10. The communication terminal of claim 1, wherein the processor is further configured to:

switch an operation mode of the communication terminal from a conference mode in which the communication terminal communicates with the counterpart terminal to a registration mode in which a sound input device for use by the communication terminal is registered;

request a user at the communication terminal to activate the mute function of the sound input device to be registered;

determine whether notification indicating the mute state of the sound input device to be registered is obtained from the sound input device to be registered;

store information for identifying a type of the sound input device to be registered in a storage device when the notification is obtained; and store the information for identifying the type of the sound input device to be registered, and a threshold volume level obtained for the sound input device to be registered, in the storage device, the threshold volume level being determined based on a volume level of the sound signal input to the sound input output interface from the sound input device while activating the mute function of the sound input device.

11. The communication terminal of claim 10, wherein the processor is further configured to:

change the volume level of the sound signal input from the sound input device to be registered to a maximum volume level;

measure a volume level of the sound signal input from the sound input device while activating the mute function of the sound input device for a predetermined time period to obtain a predetermined number of samples of the volume level of the sound signal;

determine whether one of the samples of the volume level of the sound signal having the largest value is less than a predetermined value; and store the one of the samples of the volume level of the sound signal having the largest value as the threshold volume level for the sound input device to be registered when the one of the samples of the volume level is less than the predetermined value.

12. The communication terminal of claim 11, wherein the processor is further configured to:

repeat the process of measuring a volume level of the sound signal input from the sound input device while activating the mute function of the sound input device for the predetermined time period when the one of the samples of the volume level of the sound signal having the largest value is equal to or greater than the predetermined value.

13. The communication terminal of claim 1, wherein the processor is further configured to:

monitor a volume level of a sound signal output from a sound output device connected to the sound input output interface;

cause the sound signal output from the sound input output interface to be blocked or to be minimum in volume level, when the volume level of the sound signal output from the sound output device is set to minimum; and cause the message to include the mute state data indicating that the mute function of the communication terminal is activated.

14. A communication system, comprising:

a communication terminal; and a counterpart terminal to transmit or receive sound data to or from the communication terminal through a network, wherein the communication terminal includes:

means for receiving a sound signal input from a sound input device connected to the means for receiving;

means for obtaining information for identifying a type of the sound input device;

means for determining whether the sound input device is capable of notifying the communication terminal of a mute state of the sound input device based on the obtained type of the sound input device to generate a determination result, the mute state of the sound input device indicating whether a mute function of the sound input device is activated or inactivated;

means for determining the mute state of the sound input device based on notification received from the sound input device when the determination result indicates that the sound input device is capable of notifying the communication terminal of the mute state of the sound input device;

means for determining whether the mute state of the sound input device is active based on a volume level of the sound signal input to the means for receiving from the sound input device when the determination result indicates that the sound input device is not capable of notifying the communication terminal of the mute state of the sound input device; and means for generating a message including identification information for identifying the communication terminal, mute state data indicating a mute state of the communication terminal, and identification information for identifying a destination apparatus; and means for sending the message generated by the means for generating to the destination apparatus through the network, and the counterpart terminal includes:
a display device to display data based on the mute state data extracted from the message.

15. The communication system of claim 14, further comprising:
a communication management apparatus connected to the network, wherein the communication management apparatus includes:
a network interface to receive the message transmitted from the communication terminal through the network, when the identification information for identifying the destination apparatus, being extracted from the message, is the identification information for identifying the communication management apparatus; and
a processor to obtain identification information for identifying the counterpart terminal using the identification information for identifying the communication terminal and to replace the identification information for identifying the destination apparatus with the identification information for identifying the counterpart terminal to cause the network interface to transmit the message to the counterpart terminal.

16. The communication system of claim 14, further comprising:
a storage device to store a first table including information indicating one or more types of sound input devices each of which is capable of notifying the communication terminal of the mute state, wherein
the communication terminal determines that the sound input device connected to the sound input output interface is not capable of notifying the communication terminal of the mute state when the obtained type of the sound input device does not match any one of the one or more types of sound input devices stored in the first table.

17. The communication system of claim 16, wherein:
the storage device is further configured to store a second table including information indicating one or more types of sound input devices each of which is not capable of notifying the communication terminal of the mute state, and
the communication terminal is further configured to:
determine whether the obtained type of the sound input device matches any one of the one or more types of sound input devices stored in the second table; and
cause the message to include the mute state data indicating that the mute state of the communication terminal is not available when the obtained type of the sound input device does not match any one of the one or more types of sound input devices stored in the second table.

18. The communication system of claim 17, wherein:
the second table further stores, for each one of the one or more types of sound input devices stored in the second table, a threshold volume level that is previously determined for each one of the one or more types of sound input devices, and
the communication terminal determines that the mute function of the sound input device is activated when the volume level of the sound signal input from the sound input device is within a range specified by the threshold volume level.

19. A non-transitory recording medium storing a plurality of instructions which cause a communication terminal to perform a method of notifying a counterpart terminal of a mute state of the communication terminal, the method comprising:
receiving a sound signal that is input from a sound input device connected to the communication terminal;
obtaining information for identifying a type of the sound input device;
determining whether the sound input device is capable of notifying the communication terminal of a mute state of the sound input device based on the obtained type of the sound input device to generate a determination result, the mute state of the sound input device indicating whether a mute function of the sound input device is activated or inactivated;
determining the mute state of the sound input device based on notification received from the sound input device when the determination result indicates that the sound input device is capable of notifying the communication terminal of the mute state of the sound input device;
determining whether the mute state of the sound input device is active based on a volume level of the sound signal that is input from the sound input device when the determination result indicates that the sound input device is not capable of notifying the communication terminal of the mute state of the sound input device;
generating a message including identification information for identifying the communication terminal, mute state data indicating a mute state of the communication terminal, and identification information for identifying a destination apparatus; and
sending the message to the destination apparatus through the network to cause the counterpart terminal to output data based on the mute state data extracted from the message.

20. The recording medium of claim 19, wherein the method of notifying further comprises:
switching an operation mode of the communication terminal from a conference mode in which the communication terminal communicates with the counterpart terminal to a registration mode in which a sound input device for use by the communication terminal is registered;
requesting a user at the communication terminal to activate the mute function of the sound input device to be registered;
determining whether notification indicating the mute state of the sound input device to be registered is obtained from the sound input device to be registered;
storing information for identifying a type of the sound input device to be registered in a storage device when the notification is obtained; and
storing the information for identifying the type of the sound input device to be registered, and a threshold volume level obtained for the sound input device to be registered, in the storage device, the threshold volume level being determined based on a volume level of the sound signal that is input from the sound input device while activating the mute function of the sound input device.

* * * * *